United States Patent
Tsujimoto et al.

(10) Patent No.: US 7,452,440 B1
(45) Date of Patent: Nov. 18, 2008

(54) METHOD AND DEVICE FOR PRODUCING LAMINATED COMPOSITE

(75) Inventors: Michitaka Tsujimoto, Kyoto (JP); Katsuo Matsuzaka, Kyoto (JP); Koji Yamaguchi, Kyoto (JP); Masashi Okabe, Kyoto (JP); Masanori Hirata, Osaka (JP); Masafumi Ishiyama, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 499 days.

(21) Appl. No.: 11/355,932

(22) Filed: Feb. 17, 2006

Related U.S. Application Data

(62) Division of application No. 10/343,380, filed as application No. PCT/JP02/04008 on Apr. 23, 2002, now Pat. No. 7,063,768.

(30) Foreign Application Priority Data

| Apr. 23, 2001 | (JP) | 2001-124770 |
| Jun. 5, 2001 | (JP) | 2001-169785 |
| Mar. 1, 2002 | (JP) | 2002-55953 |

(51) Int. Cl.
  *B32B 37/00* (2006.01)
(52) U.S. Cl. ........... 156/308.2; 156/77; 156/229; 156/309.6; 156/309.9
(58) Field of Classification Search ............ 156/308.2, 156/77, 229, 309.6, 309.9
See application file for complete search history.

(56) References Cited

U.S. PATENT DOCUMENTS

| 3,616,037 | A | 10/1971 | Burger |
| 3,620,898 | A | 11/1971 | Harris et al. |
| 3,682,730 | A | 8/1972 | Haase |
| 4,565,733 | A | 1/1986 | Akao |
| 4,832,775 | A | 5/1989 | Park et al. |
| 5,667,866 | A | 9/1997 | Reese, Jr. |

FOREIGN PATENT DOCUMENTS

| EP | 0 379 763 | 8/1990 |
| EP | 1 027 977 A1 | 8/2000 |
| EP | 1 174 263 A1 | 1/2002 |
| JP | 56-022413 A1 | 5/1981 |

(Continued)

OTHER PUBLICATIONS

European Search Report of PCT/JP02/04008 mailed Jul. 30, 2002.
European Search Report, Application No. 05003359.6-2124-, dated Jun. 23, 2005.
European Search Report to co-pending application mailed on May 28, 2004.

*Primary Examiner*—Jeff H Aftergut
(74) *Attorney, Agent, or Firm*—Cheng Law Group PLLC

(57) ABSTRACT

A polyolefin resin drawn sheet 4 is laminated on at least one face of a sheet-form core material 6 having a density of 30 to 300 kgf/m$^3$. At this time, a sheet or film 5 made of a bonding synthetic resin or rubber having a flow starting temperature lower than the thermal deformation temperature of the core material 6 and the melting point of the drawn sheet 4 is interposed between the core material 6 and the drawn sheet 4. The resultant stack product is heated to not less than the flow starting temperature of the synthetic resin or the rubber and not more than the thermal deformation temperature of the core material 6 and the melting point of the drawn sheet 4. At the same time of or after the heating, the stack product is pressed to apply a compression strain of 0.01 to 10% to the core material 6.

5 Claims, 20 Drawing Sheets

FOREIGN PATENT DOCUMENTS

| | | |
|---|---|---|
| JP | 59-042710 A1 | 10/1984 |
| JP | 04-173126 | 6/1992 |
| JP | 06-134913 A1 | 5/1994 |
| JP | 08-318602 A1 | 12/1996 |
| JP | 09-150431 | 6/1997 |
| JP | 10-000748 | 1/1998 |
| JP | 10-237205 | 9/1998 |
| JP | 11-081632 A1 | 3/1999 |
| JP | 11-129276 A1 | 5/1999 |
| JP | 11-291425 | 10/1999 |
| JP | 2000-079654 A1 | 3/2000 |
| JP | 2001-293829 A1 | 10/2001 |

Fig.6
(a)
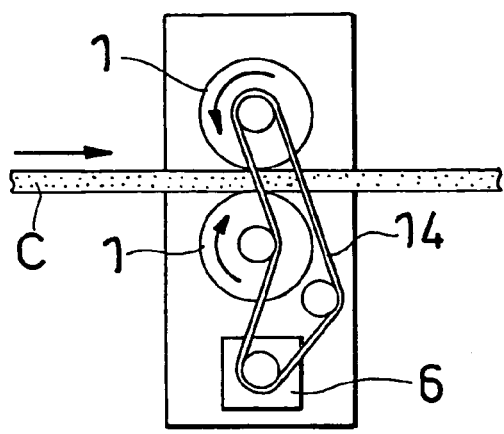
(b)
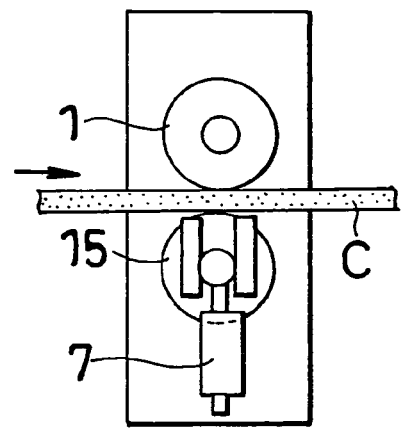
(c)
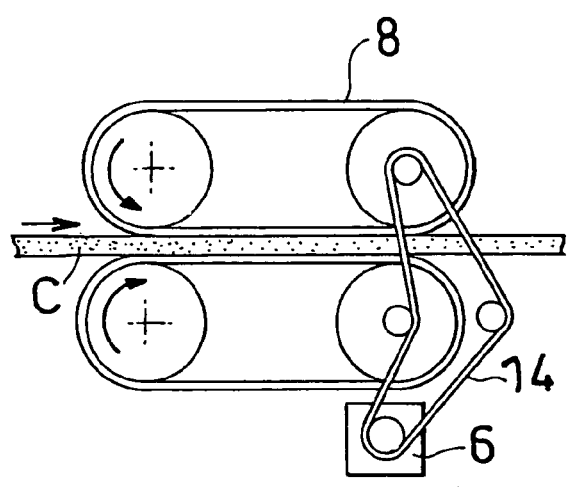
(d)
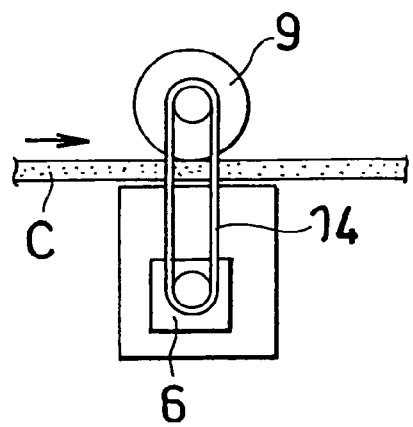

Fig.8
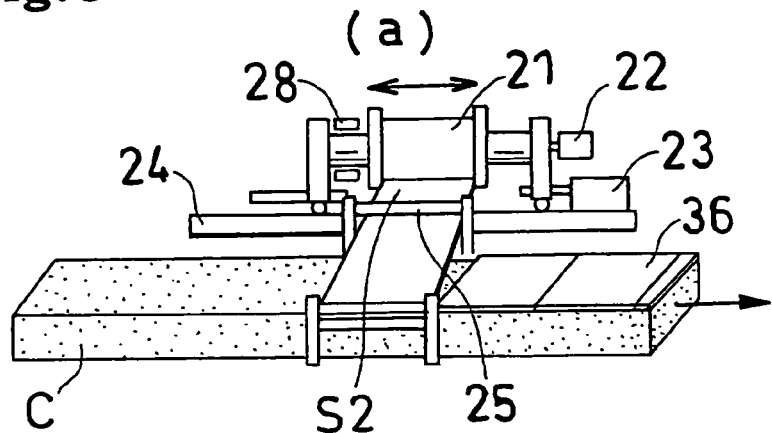
(a)
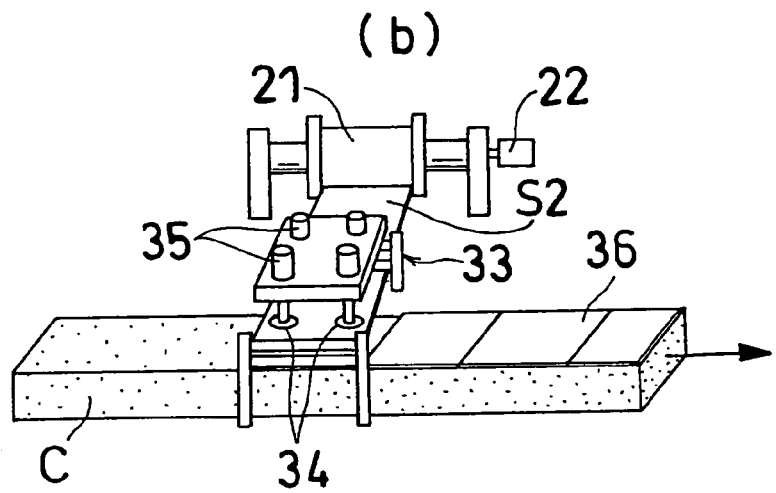
(b)
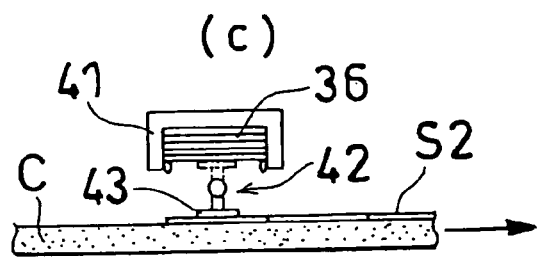
(c)
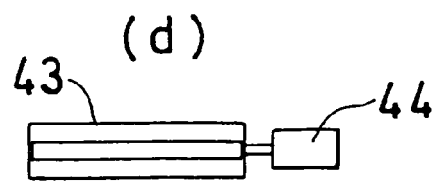
(d)

Fig.9
(a)
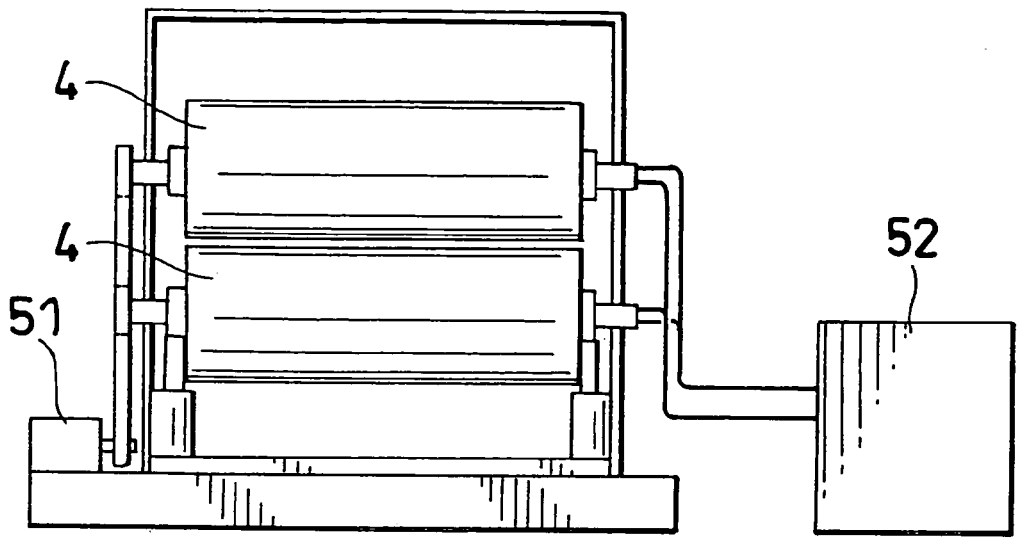
(b)
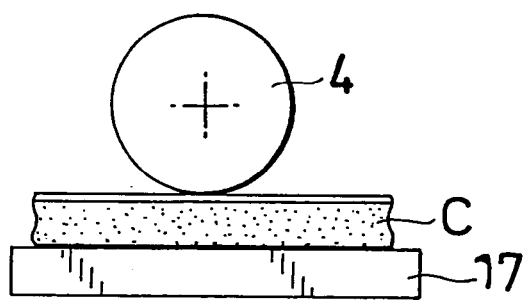
(c) (d) (e)
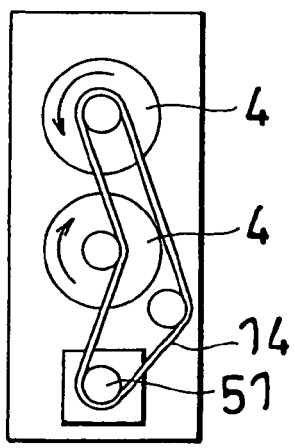 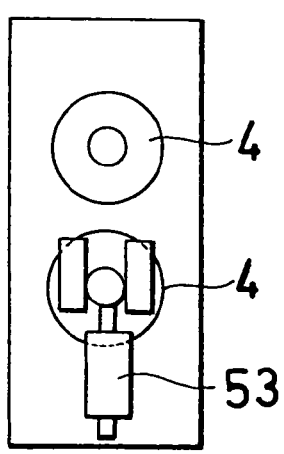 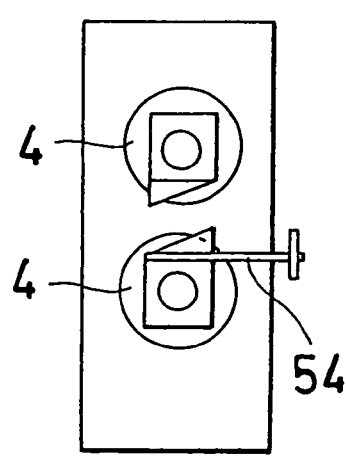

Fig.10
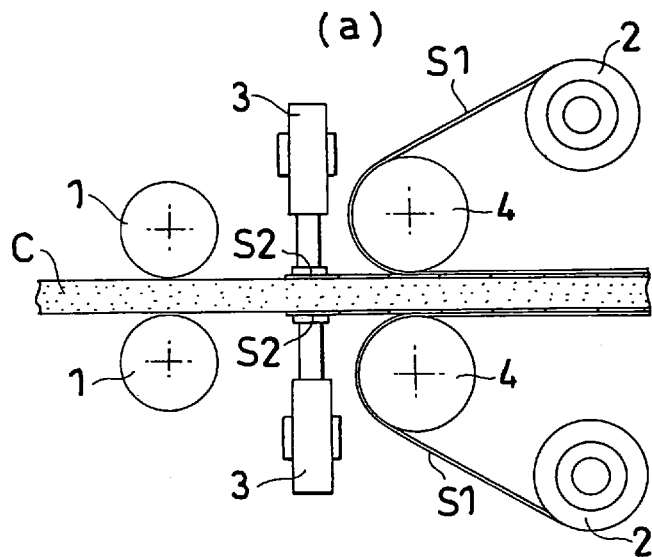
(a)
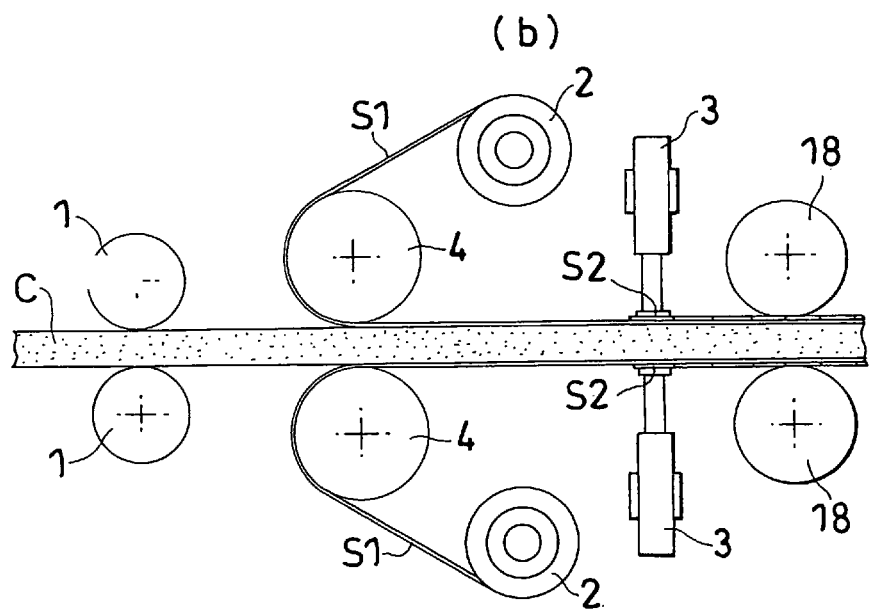
(b)

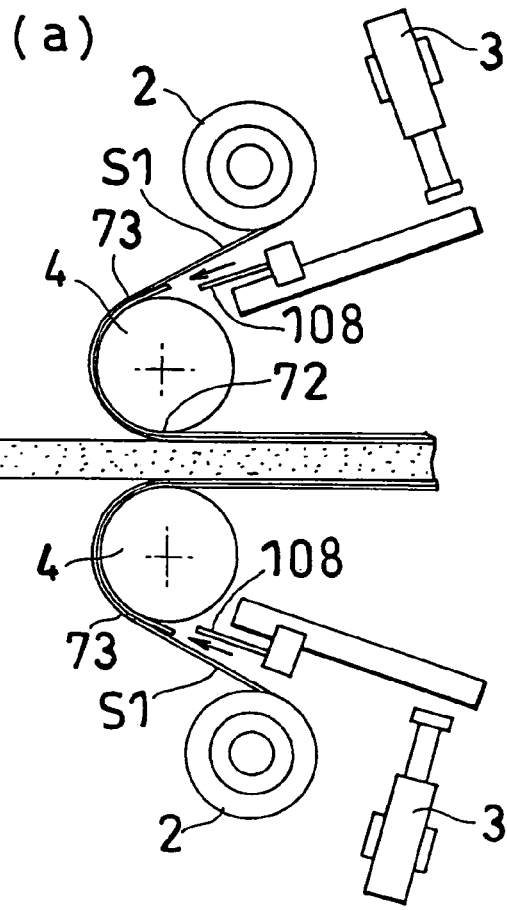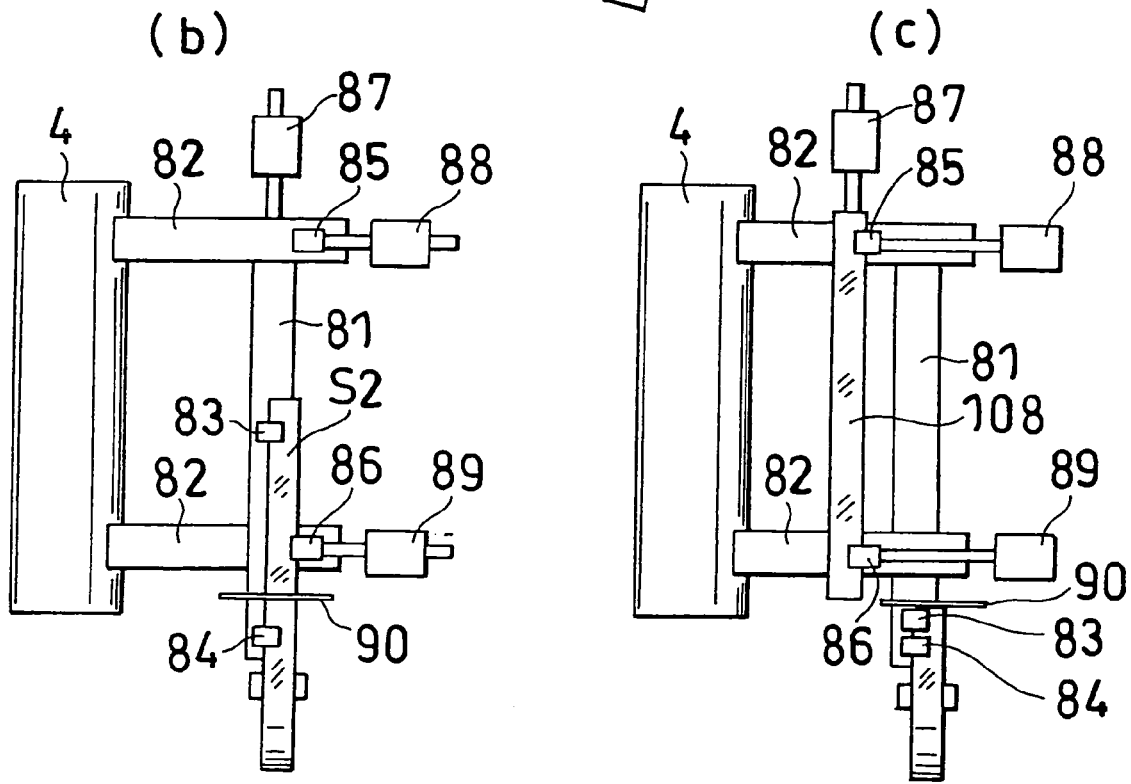
Fig. 15

Fig.18
(a)
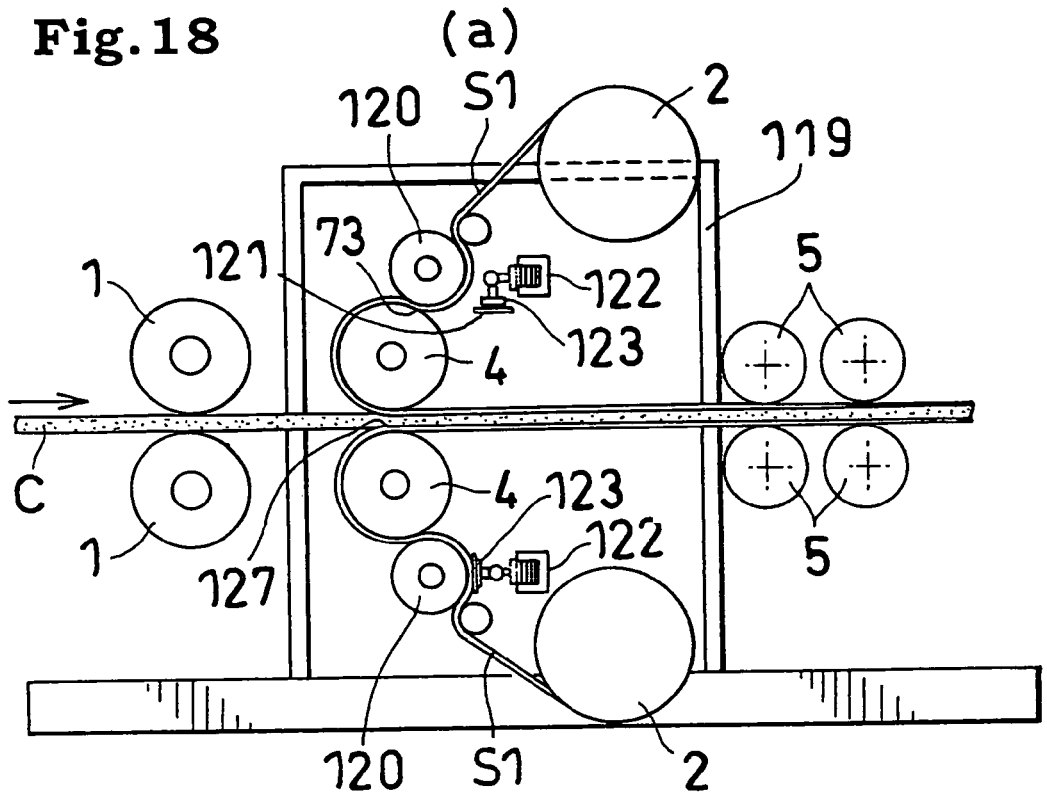
(b)
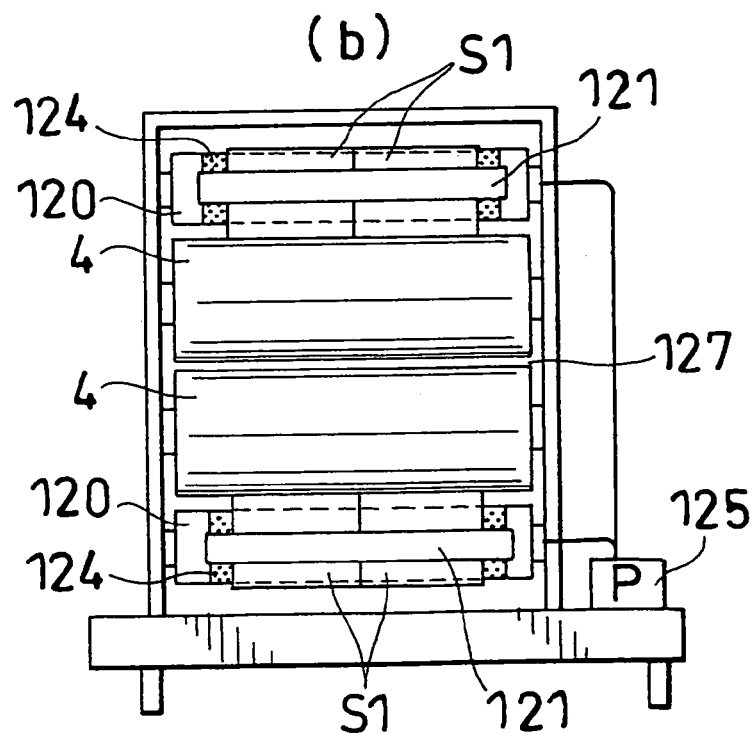

METHOD AND DEVICE FOR PRODUCING LAMINATED COMPOSITE

CROSS REFERENCE TO RELATED APPLICATIONS

The present application of a Divisional Application of the patent application Ser. No. 10/343,380, filed Jan. 31, 2003, now U.S. Pat. No. 7,063,768, which is based on International Application No. PCT/JP02/04008 filed on Apr. 23, 2002, the entire contents of which are incorporated herein by reference.

TECHNICAL FIELD

The present invention relates to a method and a device for producing a laminated composite which is used as a civil engineering and construction material, a construction material including a tatami mat core material, a material for vehicles and so on, and has a high rigidity, and more specifically to a device and a method for producing a laminated composite which is suitable, for example, when a polyolefin resin drawn sheet is laminated on at least one face of a sheet-form core material having a density of 30 to 300 kg/m$^3$, or when a longitudinal sheet and a lateral sheet are laminated on at least one face of a core material.

Throughout the present specification, longitudinal and lateral directions are defined on the basis of the direction of a core material. The term "longitudinal" means the length direction of a core material, and the term "lateral" means the width direction of the core material. A longitudinal sheet means a sheet supplied in the length direction of a core material, and a lateral sheet means a sheet supplied in the width direction of the core material.

BACKGROUND ART

For a civil engineering and construction material, a construction material including a tatami mat core material, a material for vehicles, and the like, the so-called sandwich structure in which a plastic foamed body is used as a light core material and high-strength face materials are laminated on both surfaces thereof, has been actively developed as a material instead of a woody board which has been conventionally used. For example, Japanese Unexamined Patent Publication No. 6-134913 (1994) describes a laminated product wherein a polypropylene foamed body sheet is sandwiched between glass fiber reinforced polypropylene type resin layers, and also describes, as a method for producing the same, a method of heating a glass fiber reinforced polypropylene layer to not less than the melting point thereof to be made into a melting state, stacking this with a surface of a foamed body sheet, adhering them to each other to melt the surface of the foamed body sheet with heat which the polypropylene layer has, thereby melting and adhering the two to each other, and subsequently cooling and solidifying the two so as to be integrated with each other.

The present inventors advanced the development of a sandwich structure as described above. As a result, the inventors suggested a composite lamination wherein a reinforcing face material made of a polyolefin resin drawn sheet drawn up 10 times or more is laminated on a polyolefin resin foamed body sheet (an example of a sheet-form core material having a density of 30 to 300 kg/m$^3$) (Japanese Patent Application No. 2001-13553). This composite lamination has the following advantages as compared with the product described in Japanese Unexamined Patent Publication No. 6-134913 (1994):

Since no glass fiber is used, the lamination is friendly to working environment and friendly to use environment;

Since the material thereof is made only of the polyolefin resin, the lamination can be re-melted or re-worked and can be recycled; and The composite lamination deforms plastically in a certain bending strain area, and the shape thereof is kept.

However, if the reinforcing face material is heated to the melting point thereof or higher in order to attempt the production of this composite lamination by the method described in Japanese Unexamined Patent Publication No. 6-134913 (1994), the drawn orientation of the molecules is lost since the reinforcing face material is made of the polyolefin resin drawn sheet. As a result, desired flexural-rigidity and linear expansion property cannot be obtained.

The laminating described above is usually controlled by laminating-pressure. However, the compression property of the foamed body varies dependently on laminating-temperature; therefore, it is necessary to change the laminating-pressure dependently on the temperature. Furthermore, a problem that the thickness of manufactured product is scattered arises.

In recent years, in the field of house design, attention has been paid to the so-called barrier-free housing, wherein no step is present between a Japanese-style room and a Western-style room, as housing of a compromise type between Japanese and Western styles. However, conventional tatami mats (thick tatami mats) used in Japanese-style rooms have a thickness of approximately 55 mm; therefore, in order to remove a step between a Japanese-style room and a Western-style room using flooring materials for western-style rooms, the main current thickness of which is from approximately 5 to 20 mm, it is necessary to take measures in construction work, for example, lower the ground-beam sleeper of the Japanese-style room or increase the bulk of a floor bed of the Western room. Thus, a problem that construction work becomes much complicated is involved.

In order to cope with the above-mentioned problem, in recent years thin tatami mats having a thickness of approximately 7 to 25 mm have been commercially available instead of the conventional thick tatami mats. The thin tatami mats have advantages that application thereof is easy and exchange between a Japanese-style room and a Western-style room can easily be performed.

The performance required for the tatami mat material for thin tatami mats is that the material has flexural-rigidity even if the material is thin, and the linear expansion coefficient thereof is as small as possible. Specifically, as described in the specification of Japanese Patent Application No. 13-33990 (2001), a tatami mat core material made of a laminated composite satisfying the above-mentioned requirements can be produced by laminating a sheet, for a face material, made of a polyolefin resin drawn sheet having a linear expansion coefficient of 5×10$^{-5}$ (1/° C.) or less on at least one face of a core material made of a polyolefin foamed body sheet in which cells extend in a spindle form in the thickness direction.

In order to exhibit the performance of the above-mentioned laminated composite at maximum, it is preferred to cross sheets for a face material which laminate on a surface of a core material (C) in the longitudinal direction and in the lateral direction, as illustrated in FIG. 4. This is because the face material is composed of longitudinal sheets (S1) and lateral sheets (S2) in an orthogonal form in this way, whereby anisotropy in the longitudinal direction and the lateral direction is cancelled.

In order to laminate sheets for a face material, in a longitudinally and laterally orthogonal-form, beforehand on a core material, it has been necessary in the conventional art to set longitudinal sheets and lateral sheets in an orthogonal form on a surface of the core material and then thermally melt and adhere them with a press or bond them with an adhesive agent. In this method, however, the operation for producing the lamination is intermittent; therefore, the speed of the production is small and a large amount of scrap material is generated and production efficiency is low, thereby resulting in high costs.

In light of the problems in the conventional art, an object of the present invention is to provide a method for producing a composite lamination using no inorganic fiber such as glass fiber without damaging the performance of a polyolefin resin drawn sheet and with a high thickness precision.

In light of the problems in the conventional art, another object of the present invention is to provide a device and a method which make it possible to continuously perform an operation for laminating sheets, for a face material, in a longitudinally and laterally orthogonal form on a core material and to produce a tatami core material made of a laminated composite with a high production efficiency.

DISCLOSURE OF THE INVENTION

The invention is a method for producing a laminated composite by laminating a polyolefin resin drawn sheet on at least one face of a sheet-form core material having a density of 30 to 300 kg/m$^3$, including:

interposing, between the core material and the drawn sheet, a bonding synthetic resin or rubber having a flow starting temperature lower than the thermal deformation temperature of the core material and the melting point of the drawn sheet; heating the synthetic resin or the rubber to not less than the flow starting temperature and not more than the thermal deformation temperature of the core material and the melting point of the drawn sheet before or after the three materials are stacked into a stack product; and pressing the stack product to apply a compression strain of 0.01 to 10% to the core material at the same time of or after the heating.

The invention is a method for producing a laminated composite by laminating a polyolefin resin drawn sheet on at least one face of a sheet-form core material having a density of 30 to 300 kg/m$^3$, including:

interposing, between the core material and the drawn sheet, a sheet or a film made of a bonding synthetic resin or rubber having a flow starting temperature lower than the thermal deformation temperature of the core material and the melting point of the drawn sheet; heating the resultant stack product to not less than the flow starting temperature of the synthetic resin or the rubber and not more than the thermal deformation temperature of the core material and the melting point of the drawn sheet; and pressing the stack product to apply a compression strain of 0.01 to 10% to the core material at the same time of or after the heating.

The invention is a method for producing a laminated composite by laminating a polyolefin resin drawn sheet on at least one face of a sheet-form core material having a density of 30 to 300 kg/m$^3$, including:

coating or impregnating a face to be bonded of the core material and/or the drawn sheet with a bonding synthetic resin or rubber having a flow starting temperature lower than the thermal deformation temperature of the core material and the melting point of the drawn sheet; heating the synthetic resin or the rubber to not less than the flow starting temperature thereof and not more than the thermal deformation temperature of the core material and the melting point of the drawn sheet before or after the core material and the drawn sheet are stacked into a stack product; and pressing the stack product to apply a compression strain of 0.01 to 10% to the core material at the same time of or after the heating.

The invention is a method for producing a laminated composite by laminating a polyolefin resin drawn sheet on at least one face of a sheet-form core material having a density of 30 to 300 kg/m$^3$, including:

coating or impregnating a face to be bonded of the core material and/or the drawn sheet with a bonding synthetic resin or rubber having a flow starting temperature lower than the thermal deformation temperature of the core material and the melting point of the drawn sheet; stacking the core material and the drawn sheet into a stack product so as to contact each other in the coated face or impregnated face; heating the resultant stack product to not less than the flow starting temperature of the synthetic resin or the rubber and not more than the thermal deformation temperature of the core material and the melting point of the drawn sheet; and pressing the stack product to apply a compression strain of 0.01 to 10% to the core material at the same time of or after the heating.

The invention is the method for producing a laminated composite, wherein when the shrinkage starting temperature of the drawn sheet at the time of the heating is lower than the heating temperature at the time of the laminating, the laminating is performed while a tension of 0.1 to 3 kgf/1 cm-width is applied to the sheet in the orientation direction of the sheet.

The invention is the method for producing a laminated composite, wherein the draw magnification of the sheet is from 5 to 40 times.

The invention is the method for producing a laminated composite, wherein the core material is a resin foamed body in which the average of aspect ratios (Dz/Dxy) of cells is from 1.1 to 4.0.

The invention is the method for producing a laminated composite, wherein as the polyolefin resin drawn sheet, there is used a drawn sheet having a face to be bonded being at least locally heated and melted at a temperature higher than the melting point of the resin by 10° C. or more or being roughened.

The invention is a device for producing a laminated composite by laminating a longitudinal sheet and a lateral sheet on at least one face of a core material, including: a core supplying means for supplying the core material in a longitudinal direction; a longitudinal sheet supplying means for supplying the longitudinal sheet for a face material in the longitudinal direction onto at least one face of the core material; a lateral sheet supplying means for supplying the lateral sheet for the face material in a lateral direction onto the upper or lower face of the longitudinal sheet; and a sheet thermocompression-bonding means for pressing the longitudinal sheet and the lateral sheet stacked in an orthogonal form against the core material under heating.

The invention is a method for producing a laminated composite by laminating a longitudinal sheet and a lateral sheet on at least one face of a core material, including: a core supplying step of supplying the core material in a longitudinal direction, a longitudinal sheet supplying step of supplying the longitudinal sheet for a face material in the longitudinal direction onto at least one face of the core material; a lateral sheet supplying step of supplying the lateral sheet for the face material in a lateral direction onto the upper or lower face of the longitudinal sheet; and a sheet thermocompression-bonding step of pressing the longitudinal sheet and the lateral sheet stacked in an orthogonal form against the core material under heating.

The invention is the device for producing a laminated composite, wherein at a position where the longitudinal sheet starts to contact a heating roll of the sheet thermocompression-bonding means the lateral sheet supplying means supplies a cut piece of the lateral sheet between the heating roll and the longitudinal sheet.

The invention is the method for producing a laminated composite, further including: a lateral sheet supplying step of supplying a cut piece of the lateral sheet between a heating roll and the longitudinal sheet at a position where the longitudinal sheet starts to contact the heating roll during the sheet thermocompression-bonding step.

The invention is the device for producing a laminated composite, wherein the longitudinal sheet supplying means is a means for supplying upper side longitudinal sheets and lower side longitudinal sheets to be arranged alternatively in the lateral direction, and the lateral sheet supplying means is a means for supplying plural lateral sheets successively between the upper side longitudinal sheets and the lower side longitudinal sheets so as to be arranged in parallel.

The invention is the method for producing a laminated composite wherein the longitudinal sheet supplying step is a step of supplying upper side longitudinal sheets and lower side longitudinal sheets to be arranged alternatively in the lateral direction, and the lateral sheet supplying step is a step of supplying plural lateral sheets successively between the upper side longitudinal sheets and the lower side longitudinal sheets so as to be arranged in parallel.

The invention is the device for producing a laminated composite, wherein the lateral sheet supplying means includes an attracting roll set at a position where the longitudinal sheet starts to contact the heating roll of the sheet thermocompression-bonding means, and single sheet supplying means for supplying cut pieces of the lateral sheet one by one to the attracting roll.

The invention is the method for producing a laminated composite, wherein the lateral sheet supplying step includes a single sheet supplying step of supplying cut pieces of the lateral sheet one by one to an attracting roll set at a position where the longitudinal sheet starts to contact the heating roll during the sheet thermocompression-bonding step.

The invention is a device producing a laminated composite by laminating a longitudinal sheet and a lateral sheet on at least one face of a core material, including: a core material supplying means for supplying the core material in a longitudinal direction; a longitudinal sheet supplying means for supplying the longitudinal sheet for a face material, in the longitudinal direction, onto at least one face of the core material; a first thermocompression-bonding means for pressing the longitudinal sheet and the core material under heating to form an intermediate lamination; a first cutting means for cutting the intermediate lamination; a carrying means for carrying cut pieces of the intermediate lamination in a direction having a given angle to the longitudinal direction; a lateral sheet supplying means for supplying the lateral sheet for the face material, in the carriage direction, onto the upper face or the lower face of the cut pieces; a second thermocompression-bonding means for pressing the cut pieces of the intermediate lamination and the lateral sheet, which are stacked, under heating to form a final lamination; and a second cutting means for cutting the final lamination.

The invention is a method for producing a laminated composite by laminating a longitudinal sheet and a lateral sheet on at least one face of a core material, including: a core material supplying step of supplying the core material in a longitudinal direction; a longitudinal sheet supplying step of supplying the longitudinal sheet for a face material, in the longitudinal direction, onto at least one face of the core material; a first thermocompression-bonding step of pressing the longitudinal sheet and the core material under heating to form an intermediate lamination; a first cutting step of cutting the intermediate lamination; a carrying step of carrying cut pieces of the intermediate lamination in a direction having a given angle to the longitudinal direction; a lateral sheet supplying step of supplying the lateral sheet for the face material, in the carriage direction, onto the upper face or the lower face of the cut pieces; a second thermocompression-bonding step of stacking and pressing the cut pieces of the intermediate lamination and the lateral sheet under heating to form a final lamination; and a second cutting step of cutting the final lamination.

The invention is a device for producing a laminated composite by laminating a longitudinal sheet and a lateral sheet on at least one face of a core material, including: a core material supplying means for supplying the core material in a longitudinal direction; a longitudinal sheet supplying means for supplying the longitudinal sheet for a face material, in the longitudinal direction, onto at least one face of the core material; a first thermocompression-bonding means for pressing the longitudinal sheet and the core material under heating to form an intermediate lamination; a first cutting means for cutting the intermediate lamination; a carrying means for rotating cut pieces of the intermediate lamination at an angle of 90° to carry the cut pieces in the longitudinal direction; a lateral sheet supplying means for supplying the lateral sheet for the face material, in the longitudinal direction, onto the upper face or the lower face of the cut pieces; a second thermocompression-bonding means for pressing the cut pieces of the intermediate lamination and the lateral sheet, which are stacked, under heating to form a final lamination; and a second cutting means for cutting the final lamination.

The invention is a method for producing a laminated composite by laminating a longitudinal sheet and a lateral sheet on at least one face of a core material, including: a core material supplying step of supplying the core material in a longitudinal direction; a longitudinal sheet supplying step of supplying the longitudinal sheet for a face material, in the longitudinal direction, onto at least one face of the core material; a first thermocompression-bonding step of pressing the longitudinal sheet and the core material under heating to form an intermediate lamination; a first cutting step of cutting the intermediate lamination; a carrying step of rotating cut pieces of the intermediate lamination at an angle of 90° to carry the cut pieces in the longitudinal direction; a lateral sheet supplying step of supplying the lateral sheet for the face material, in the longitudinal direction, onto the upper face or the lower face of the cut pieces; a second thermocompression-bonding step of stacking and pressing the cut pieces of the intermediate lamination and the lateral sheet under heating to form a final lamination; and a second cutting step of cutting the final lamination.

The inventions are carried out as the following embodiments.

First, the sheet-form core material having a density of 30 to 300 $kg/m^3$, which constitutes the composite lamination according to the present invention, will be described.

The sheet-form core material having a density of 30 to 300 $kg/m^3$ is made of, for example, a foamed body obtained by expanding a resin sheet, a hollow body such as plastic corrugated cardboard, or a honeycomb structure.

The reason why the density is from 30 to 300 $kg/m^3$ is that: if the density is over 300 $kg/m^3$, the effect of making the laminated composite light is small; and if the density is less than 30 $kg/m^3$, required strength cannot be obtained.

In general, the thickness of the sheet-form core material is set to 1 to 40 mm. If the thickness is over 40 mm, mechanical properties of the composite lamination lower unfavorably. If the thickness is less than 1 mm, the occupation ratio of the laminated polyolefin sheet becomes large and it cannot be expected to make the laminated composite light. The thickness of the core material is preferably from 3 to 20 mm.

The material used in the formation of the core material is thermoplastic resin, thermosetting resin, paper, metal, or the like.

Examples of the thermoplastic resin include polyolefin resin, polystyrene resin, ABS resin, vinyl chloride resin, vinyl chloride copolymer, vinylidene chloride resin, polyamide resin, polycarbonate resin, polyethylene terephthalate resin, polyimide resin, and polyurethane resin. These may be used alone or in combination of two or more thereof.

Examples of the thermosetting resin include urethane resin, unsaturated polyester resin, epoxy resin, phenol resin, melamine resin, urea resin, diallylphthalate resin, and xylene resin.

The material which makes the honeycomb may be paper or metal such as aluminum besides thermoplastic resin or thermosetting resin.

Among the above-mentioned materials, thermoplastic resin is more preferred as the material of the core material. The core material made of thermoplastic resin is advantageous for recycle since it can be reworked by being remelted. Particularly preferred is a core material made of polyolefin resin. When polyolefin resin is also used as the material of a reinforcing sheet, recycle can be easily attained.

As the core material having a density of 30 to 300 kg/m$^3$, a foamed body made of polyolefin resin is most preferred; therefore, the present invention will be described in detail, giving a polyolefin resin foamed body as an example.

The kind of polyolefin resin is not particularly limited if it is made of a homopolymer of a monomer, or a copolymer. For example, the following can be preferably used: polyethylenes such as low density polyethylene, high density polyethylene, and linear low density polyethylene; polypropylenes such as propylene homopolymer, propylene random polymer, and propylene block polymer; polybutene; and copolymers made mainly of ethylene, such as ethylene-propylene copolymer, ethylene-propylene-diene terpolymer, ethylene-butene copolymer, ethylene-vinyl acetate copolymer, and ethylene-acrylate copolymer. Polyethylene and polypropylene are particularly preferably used. These polyolefin resins may be used alone or in combination of two or more thereof.

The above-mentioned polyolefin resin may be a polyolefin resin composition in which to polyolefin resin is added less than 30% by weight of a resin different therefrom is added. The kind of the different resin is not particularly limited, and examples thereof include polystyrene and styrene type elastomers. These different resins may be used alone or in combination of two or more thereof.

If the amount of the different resin added to polyolefin resin is 30% by weight or more, superior properties that polyolefin resin has, such as lightness, chemical resistance, flexibility, and elasticity, may be damaged. It may be difficult to ensure melting viscosity necessary when the composition foams.

Furthermore, the above-mentioned polyolefin resin may be a polyolefin resin composition to which a modifying monomer is added. The kind of the modifying monomer is not particularly limited, and examples thereof include dioxime compounds, bismaleimide compounds, divinylbenzene, allyl-based polyfunctional monomers, (meth)acrylicpolyfunctional monomers, and quinine compounds. These modifying monomers may be used alone or in combination of two or more thereof.

In general, polyolefin resin has a low elasticity modulus. When the resin is made up to a foamed body, the foamed body has a low compression elasticity modulus, and is weak for the core material of a laminated composite. Therefore, the resin has a problem that the expansion ratio thereof cannot be raised to a necessary value. However, this problem can be solved by orienting the shape of foams in the foamed body into a spindle shape along the thickness direction. Specifically, the average value of the aspect ratios (Dz/Dxy) of cells (foams) is from 1.1 to 4.0, preferably from 1.3 to 2.5.

FIG. 1(a) is a perspective view illustrating a foamed body sheet as a sheet-form core material, and FIG. 1(b) is an enlarged view of an A portion in FIG. 1(a). The average value of the aspect ratios (Dz/Dxy) means the number (arithmetic) average of the ratios between the maximum diameters in given directions of cells (204) inside a foamed body sheet (201), and can be measured by a method described below.

Method of Measuring the Average Value of the Aspect Ratios (Dz/Dxy):

An enlarged photograph is taken of an arbitrary section (201a) parallel to the sheet thickness direction (called the z direction) of the foamed body sheet (201) with 10 magnifications. Approximately 50 or more cells (204) selected at random, the decided-direction maximum diameters thereof are measured in two directions described below. The number (arithmetic) average of the respective aspect ratios (Dz/Dxy) is calculated.

Dz: the maximum diameter parallel to the Z direction of the cells (204) in the foamed body sheet (201), and Dxy: the maximum diameter parallel to the plane direction (called the xy direction) perpendicular to the z direction of the cells (204) in the foamed body sheet (201) (for example, the sheet width direction or the sheet length direction).

By setting the average value of the aspect ratios (Dz/Dxy) to 1.1 to 4.0 (preferably, 1.3 to 2.5), the cells (204) in the foamed body sheet (201) become spindle-shaped cells (204) having a long axis along the thickness direction of the foamed body sheet (201). Accordingly, in the case that the foamed body sheet (201) receives compressive force in the thickness direction, the compressive force is applied to the spindle-shaped cells (204) along the long axis thereof. Therefore, the foamed body sheet (201) can exhibit a high compressive strength (compressive elasticity module) in the thickness direction.

If the average value of the aspect ratios (Dz/Dxy) is less than 1.1, the shape of the cells (204) becomes spherical so that the effect of improving the compressive strength (compressive elasticity module) resulting from the spindle-shaped cells (204) cannot be sufficiently obtained. Therefore, the flexural-rigidity of the composite lamination, which is a target of the present invention, gets small. Contrarily, if the average value of the aspect ratios (Dz/Dxy) is more than 4.0, the foaming resin receives a considerable quantity of extension strain only in the z direction so that the control of foaming becomes difficult. As a result, a homogeneous foamed body sheet is not easily produced.

The density of the foamed body sheet is preferably from 30 to 300 kg/m$^3$. If the density exceeds 300 kg/m$^3$, the weight of the target composite lamination gets large and the cost thereof becomes high. Thus, the practicability thereof deteriorates. Contrarily, if the density of the foamed body sheet is less than 30 kg/m$^3$, the thickness of the cell walls gets small so that the compressive force (compressive elasticity modulus) becomes insufficient.

Method of Measuring the Density:

A sample is cutout from the foamed body sheet with a cutter, and then the weight of the sample is measured.

Next, the volume thereof is measured with a buoyancy gauge, and the density is calculated on the basis of the weight/the volume.

The method for producing a foamed body sheet having spindle-shaped cells as described above is not particularly limited. From the standpoint of recycle ability and productivity, the following method can be preferably used.

In general, a foamed body made of a polyolefin resin composition is roughly classified into a foamed body obtained by a chemically foaming method and a foamed body obtained by a physical foaming method. In the present invention, any one of the two foamed bodies may be used. Preferably, the foamed body obtained by a chemically foaming method, which is easy in foaming operation thereof, is used.

The foamed body sheet by a chemically foaming method can be produced by dispersing a thermolysis type chemically foaming agent, which generates decomposition gas by heating, in the polyolefin resin composition beforehand, shaping the same composition once into a sheet-form foaming original fiber, and subsequently heating the fiber to cause the polyolefin resin composition to foam by gas generated from the foaming agent.

The kind of the thermolysis type chemically foaming agent is not particularly limited. For example, the following is preferably used: azodicarbonic amide (ADCA), benzenesulfonylhydrazide, dinitrosopentamethylenetetramine, toluenesulfonylhydrazide, 4,4-oxybis(benzenesulfonylhydrazide) or the like. Among these compounds, ADCA is more preferred. These thermolysis type chemically foaming agents may be used alone or in combination of two or more thereof.

The foamed body sheet by a physical foaming method can be produced by dissolving a physically foaming agent once in the polyolefin resin composition under a high pressure, and causing the polyolefin resin composition to foam by gas generated when the temperature of the same composition is returned to ambient temperature.

The kind of the physically foaming agent is not particularly limited. For example, water, carbon dioxide, nitrogen, an organic solvent or the like is preferably used. These physically foaming agents may be used alone or in combination of two or more thereof.

Specific methods for producing the foamed body sheet are as follows. To 100 parts by weight of a modified polyolefin resin component obtained by melting and kneading the polyolefin resin as a main component, the above-mentioned modifying monomer, and the different resin are added 2 to 20 parts by weight of the above-mentioned thermolysis type chemically foaming agent, and then the respective components are dispersed. The composition is once shaped into a sheet-form to produce a foaming sheet. Thereafter, this foaming sheet is heated to a temperature not less than the decomposition temperature of the thermolysis type chemically foaming agent so as to cause the sheet to foam. By adopting this method, a desired foamed body sheet can be formed.

By modifying the polyolefin resin with the modifying monomer, the shaped foaming sheet can foam under normal pressure although the sheet has a low crosslinking degree. The crosslinking degree referred to herein means a gel fraction. The term "the crosslinking degree is low" means that the gel fraction is 25% or less by weight. The gel fraction can be obtained as a percentage of the dry weight of a non-dissolved fraction (a gel fraction) after a sample is dissolved in hot xylene of 120° C. temperature for 24 hours in the initial weight of the sample.

The above-mentioned foaming sheet has a lower crosslinking degree (gel fraction) as compared with crosslink sheets crosslinked by electron rays or crosslink sheets crosslinked by a thermolysis type chemically crosslinking agent. Moreover, the above-mentioned foaming sheet foams under normal pressure by heating. Therefore, cells in the foamed body get larger and have a larger wall than cells in the foamed body obtained from the crosslink sheet. Consequently, the above-mentioned foamed body sheet is superior in mechanical properties such as compressive force and buckling resistance.

Since the foamed body sheet has a small crosslinking degree, the sheet can be remelted by being heated. Thus, the sheet is rich in recycle ability. This makes it possible to use the material of the sheet again or apply the material to some other purpose.

The method for shaping the foaming sheet is not particularly limited, and may be any one of shaping methods which are generally performed to shape plastic, such as extrusion, press forming, blow molding, calendaring forming and injection molding. Particularly preferred is an extrusion method of shaping a polyolefin resin composition extruded from, for example, a screw extruder directly into a sheet-form since the method is superior in productivity. This method makes it possible to obtain a continuous foaming sheet having a constant width.

The method of producing a foamed body sheet by the chemically foaming method from the foaming sheet is usually performed within the temperature range from a temperature not less than the decomposition temperature of the thermolysis type chemically foaming agent to a temperature less than the thermal decomposition temperature of the polyolefin resin.

The above-mentioned foaming is preferably performed using a continuous system foaming machine. The method of performing the foaming using a continuous system foaming machine is not particularly limited. Examples thereof include a method using a pulling-in type foaming machine, which causes the foaming sheet to foam continuously while the foaming sheet is pulled in at the side of an outlet of a heating furnace, a belt type foaming machine, a vertical type or horizontal type foaming furnace, or a hot-wind thermostat; and a method of causing foaming in a hot bath such as an oil bath, a metal bath or a salt bath.

The method of setting the average value of the aspect ratios (Dz/Dxy) of the thus-obtained foamed body sheet to 1.1 to 4.0 is not particularly limited. Preferred is, for example, a method of laminating, on at least one face of the foaming sheet which has not yet foamed, a face material having such a strength that the foaming strength in the plane direction (the xy direction) of the foaming sheet, when it foams, can be suppressed.

By laminating the above-mentioned face material on at least one face of the foaming sheet which has not yet foamed, foaming in the two-dimensional direction (the xy direction) in the plane of the foaming sheet is suppressed when the sheet foams. As a result, foaming can be caused only in the thickness direction (the z direction). The cells inside the resultant foamed body sheet become spindle-shaped cells having a long axis oriented in the thickness direction.

The kind of the face material is not particularly limited if it can resist temperatures not less than the foaming temperature of the foaming sheet, that is, temperatures not less than the melting point of the polyolefin resin and temperatures not less than the decomposition temperature of the thermolysis type chemically foaming agent. For example, the following is preferably used: paper, cloth, wood, iron, nonferrous metal, woven fabric or nonwoven fabric made of organic fiber or inorganic fiber, cheesecloth, glass fiber, carbon fiber, or a polyolefin resin drawn sheet, which will be described later. The foamed body sheet may be obtained by using a sheet having releasing ability, such as a Teflon sheet, as the face material, causing the foaming sheet to foam in the thickness direction and subsequently stripping the releasing sheet.

However, when the face material made of a material other than the polyolefin resin is used, the use amount thereof is preferably made as small as possible from the viewpoint of recycle ability.

Among the above-mentioned face materials, nonwoven cloth or cheesecloth is more preferably used, which is superior in anchor effect when the polyolefin resin drawn sheet is laminated and hardly produces a bad effect on the human body or environment.

The following will describe the polyolefin resin drawn sheet (referred to as the drawn sheet hereinafter) used in the present invention.

The kind of the polyolefin resin used for the production of the drawn sheet is not particularly limited. Examples thereof include polyethylenes such as low density polyethylene, high density polyethylene, and linear low density polyethylene; and polypropylenes such as propylene homopolymer, propylene random polymer, and propylene block polymer. In particular, polyethylene having a high theoretical elasticity modulus is more preferably used in light of the elasticity modulus thereof after it is drawn. High density polyethylene having a high crystallinity is most preferably used. These polyolefin resins may be used alone or in combination of two or more thereof.

The weight average molecular weight of the polyolefin resin for producing the drawn sheet is not particularly limited, and is preferably from 100000 to 500000. If the weight average molecular weight of the polyolefin resin is less than 100000, the polyolefin resin itself gets brittle so that the drawing ability may be damaged. Contrarily, if the weight average molecular weight of the polyolefin resin exceeds 500000, the drawing ability deteriorates so that the drawn sheet may not be easily shaped or drawing with a high ratio may not be easily performed.

The method of measuring the weight average molecular weight is generally the so-called gel permeation chromatography (high-temperature GPC), wherein the polyolefin resin is dissolved in a heated organic solvent such as o-dichlorobenzene, the solution is poured into a column, and then the elution time thereof is measured. The above-mentioned weight average molecular weight is also a value measured by the high-temperature GPC using o-dichlorobenzene as the organic solvent.

The melt flow rate (MFR) of the polyolefin resin for producing the drawn sheet is not particularly limited, and is preferably from 0.1 to 20 g/10 minutes. If the MFR of the polyolefin resin is less than 0.1 g/10 minutes or exceeds 20 g/10 minutes, drawing with a high ratio may become difficult. The MFR is measured according to JIS K-7210 Flow Test of Thermoplastic.

As the polyolefin resin for producing the drawn sheet, there is particularly preferably used a high density polyethylene having a weight average molecular weight of 100000 to 500000 and an MFR of 0.1 to 20 g/10 minutes.

If necessary, it is allowable to add, to the inside of the drawn sheet, a crosslinking auxiliary, a radical photopolymerization initiator, or the like besides the polyolefin resin, which is a main component, as far as the attainment of the objects of the present invention are not disturbed.

Examples of the crosslinking auxiliary include polyfunctional monomers such as triallyl cyanurate, trimethylolpropane triacrylate and diallylphthalate. Examples of the radical photopolymerization initiator include benzophenone, thioxanthone and acetophenone. These crosslinking auxiliaries or the radical photopolymerization initiators may be used alone or in combination of two or more thereof.

The added amount of the crosslinking auxiliary or the radical photopolymerization is not particularly limited. Preferably, the added amount of the crosslinking auxiliary or the radical photopolymerization is from 1 to 2 parts by weight per 100 parts by weight of the polyolefin resin. If the added amount of the crosslinking auxiliary or the radical photopolymerization thereof is less than 1 part by weight per 100 parts by weight of the polyolefin resin, the crosslinking of the polyolefin resin or the radical photopolymerization may not advance promptly. Contrarily, if the added amount of the crosslinking auxiliary or the radical photopolymerization exceeds 2 parts by weight per 100 parts by weight of the polyolefin resin, drawing with a high ratio may become difficult.

The method of forming the drawn sheet is not particularly limited. For example, a non-drawn sheet (drawing original fabric) is first formed by following: melting and kneading a polyolefin resin composition comprising the polyolefin resin as a main component, and the crosslinking auxiliary and the radical photopolymerization, which are optionally added, with an extruder or the like so as to be made plastic; extruding the melted product into a sheet-form through a T die; and cooling the extruded product.

The thickness of the non-drawn sheet is not particularly limited, and is preferably from 0.5 to 10 mm. If the thickness of the non-drawn sheet is less than 0.5 mm, a drawn sheet obtained by subjecting the non-drawn sheet to drawing treatment becomes tooth in so that the strength thereof becomes insufficient. Thus, the handling performance thereof may be damaged. Contrarily, if the thickness of the non-drawn sheet exceeds 10 mm, drawing treatment may become difficult.

Next, the non-drawn sheet is subjected to drawing treatment to produce a drawn sheet.

It is advisable that the draw magnification when the drawing treatment is performed is set in such a manner that the tensile elasticity of the drawn sheet will be 5 GPa or more. The draw magnification is preferably from 5 to 40 times, more preferably from 10 to 40 times, and still more preferably from 20 to 40 times. If the drawn ratio is less than 5 times, the tensile elasticity of the drawn sheet lowers regardless of the kind of the polyolefin resin or the average linear expansion coefficient thereof, which will be described later, gets small. As a result, a desired flexural-rigidity or dimensional stability is not obtained in a target laminated composite. Contrarily, if the drawn ratio is more than 40 times, it may be difficult to control the drawing.

The width of the drawn sheet may be basically arbitrary. However, if the width is too small, it is necessary to arrange many sheets when a plane is formed. Thus, the process becomes complicated and productivity deteriorates. Accordingly, the width of the drawn sheet is preferably 10 mm or more, more preferably 50 mm or more, and still more preferably 100 mm or more.

The drawing temperature when the drawing treatment is performed is not particularly limited, and is preferably from 85 to 120° C. If the drawing temperature is less than 85° C., the drawn sheet is easily whitened and drawing with a high ratio may become difficult. Contrarily, if the drawing temperature exceeds 120° C., the non-drawn sheet is easily cut or drawing with a high ratio may become difficult.

The drawing method is not particularly limited, and may be a conventional monoaxially drawing method. A roll drawing method is particularly preferred.

The roll drawing method is a method of sandwiching the non-drawn sheet between two pairs of drawing rolls, the speed of the pairs being different, and then pulling the non-drawn sheet while being heated. The sheet can be molecule-oriented only in a monoaxially drawing direction. In this case, the speed ratio between the two pairs becomes equal to the drawn ratio.

In the case that the thickness of the non-drawn sheet is relatively large, it may be difficult that smooth drawing is performed only by the roll drawing method. In such a case, rolling treatment may be performed before the roll drawing.

The rolling treatment is performed by inserting, between a pair of reduction rolls which rotate in opposite directions, the non-drawn sheet having a thickness larger than the gap between the reduction rolls to reduce the thickness of the non-drawn sheet and extent the sheet in the long direction. Since the non-drawn sheet subjected to the rolling treatment is beforehand oriented in the monoaxial direction, the sheet is smoothly drawn in the monoaxial direction by roll drawing in the next step.

In the drawing step, in order to make the drawing temperature within a preferred range (85 to 120° C.), it is advisable to adjust appropriately the pre-heating temperature of the non-drawn sheet, the temperature of the drawing roll, the temperature of atmosphere, and the like.

In order to improve the heat resistance of the thus-obtained drawn sheet or the heat resistance or the creep resistance of a composite lamination to be finally obtained, crosslinking treatment may be performed.

The kind of the crosslinking treatment is not particularly limited. For example, the treatment can be performed by electron beam radiation or ultraviolet ray radiation.

The quantity of the electron beam radiation in the case that the crosslinking treatment is performed by the electron beam radiation may be appropriately set, considering the composition or the thickness of the drawn sheet, or the like. The quantity is not particularly limited, and is generally from 1 to 20 Mrad, more preferably from 3 to 10 Mrad. In the case of the crosslinking treatment by electron beam radiation, the crosslinking can be smoothly preformed by adding the crosslinking auxiliary to the inside of the drawn sheet beforehand.

The quantity of the ultraviolet ray radiation in the case that the crosslinking treatment is performed by ultraviolet ray radiation may be appropriately set, considering the composition or the thickness of the drawn sheet, or the like. The quantity is not particularly limited, and is generally from 50 to 800 mW/cm$^2$, more preferably from 100 to 500 mW/cm$^2$. In the case of the crosslinking treatment by ultraviolet ray radiation, the crosslinking can be smoothly preformed by adding the radical photopolymerization initiator or the crosslinking auxiliary to the inside of the drawn sheet beforehand.

The degree of the crosslinking of the drawn sheet is not particularly limited, and the above-mentioned gel fraction is preferably from approximately 50 to 90% by weight.

Since the drawn sheet is a sheet drawn 5 times or more, the degree of thermal stretch and shrinkage to temperature change becomes small. Therefore, by laminating this drawn sheet on the foamed body sheet, the drawn sheet suppresses thermal stretch and shrinkage of the foamed body sheet-so that dimensional stability against temperature can be kept in the target composite lamination.

One of the numerical values for indicating the degree of the thermal stretch and shrinkage is an average linear expansion coefficient.

The drawn sheet used in the present invention is a sheet having an average linear expansion coefficient of $5\times10^{-5}/°$ C. or less, preferably $3\times10^{-5}/°$ C. or less, and still more preferably from $-2\times10^{-5}$ to $2\times10^{-5}/°$ C.

The average linear expansion coefficient is an index indicating the rate of expansion of the dimension of an object on basis of temperature. There is a method in which the dimension of an object whose temperature is rising is accurately measured in sequence by TMA (mechanical analysis) in order to measure the average linear expansion coefficient. However, the dimensions of the drawn sheet at 5° C. and 80° C. are measured and the average linear expansion coefficient can be calculated from the difference therebetween.

In general, the average linear expansion coefficient of an object made of the polyolefin resin is larger than $5\times10^{-5}/°$ C. However, by subjecting the resin to drawing treatment, a drawn sheet having an average linear expansion coefficient of $5\times10^{-5}/°$ C. or less can be obtained. As the drawn ratio of this drawn sheet is made larger, the average linear expansion coefficient thereof is lower.

About the foamed body sheet, the average linear expansion coefficient of the polyolefin resin sheet, which makes by itself up to the sheet, is from approximately $5\times10^{-5}$ to $15\times10^{-5}/°$ C. Thus, the foamed body sheet has a problem that a dimensional change based on thermal shrinkage is large. However, by lamination, on at least one face thereof, the above-mentioned drawn sheet having an average linear expansion coefficient of $5\times10^{-5}/°$ C. or less, a laminated composite which has a small average linear expansion coefficient and does not cause any dimensional change based on thermal shrinkage easily can be obtained.

Since the drawn ratio of the above-mentioned drawn sheet is made large to set the average linear expansion coefficient thereof to $5\times10^{-5}/°$ C. or less, the tensile strength (tensile elasticity) in the drawing direction also becomes large. Thus, the flexural-strength (bend elastic constant) of the composite lamination wherein the above-mentioned drawn sheet is laminated on at least one face of the above-mentioned foamed body sheet is drastically improved. Thus, a synergetic effect is generated.

In the invention, the heating of the bonding synthetic resin or rubber may be performed before or after this is interposed between the core material and the drawn sheet. For example, only the synthetic resin or the rubber is heated and melted with an extruder or the like without heating the core material nor the drawn sheet, and this is interposed between the core material and the drawn sheet. Thereafter, this stack product may be pressed to adhere the layers therein to each other. In the invention, before heating and laminating the core material and the drawn sheet, the sheet or the film made of the bonding synthetic resin or rubber, preferably the synthetic resin film, is interposed between the core material and the drawn sheet.

If the synthetic resin film is used, the lamination of the core material/the synthetic resin film/the drawn sheet can easily be obtained. The method of interposing the sheet or the film made of the synthetic resin or the rubber between the core material and the drawn sheet is not particularly limited, and may be according to a batch system or a continuous system.

Before heating and pressing the core material and the drawn sheet, the bonding face(s) of the core material and/or the drawn sheet is/are beforehand coated or impregnated with the bonding synthetic resin or rubber. The heating of the synthetic resin or the rubber may be performed before stacking them.

By this coating or impregnating treatment, the heating and pressing of the core material and the drawn sheet can be performed at a lower pressure for a short time.

The method of coating the core material with the synthetic resin or the rubber is not particularly limited, and may be a generally-used method. Examples thereof include a method of using a screw extruder or the like to heat the synthetic resin or the rubber to a temperature not less than the flow starting temperature thereof so as to be melted, and subsequently roll-coating the core material with the resultant melted product or lining the core material with the resultant product by means of a crosshead die; and a method of compression-bonding a film or a sheet made of the synthetic resin or the rubber to the core material while heating the film or the sheet at a temperature not less than the flow starting temperature thereof and a temperature not more than the thermal deformation temperature thereof.

The thermal deformation temperature referred to herein means a temperature measured by the method described in ASTM D648 (method of applying a given load to a sample, and obtaining a temperature showing a given change when temperature is raised at a constant rate). The flow starting temperature means, in the case of crystalline resin, the melting point thereof, and means, in the case of non-crystalline resin, the glass transition temperature thereof.

The method of impregnating the core material with the synthetic resin or the rubber is not particularly limited. As described above, when the core material is formed, a face material such as nonwoven fabric or cheesecloth is used in many cases. A film or a sheet made of the synthetic fiber or the rubber is beforehand compression-bonded to this plate-material while the film or the sheet is heated at a temperature not less than the flow starting temperature thereof. This face material is then compression-bonded to the core material while this face material is heated at a temperature not less than the flow starting temperature of the synthetic resin or the rubber and not more than the thermal deformation temperature of the core material. In this way, the core material with the face material impregnated homogeneously with the synthetic resin or the rubber can be obtained. As described above, a film or a sheet made of the synthetic resin or the rubber may be thermocompression-bonded to the face material of the core material with the face material.

The method of impregnating the drawn sheet with the synthetic resin or the rubber is not particularly limited. For example, by laminating a face material, such as nonwoven fabric or cheesecloth, having a large anchor effect, and then compression-bonding a film or sheet made of the synthetic resin or the rubber to the drawn sheet while heating the film or the sheet at a temperature not less than the flow starting temperature thereof, the drawn sheet with the face material impregnated homogenously with the synthetic resin or the rubber can be obtained. It is also allowable to thermocompression-bond a film or a sheet made of the synthetic resin or the rubber to the face material beforehand, as described above, and thermocompression-bond this face material to the drawn sheet.

By using the face material having a large anchor effect in this way, it is easy to be impregnated with the synthetic resin or the rubber. As a result, the bonding strength with the polyolefin resin drawn sheet can be made high.

In the polyolefin resin drawn sheet, there is used a drawn sheet whose face to be bonded is at least locally heated and melted at a temperature higher than the melting point of the resin by 10° C. or more or is roughened.

Since the polyolefin resin drawn sheet has a highly-oriented fibrous structure, its surface layer is subjected to melting treatment in such a manner that the fibrous structure is cancelled in the surface layer without damaging the strength of the drawn sheet, in order to improve the bonding property of the synthetic resin or the rubber, which will be described later.

In order to melt the surface layer of at least one face of the polyolefin resin drawn sheet, for example, the drawn sheet is passed between a first roll having a surface temperature being kept at a temperature higher than the melting point of the polyolefin resin of the drawn sheet by +10° C. or higher and a second roll whose surface temperature is kept at a temperature lower than the melting point of the polyolefin resin while the drawn sheet is brought into contact with the rolls. The melting of the surface layer means melting of only the surface layer of the drawn sheet. Considering the maintenance of mechanical strength, the surface layer portion is preferably a portion of 1 to 10% of the total thickness. By the melting of the surface layer, the fibrous structure in the surface layer is cancelled.

The melting treatment is subjected to at least one face of the drawn sheet. In the drawn sheet wherein only one face thereof is melted, the melted face exhibits a good bonding property to the synthetic resin or the rubber. In the drawn sheet wherein two faces thereof are melted, both the faces exhibit a heightened bonding property or melting/bonding property to the synthetic resin or the rubber.

The surface temperature of the first roll is set to a temperature higher than the melting point of the polyolefin resin of the drawn sheet by 10° C. or more. This temperature is preferably is selected from the range of 10° C. higher than the melting point to 100° C. higher than the melting point, more preferably the range of 30° C. higher than the melting point to 60° C. higher than the melting point. In the case of temperatures less than a temperature 10° C. higher than the melting point, the fibrous structure in the surface layer is not sufficiently cancelled by the melting treatment. Thus, effects of improving the bonding property and melting property cannot be sufficiently obtained. In the case of temperature of 100° C. or more higher than the melting point, it is feared that the polyolefin resin drawn sheet is melted and bonded to the first roll.

As described above, the surface temperature of the second roll is set to a temperature not more than the melting point of the polyolefin resin, and is preferably controlled in the range of 0° C. to the melting point of the polyolefin resin, more preferably in the range of 50° C. to 100° C. If the surface temperature of the second roll is more than the melting point of the polyolefin resin, the cooling effect based on the second roll is insufficient. Thus, it is feared that physical properties of the polyolefin resin drawn sheet drop. If the surface temperature of the second roll is lower than 0° C., water content condensates and adheres onto the roll so that proper roll processing may become difficult.

The melting point of the polyolefin resin is measured by thermal analysis such as differential scanning calorimeter (DSC), and means the maximum value of endothermic peaks which follow crystal melting.

The polyolefin resin drawn sheet may be a sheet whose face to be bonded is roughened. By the roughening, the bonding property to the synthetic resin or the rubber is improved and the above-mentioned coating or impregnation is easily attained. The method of the roughening is not particularly limited, and examples thereof include embossing means such as sandblasting.

The degree of fine irregularities formed by roughening the surface of the drawn sheet, which is represented as central line average roughness (Ra) according to JIS B 0601, is preferably 0.5 μm or more. If the Ra is less than 0.5 μm, the roughening effect may not be sufficiently obtained.

Another method of reforming the surface is a method of performing corona treatment to cause the surface to have polarity and bonding property.

By melting or roughening the polyolefin resin drawn sheet as described above, a large number of the drawn sheets can be laminated through the synthetic resin or the rubber.

Examples of the bonding synthetic resin or rubber used in the present invention include thermoplastic resins, thermoplastic elastomers and rubbery polymers having a flow starting temperature lower than the thermal deformation temperature of the core material and the melting point of the polyolefin resin constituting the drawn sheet. By using the synthetic resin or the rubber having such a characteristic, only the synthetic resin or the rubber can be caused to start flowing at a temperature at which the core material does not deform thermally and the drawn sheet does not melt. Without damaging performances such as flexural-rigidity and dimensional stability, a good bonding strength can be obtained. When a lower value between the thermal deformation temperature of the core material and the melting point of the polyolefin resin constituting the drawn sheet is represented by $Tm_{lower}°$ C., the flow starting temperature of the synthetic resin or the rubber is preferably $(Tm_{lower}-5)°$ C. or less, more preferably $(Tm_{lower}-10)°$ C. or less.

The kind of the synthetic resin or the rubber used in the present invention is not particularly limited if it satisfies the above-mentioned requirements. Examples thereof include compounds described below.

○ Polyolefin Resins

Polyethylene (PE): very low density polyethylene (VLDP), low density polyethylene (LDPE), linear low density polyethylene (LLDPE), middle density polyethylene (MDPE), and high density polyethylene (HDPE), Polypropylene (PP): homo type polypropylene, random type polypropylene, and block type polypropylene, Polybutene, Ethylene-vinyl acetate (EVA), Ionomer: metal salts of ethylene-(meth) acrylic acid copolymer Ethylene-(meth)acrylic copolymer: ethylene-acrylic acid copolymer (EAA), ethylene-ethyl acrylate copolymer (EEA), ethylene-methacrylic acid copolymer (EMAA), and ethylene-methyl methacrylate copolymer (EMMA), Modified polyolefin: maleic acid modified polyethylene, maleic acid modified polypropylene, silane modified polyethylene and silane modified polypropylene, and Chlorinated polyethylene.

○ Other resins

Bonding polyester resins, and

Polystyrene.

○ Thermosplastic elastomers

Styrene-based elastomer:

polystyrene-polybutadiene-polystyrene (SBS), polystyrene-polyisoprene-polystyrene (SIS), polystyrene-poly(ethylene-butylene)-polystyrene (SEBS), and polystyrene-poly(ethylene-propylene)-polystyrene, Vinyl chloride based elastomer, Polyolefin based elastomer: ethylene-propylene rubber (EPR), and ethylene-propylene-diene terpolymer (EPDM), and Thermoplastic polyurethane.

○ Rubbery polymers

Natural rubber (NR), isoprenerubber (IR), styrene rubber (SBR), nitrile rubber (NBR), chloroprene rubber (CR), butadiene rubber (BR), butyl rubber (IIR), chlorosulfonated polyethylene, and polyisobutylene (PIB).

Among these examples, polyolefin based resin, polyolefin based elastomer or styrene based elastomer is preferably used as a compound having a good bonding property to the core material and the drawn sheet made of the polyolefin resin. In particular, polyolefin base resin is more preferably used.

Polyolefin based elastomer or styrene based elastomer is preferably used as a compound having a good bonding property to the core material and the drawn sheet made of a resin other than the polyolefin resin. In particular, polyolefin based elastomer is more preferably used.

The thickness of the sheet or the film made of the synthetic resin or the rubber and the thickness of the coating layer of the synthetic resin or the rubber are appropriately decided, considering bonding property thereof. Usually, the thickness is from approximately 5 μm to 2 mm. If the thickness is less than 5 μm, the bonding property deteriorates. If the thickness exceeds 2 mm, the bending and shear strength drop.

In the invention, the synthetic resin or the rubber is heated, or the lamination of the core material/the synthetic resin or the rubber/the drawn sheet is heated. In the invention, the lamination of the core material/the sheet or the film made of the synthetic resin or the rubber/the drawn sheet is heated. In the invention, the core material and/or the drawn sheet coated or impregnated with the synthetic resin or the rubber is/are heated, or the lamination thereof is heated. In the invention, the lamination of the core material coated or impregnated with the synthetic resin or the rubber and/or the drawn sheet is heated.

In all of the inventions, the heating temperature is not less than the flow starting temperature of the synthetic resin or the rubber and not more than the thermal deformation temperature of the core material and the melting point of the drawn sheet. If the heating temperature is less than the flow starting temperature of the synthetic resin or the rubber, the melting of the synthetic resin or the rubber does not advance so that sufficient bonding force cannot be obtained. If the heating temperature is more the thermal deformation temperature of the core material or the melting point of the drawn sheet, the resin constituting the core material or the drawn sheet melts so that desired mechanical properties cannot be kept.

The kind of heating means is not particularly limited, and examples thereof include hot-window heating, infrared ray heating, electron beam heating, and contact heating using a heater.

At the same time of or after the heating, in the invention the stack product of the core material/the synthetic resin or the rubber/the drawn sheet is pressed. In the invention, the stack product of the core material/the sheet or the film made of the synthetic resin or the rubber/the drawn sheet is pressed. The stack product of the core material coated or impregnated with the synthetic resin or the rubber and/or the drawn sheet is pressed.

In all of the inventions, loaded pressure is a value such that a compressive strain of 0.01 to 10% is applied to the core material.

As an example, FIG. 2 shows a stress-strain (S-S) curve from a compression test of a foamed body sheet made of the polyolefin resin used in the present invention. When the temperature changes, the compressive yield changes. Therefore, it is necessary to change applied pressure dependently on heating situation. However, the present inventors have found out that even when the temperature changes, the compressive elasticity area of the foamed body sheet hardly changes. Thus, in the present invention, the pressure is not controlled but displacement in the range of the compressive elasticity area is changed, thereby performing the above-mentioned compression. According to this method, even if the heating temperature or the thickness of the foamed body sheet changes, a laminated composite having a good thickness precision can be obtained.

If the compressive strain is less than 0.01%, sufficient bonding force cannot be obtained. If it exceeds 10%, it exceeds the yield point of the foamed body sheet so that the compressive strength of the foamed body sheet drops or the thickness thereof does not recover.

A more specific range of the compressive strain is from 0.01 to 10% about the foamed body sheet of thermoplastic resin and thermosetting resin, and is from 0.01 to 5% about a hollow body or a honeycomb structure of thermoplastic resin and thermosetting resin. Since the hollow body or the honeycomb structure has a lower yield point than the foamed body sheet, it is preferred to make the upper limit relatively small.

The method of controlling the displacement (thickness) is not particularly limited. Examples of the method as a batch system include a pressing manner in which stroke is controlled. Examples thereof as a continuous system include a method of passing the stack product through rolls whose gas is regulated.

By performing the pressing at the same time of or after the heating in this way, the bonding synthetic resin or rubber causes the foamed body sheet and the drawn sheet to bond to each other. The pressing time is not particularly limited, and preferably from 0.01 second to 10 minutes. If the pressing time is less than 0.01 second, sufficient bonding force cannot be obtained. If it exceeds 10 minutes, productivity deteriorates unfavorably.

The heating operation and the pressing operation may be separately performed, or simultaneously performed. For example, in the pressing manner using a contact heater according to a batch system, or the like, the stack production can be pressed while it is heated from both faces thereof.

The lamination heated and pressed as described above is cooled so that the synthesis resin or the rubber is solidified to produce a composite lamination. The cooling method is not particularly limited. In the cooling step, it is preferred to press the lamination within the range of a compressive strain of 0.01 to 10%.

In the case that the shrinkage starting temperature of the drawn sheet when it is heated is lower than the heating temperature when it is laminated, shrinkage is caused so that the form of the sheet deforms. Therefore, beautiful arrangement is difficult. For this reason, it is preferred to perform the lamination while a tension of 0.1 to 3 kgf/1 cm-width in the direction along which the sheet is oriented is applied to the sheet. This tension varies dependently on the material thereof or the drawn ratio, and application of a tension of 0.1 to 3 kgf/1 cm-width makes the laminating possible. If the tension is less than 0.1 kgf/1 cm-width, the tension is weak so that the shrinkage cannot be suppressed. On the other hand, if the tension exceeds 3 kgf/1 cm-width, the tension is too strong so that the holding force of the heated drawn sheet is not kept. Thus, the sheet is unfavorably cut.

The shrinkage starting temperature of the sheet, which is described above, was measured by a method described below.

First, the drawn sheet was cut into squares with sides 100 mm long, and the longitudinal and lateral sizes thereof were measured. Next, the sheets were set in ovens whose temperatures were set to various temperatures for 40 seconds. The sheets were taken out and then the sizes of the sheets were measured. The values of (the size after the heating/the initial size)×100 (%) were calculated. A temperature at which this became smaller than 99% was set as the shrinkage starting temperature.

The shrinkage starting temperature varies dependently on difference in material, or the drawn ratio thereof. However, in the case of polyolefin type materials, the shrinkage starting temperature becomes higher as the drawn ratio is made higher and the shrinkage starting temperature becomes lower as the drawn ratio is made lower.

Relationship between the shrinkage starting temperature and the heating temperature at the time of the laminating is as follows:

(the flow starting temperature of the synthetic resin or the rubber for bonding the core material and the drawn sheet to each other)
<(the heating temperature at the time of the laminating)
<(the shrinkage starting temperature of the drawn sheet)
<(the thermal deformation temperature of the core material or the melting temperature of the drawn sheet)

However, dependently on the kind of the sheet, the following case may be caused:

(the flow starting temperature of the synthetic resin or the rubber for bonding the core material and the drawn sheet to each other)<
<(the shrinkage starting temperature of the drawn sheet)<
<(the heating temperature at the time of the laminating)<
<(the thermal deformation temperature of the core material or the melting temperature of the drawn sheet)

In this case, in order to control the shrinking sheet, it is necessary to apply the above-mentioned tension. When the tension is weak, the sheet looses up by shrinkage so that the laminating thereof is not easily performed. When the tension is too strong, the sheet is cut. The tension applied to the sheet is preferably from 0.1 to 3 kgf/1 cm-width.

In the invention, the following steps are performed: the steps of interposing, between the core material and the drawn sheet, a bonding synthetic resin or rubber having a flow starting temperature lower than the thermal deformation temperature of the core material and the melting point of the drawn sheet, heating the synthetic resin or the rubber to not less than the flow starting temperature and not more than the thermal deformation temperature of the core material and the melting point of the drawn sheet before or after the three materials are stacked into a stack product, and pressing the stack product to apply a compression strain of 0.01 to 10% to the core material at the same time of or after the heating. In the invention, the following steps are performed: the steps of interposing, between the core material and the drawn sheet, a sheet or a film made of a bonding synthetic resin or rubber having a flow starting temperature lower than the thermal deformation temperature of the core material and the melting point of the drawn sheet, heating the resultant stack product to not less than the flow starting temperature of the synthetic resin or the rubber and not more than the thermal deformation temperature of the core material and the melting point of the drawn sheet, and pressing the stack product to apply a compression strain of 0.01 to 10% to the core material at the same time of or after the heating. Therefore, without deforming or melting the resin constituting the core material and the drawn sheet, only the bonding synthetic resin or rubber can be melted and the core material and the drawn sheet can be laminated on each other without damaging their physical properties.

A face to be bonded of the core material and/or the drawn sheet is coated or impregnated with a bonding synthetic resin or rubber before heating and pressing the core material and the drawn sheet. Therefore, the synthetic resin or the rubber can be homogeneously caused to penetrate into the body to be bonded (the core material and/or the drawn sheet). Thus, even if the pressing is performed for a short time, a sufficient bonding force can be obtained.

In the invention, the laminating is performed while a tension of 0.1 to 3 kgf/1 cm-width is applied to the sheet in the orientation direction of the sheet, whereby the laminating can easily be performed even under conditions that the drawn sheet shrinks easily.

In the invention, the draw magnification of the sheet is from 5 to 40 times, whereby a laminated composite having a necessary rigidity can be realized.

In the invention, the core material is a resin foamed body in which the average of aspect ratios (Dz/Dxy) of cells is from 1.1 to 4.0, whereby a light and highly-rigid laminated composite can be obtained.

In the invention, as the drawn sheet, there is used a drawn sheet whose face to be bonded is at least locally heated and melted at a temperature higher than the melting point of the resin by 10° C. or more or is roughened. Therefore, the bonding synthetic resin or rubber is liable to be compatible with the drawn sheet and they are easily bonded to each other by anchor effect.

Without deforming or melting the polyolefin resin constituting the core material and the drawn sheet, only the bonding synthetic resin or rubber can be melted and the core material and the drawn sheet can be laminated on each other without damaging their physical properties.

The synthetic resin or the rubber can be homogeneously caused to penetrate into the body to be bonded. Thus, even if the pressing is performed for a short time, a sufficient bonding force can be obtained.

The laminating can easily be performed.

A stable laminated composite can be obtained.

A light and highly-rigid laminated composite can be obtained.

The bonding synthetic resin or rubber is liable to be compatible with the drawn sheet and they are easily bonded to each other by anchor effect.

The inventions are carried out as embodiments described below.

It is sufficient that the core material has rigidity, and it is in general preferred that the core material is a board having a certain measure of thickness, for example, a thickness of 1 mm or more.

Examples of the Core Material Board Include the Following:

Boards made of a thermoplastic resin such as polyethylene resin, polyethylene copolymer resin, ethylene-vinyl acetate copolymer resin, polypropylene resin, ABS resin, vinyl chloride resin, vinyl chloride copolymer, vinylidene chloride resin, polyamide resin, polycarbonate resin, polyethylene terephthalate resin, polyimide resin, or polyurethane resin. These thermoplastic resins may be used alone or in a blend form. Of course, the board may be made light by foaming treatment or the like.

The core material board may be a board made of both plastic corrugated cardboard or plastic honeycomb and a face-material.

Boards made of a thermosetting resin such as urethane resin, unsaturated polyester resin, epoxy resin, phenol resin, melamine resin, urea resin, diallylphthalate resin, or xylene resin.

Woody fiber boards, wherein woody fibers are hardened with an adhesive agent or the like, such as insulation boards (A-class insulations, tatami-boards, and seizing boards), MDF (middle fiber plates), and HDF (hard fiber boards); woody chip boards, wherein woody chips are hardened with an adhesive agent, such as particle boards; plywood (that is, material obtained by laminating plural veneer sheets on each other perpendicularly), and veneer sheet laminated material (that is, material obtained by plural veneer sheets in parallel); longitudinally spliced material (that is, material wherein sweeping boards are longitudinally spliced with finger joints; assembly material (that is, material wherein sweeping boards are laminated on each other); and woody board products.

It is allowable to use boards wherein the above-mentioned plate material as a face material is sandwiched between paper honeycombs or metal honeycombs.

Iron sheets such as melted zinc steel sheets, zinc aluminum alloy steel sheets, and stainless steel sheets. Nonferrous metal sheets made of aluminum, titanium, copper or the like.

In order to improve the bonding property of the core material to a sheet for face material, which is laminated on this core material, it is naturally allowable to deposit an adhesive layer on the core material or the face material sheet beforehand, or apply an adhesive agent thereto.

A two-layer type, wherein the core material and the face material are melted and bonded by heating, is basically used. Dependently on use, however, an adhesive layer may be interposed between the core material and the face material.

Examples of the method for depositing the adhesive layer include a method of inserting a film, which will be the adhesive layer, between the core material and the face material sheet, supplying them between rolls at the same time, and heating and pressing them; a method of coating, at the time of supplying the core material and the face material sheet between rolls, at least one thereof with an adhesive agent by means of a roll coater, a gun or the like, thereby forming the adhesive layer; and a method of forming the adhesive layer on at least one of the core material and the face material sheet beforehand, and heating and pressing them at the time of being passed between rolls, thereby laminating them.

Examples of the film which makes up to the adhesive layer include films made of linear low density polyethylene resin, middle density polyethylene resin, very low density polyethylene resin, ethylene-vinyl acetate copolymer resin, high density polyethylene resin, polypropylene resin, ionomer resin, EMAA resin, or polyacrylonitrile resin.

Examples of the adhesive agent include vinyl acetate resin emulsion adhesive agents, acrylic emulsion adhesive agents, vinyl acetate copolymer emulsion adhesive agents, polyvinyl alcohol adhesive agents, vinyl acetate resin mastic adhesive agents, dope cements, monomer cements, vinyl chloride resin adhesive agents, ethylene-vinyl acetate copolymer hot melt adhesive agents, polyamide type hot melt adhesive agents, polyester type hot melt adhesive agents, thermoplastic rubber type adhesive agents, urethane hot melt adhesive agents, chloroprene rubber type adhesive agents, synthetic rubber type adhesive agents, natural rubber type adhesive agents, urea resin adhesive agents, melamine resin adhesive agents, phenol resin adhesive agents, epoxy resin adhesive agents, and polyurethane type adhesive agents.

It is sufficient that the face material sheet is a material flexible along the curvature of rolls in order to embrace the rolls. A sheet having a small thickness, for example, a sheet having a thickness of 1 mm or less is preferred. Examples of such a sheet include sheets described below.

Sheets which are caused to have anisotropy in mechanical properties (such as tensile strength and linear expansion coefficient) by drawing, orientation or the like and made of a thermoplastic resin such as polyethylene resin, polypropylene resin, polyester resin, ABS resin, polycarbonate resin, vinyl chloride resin, acryl-modified vinyl chloride resin, modified polyproplyeneoxide resin, polycarbonate/ABS resin, modified polyphenylene ether resin, acrylic resin, or acryl-styrol resin; glass cloth such as a surface mat obtained by making glass fiber into a paper form, material obtained by weaving glass robbing (a binder for bonding glass short fibers to each other may be contained in the surface mat. Examples of the binder include thermoplastic resin, such as polyvinyl alcohol resin, saturated polyester resin, and acrylic resins, and thermosetting resins such as epoxy resin and unsaturated polyester resin): prepreg sheets, wherein long fibrous materials are hardened with a resin binder (examples of the long fiber include glass fiber, carbon fiber, polyester resin, acrylic fiber, nylon fiber, carbon fiber and aramide fiber); stampable sheets, which are composite materials wherein thermosetting resin and a glass long fiber mat are combined with each other (polypropylene is frequently used as the thermoplastic resin); cheesecloth, woven fabric or nonwoven fabric, and needle punch (cheesecloth, woven fabric or nonwoven fabric, and needle punch are made mainly of synthetic resin fiber of polyester, nylon or the like. Woven fabric may be ordinary cloth made of natural fiber or synthetic fiber. Examples of organic fiber constituting woven fabric or nonwoven fabric include polyester fiber, cotton, acrylic fiber, nylon fiber, carbon fiber and aramide fiber); paper or metal sheets (an iron sheet or nonferrous metal sheets made of aluminum, titanium, copper or the like. Examples of the iron sheet include a melt zinc steel sheet, a melt zinc aluminum alloy steel sheet, and a stainless steel sheet. As such a metal sheet, a rolled thin sheet having a thickness of 0.01 to 2 mm is particularly preferably used. These metals may be arbitrarily plated, or coated with organic paint, inorganic paint or the like, or coated with an adhesive agent; and liquid crystal polymers (macromolecules exhibiting a liquid crystal structure, and examples thereof include liotropic liquid crystal polymers of entirely-aromatic polyamides, a typical example of which is Kevlar, thermotropic liquid crystals of entirely aromatic polyesters, typical examples of which are Zaider and Vectra).

Among the above-mentioned face materials, particularly desired are material shaving an isotropy in mechanical properties along the MD direction and the TD direction. Specific examples thereof include prepreg sheets wherein a drawn or oriented sheet of a thermoplastic resin or a long fibrous material thereof is hardened into a sheet-form with a resin binder.

The inventions are carried out, in particular, as embodiments described below.

About the supplied longitudinal sheets or lateral sheets, they may be used alone or a plurality of them may be arranged in parallel. An adhesive layer may be supplied together with the longitudinal sheet.

The temperature of the longitudinal sheet supplied to the core material surface is raised by heating and pressing, so that the sheet is melted and bonded/laminated on the core material. Examples of the heating and pressing means include a heating roll, a heating roll with a belt, and a hot-press. In the case that a heating roll and a heating roll with a belt are used, the core material and the longitudinal sheet are continuously carried. In the case that a hot-press is used, the core material and the longitudinal sheet are intermittently carried. Before the heating and pressing means (step), an auxiliary heating means (step) based on radiant heating, hot-window heating, a plane-heater or the like is set.

The intermediate lamination made of the longitudinal sheet and the core material is cut into a constant-size with a cutting means. Examples of the cutting means include a circular saw, a chip saw, a metal saw, a pushing-down type cutter, and a hot wire.

The intermediate lamination is pushed out with the core material supplying means, so as to be carried. At this time, the carriage may be supported with a driving roll, or assisted with a driving belt. In either case, the carriage up to the end of the cutting of the intermediate lamination is performed in the longitudinal direction.

After the compression-bonding by heating and pressing, the intermediate lamination is preferably cooled to not more than the melting point of the longitudinal sheet by a cooling means (step). Examples of the cooling means include a cooling roll, natural cooling, and air-cooling.

The constant-size cut pieces of the intermediate lamination made of the longitudinal sheet and the core material is carried in a direction having a given angle to the advancing direction (longitudinal direction), and the lateral sheet is supplied and thermocompression-bonded in the same manner as the longitudinal sheet while the cut pieces of the intermediate lamination move in the carriage direction. The given angle is, for example, 90°, but may be any angle other than 90°. Examples of the means for carrying the cut pieces of the intermediate lamination include a member of pushing out the pieces with a cylinder or the like, and a member of holding up the cut pieces with an attracting pad or supporting the cut pieces on a turntable to deliver the pieces to the next carrying line, and carrying the pieces with a roll, a belt or the like.

The constant-size cut pieces of the intermediate lamination made of the longitudinal sheet and the core material are rotated by 90° and further carried in the advancing direction (longitudinal direction), and the lateral sheet is supplied and thermocompression-bonded in the same manner as the longitudinal sheet while the cut pieces move in the longitudinal direction. Examples of the means for rotating the cut pieces of the intermediate lamination by 90° to the carriage direction while the carriage direction of the cut pieces is kept as it is include a member of using a turntable or a member of holding up the cut pieces with an attracting pad and rotating the pieces.

The device for producing a laminated composite includes a core supplying means for supplying the core material in the longitudinal direction, a longitudinal sheet supplying means for supplying a longitudinal sheet for a face material in the longitudinal direction onto at least one face of the core material, a lateral sheet supplying means for supplying the lateral sheet for the face material in the lateral direction onto the upper or lower face of the longitudinal sheet, and a sheet thermocompression-bonding means for pressing the longitudinal sheet and the lateral sheet stacked in an orthogonal form against the core material under heating. Therefore, the longitudinal sheet and the lateral sheet can be continuously laminated, into an orthogonal form, on the core material.

The method for producing a laminated composite includes a core supplying step of supplying the core material in the longitudinal direction, a longitudinal sheet supplying step of supplying the longitudinal sheet for a face material in the longitudinal direction onto at least one face of the core material, a lateral sheet supplying step of supplying the lateral sheet for the face material in the lateral direction onto the upper or lower face of the longitudinal sheet, and a sheet thermocompression-bonding step of pressing the longitudinal sheet and the lateral sheet stacked in an orthogonal form against the core material under heating. Therefore, the longitudinal sheet and the lateral sheet can be continuously laminated, into an orthogonal form, on the core material.

In the device for producing a laminated composite, at a position where the longitudinal sheet starts to contact a heating roll of the sheet thermocompression-bonding, the lateral sheet is supplied between the heating roll and the longitudinal sheet by the lateral sheet supplying means. Therefore, the operation of laminating the sheets for the face material in a longitudinal and laterally orthogonal form on the core can be performed with a high efficiency.

The method for producing a laminated composite further includes a lateral sheet supplying step of supplying a cut piece of the lateral sheet between a heating roll and the longitudinal sheet at a position where the longitudinal sheet starts to contact the heating roll during the sheet thermocompression-bonding step Therefore, the operation of laminating the sheets for the face material in a longitudinally and laterally orthogonal form on the core can be performed with a high efficiency.

In the device for producing a laminated composite, the longitudinal sheet supplying means is a means for supplying upper side longitudinal sheets and lower side longitudinal sheets to be arranged alternatively in the lateral direction, and the lateral sheet supplying means is a means for supplying plural lateral sheets successively between the upper side longitudinal sheets and the lower side longitudinal sheets so as to be arranged in parallel. Therefore, the longitudinal sheet and the lateral sheet can be alternately woven. As a result, a laminated composite having such physical properties that reinforcing strengths in the longitudinal direction and the lateral direction are uniform can be obtained.

In the method for producing a laminated composite, the longitudinal sheet supplying step is a step of supplying upper side longitudinal sheets and lower side longitudinal sheets to be arranged alternatively in the lateral direction, and the lateral sheet supplying step is a step of supplying plural lateral sheets successively between the upper side longitudinal sheets and the lower side longitudinal sheets so as to be arranged in parallel. Therefore, the longitudinal sheet and the lateral sheet can be alternately woven. As a result, a laminated composite having such physical properties that reinforcing strengths in the longitudinal direction and the lateral direction are uniform can be obtained.

In the device for producing a laminated composite, the lateral sheet supplying means includes an attracting roll set at a position where the longitudinal sheet starts to contact the heating roll of the sheet thermocompression-bonding means, and a single sheet supplying means for supplying cut pieces of the lateral sheet one by one to the attracting roll. Therefore, the longitudinal sheet and the lateral sheet can be continuously adhered, in an orthogonal form, on the surface of the core material.

In the method for producing a laminated composite, the lateral sheet supplying step includes a single sheet supplying step of supplying cut pieces of the lateral sheet one by one to an attracting roll set at a position where the longitudinal sheet starts to contact the heating roll during the sheet thermocompression-bonding step. Therefore, the longitudinal sheet and the lateral sheet can be continuously adhered, in an orthogonal form, on the surface of the core material.

The device for producing a laminated composite includes a core material supplying means for supplying the core material in the longitudinal direction, a longitudinal sheet supplying means for supplying the longitudinal sheet for a face material, in the longitudinal direction, onto at least one face of the core material, a first thermocompression-bonding means for pressing the longitudinal sheet and the core material under heating to form an intermediate lamination, a first cutting means for cutting the intermediate lamination, a carrying means for carrying cut pieces of the intermediate lamination in a direction having a given angle to the longitudinal direction, a lateral sheet supplying means for supplying the lateral sheet for the face material, in the carriage direction, onto the upper face or the lower face of the cut pieces, a second thermocompression-bonding means for pressing the cut pieces of the intermediate lamination and the lateral sheet, which are stacked, under heating to form a final lamination, and a second cutting means for cutting the final lamination. Therefore, the longitudinal sheet and the lateral sheet can be continuously laminated, in an orthogonal form, on the core material. Moreover, the lateral sheet can be supplied in a longitudinal state in the same manner as the longitudinal sheet.

The method for producing a laminated composite includes a core material supplying step of supplying the core material in a longitudinal direction, a longitudinal sheet supplying step of supplying the longitudinal sheet for a face material, in the longitudinal direction, onto at least one face of the core material, a first thermocompression-bonding step of pressing the longitudinal sheet and the core material under heating to form an intermediate lamination, a first cutting step of cutting the intermediate lamination, a carrying step of carrying cut pieces of the intermediate lamination in a direction having a given angle to the longitudinal direction, a lateral sheet supplying step of supplying the lateral sheet for the face material, in the carriage direction, onto the upper face or the lower face of the cut pieces, a second thermocompression-bonding step of stacking and pressing the cut pieces of the intermediate lamination and the lateral sheet under heating to form a final lamination, and a second cutting step of cutting the final lamination. Therefore, the longitudinal sheet and the lateral sheet can be continuously laminated, in an orthogonal form, on the core material. Moreover, the lateral sheet can be supplied in a longitudinal state in the same manner as the longitudinal sheet.

The device for producing a laminated composite includes a core material supplying means for supplying the core material in the longitudinal direction, a longitudinal sheet supplying means for supplying the longitudinal sheet for a face material, in the longitudinal direction, onto at least one face of the core material, a first thermocompression-bonding means for pressing the longitudinal sheet and the core material under heating to form an intermediate lamination, a first cutting means for cutting the intermediate lamination, a carrying means for rotating cut pieces of the intermediate lamination at an angle of 90° to carry the cut pieces in the longitudinal direction, a lateral sheet supplying means for supplying the lateral sheet for the face material, in the longitudinal direction, onto the upper face or the lower face of the cut pieces, a second thermocompression-bonding means for pressing the cut pieces of the intermediate lamination and the lateral sheet, which are stacked, under heating to form a final lamination, and a second cutting means for cutting the final lamination. Therefore, the longitudinal sheet and the lateral sheet can be continuously laminated, in an orthogonal form, on the core material. Moreover, the lateral sheet can be supplied in a longitudinal state in the same manner as the longitudinal sheet.

The method for producing a laminated composite includes a core material supplying step of supplying the core material in the longitudinal direction, a longitudinal sheet supplying step of supplying the longitudinal sheet for a face material, in the longitudinal direction, onto at least one face of the core material, a first thermocompression-bonding step of pressing the longitudinal sheet and the core material under heating to form an intermediate lamination, a first cutting step of cutting the intermediate lamination, a carrying step of rotating cut pieces of the intermediate lamination at an angle of 90° to carry the cut pieces in the longitudinal direction, a lateral sheet supplying step of supplying the lateral sheet for the face material, in the longitudinal direction, onto the upper face or the lower face of the cut pieces, a second thermocompression-bonding step of stacking and pressing the cut pieces of the intermediate lamination and the lateral sheet under heating to form a final lamination, and a second cutting step of cutting the final lamination. Therefore, the longitudinal sheet and the lateral sheet can be continuously laminated, in an orthogonal form, on the core material. Moreover, the lateral sheet can be supplied in a longitudinal state in the same manner as the longitudinal sheet.

The operation of laminating the sheet for the face material in the longitudinally and laterally orthogonal form on the core material can be continuously performed and the laminated composite can be produced with a high productive efficiency. Accordingly, the laminated composite which has a high flexural-elasticity if the thickness is small and which has a small linear expansion coefficient and no anisotropy can be obtained.

BRIEF DESCRIPTION OF THE DRAWINGS

FIGS. 6(a), 6(b), 6(c) and 6(d) are side views each illustrating a supplying roll;

FIGS. 8(a) and 8(b) are perspective views illustrating a lateral sheet supplying means, FIG. 8(c) is a side view illustrating the lateral sheet supplying means, and FIG. 8(d) is a side view illustrating a servo motor;

FIG. 9(a) is a front view illustrating a heating roll, FIG. 9(b) is a side view illustrating the heating roll and a stand, and FIGS. 9(c), 9(d) and 9(e) are side views illustrating a driving device of the heating roll;

FIGS. 10(a) and 10(b) are side views illustrating a modification of a device for producing a laminated composite of Example 9;

FIG. 15(a) is a side view illustrating a device for producing a laminated composite of Example 11, and FIGS. 15(b) and 15(c) are plan views illustrating a lateral sheet supplying means;

FIG. 18(a) is a side view illustrating a device for producing a laminated composite of Example 13, and FIG. 18(b) is a front view of the device;

BEST MODES FOR CARRYING OUT THE INVENTION

Figure 1:
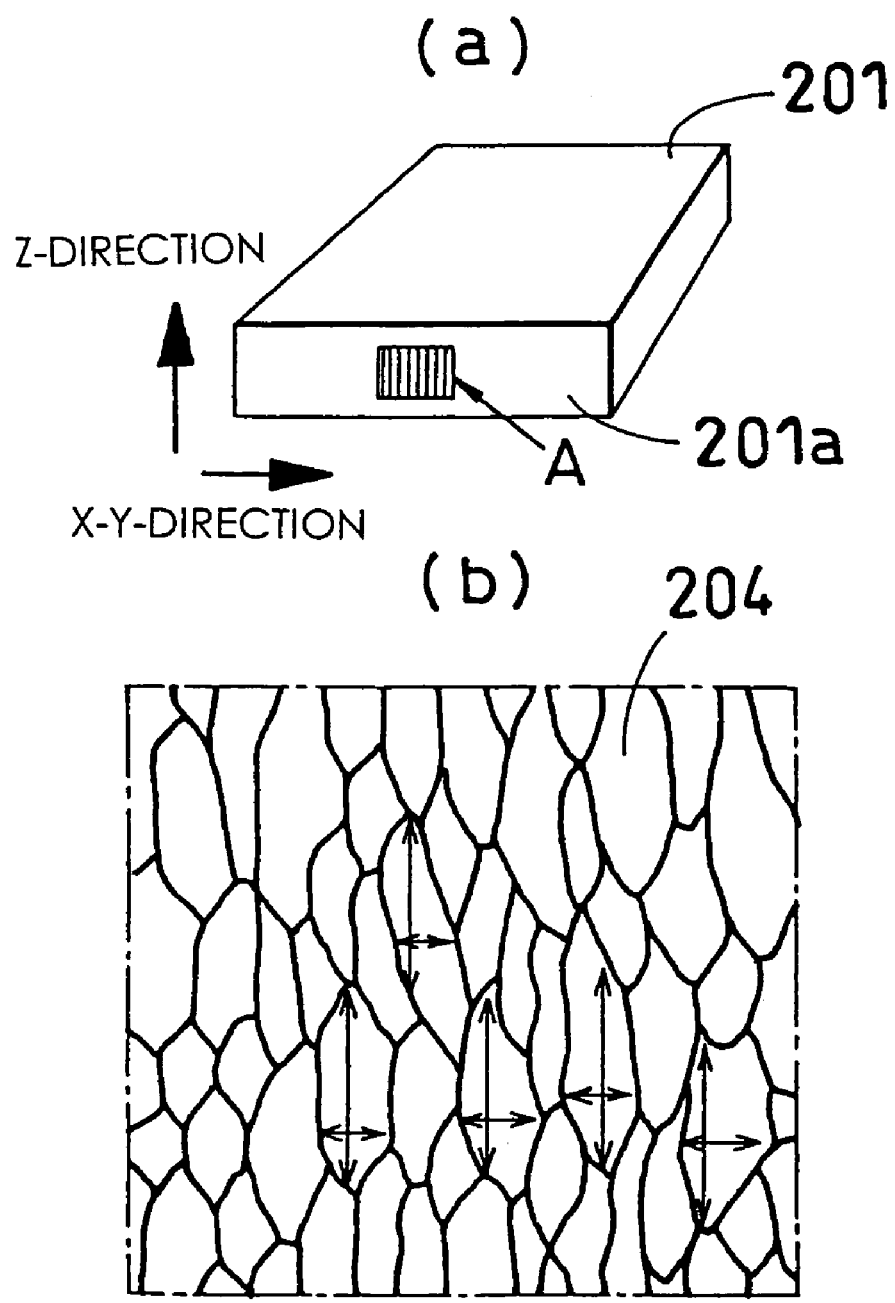
FIG. 1(a) is a schematic perspective view of spindle-shaped cells.
FIG. 1(b) is an enlarged schematic view of a part of a section in parallel to the z direction in FIG. 1(a)
Figure 2:
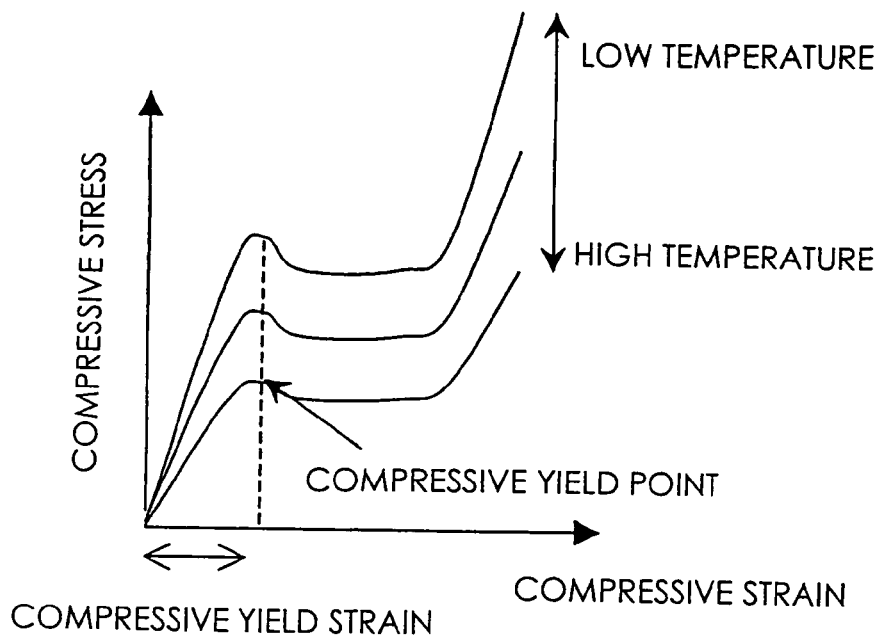
FIG. 2 is a graph showing a stress-strain (S-S) curve from a compressive test for a foamed body sheet made of a polyolefin resin.

The present invention will be more specifically described by way of Examples.

i) Preparation of Sheet-Form Core Material with Face Materials (Foamed Body Sheet with Face Materials)

(1) Preparation of Modified Polyolefin Resin

As a modifying screw extruder, BT 40 two-axis screw extruder (manufactured by Research Laboratory of Plastics Technology Co., Ltd.), the axes being rotated in the same direction, was used. This has 2 self-wiping screws. The L/D thereof is 35, and the D thereof is 39 mm. Its cylinder barrel is composed of $1^{st}$ to $6^{th}$ barrels from the upper stream of the extruder to the lower stream thereof. Its die is a strand die having three holes. A vacuum vent is installed in the $4^{th}$ barrel in order to recollect volatile components.

Operation conditions are as follows.

| | |
|---|---|
| Cylinder barrel set temperature: | $1^{st}$ barrel; 180° C. |
| | $2^{nd}$ to $6^{th}$ barrels; 220° C. |
| | die; 220° C. |
| Screw rotation number: | 150 rpm |

First, a polyolefin resin was charged into a modifying screw extruder having the above-mentioned structure from its rear end hopper. From the third barrel, a mixture of a modifying monomer and an organic peroxide was put into the extruder, and these were melted and mixed to yield a modified resin. At this time, volatile components generated in the extruder were subjected to vacuum drawing from the vacuum vent.

The polyolefin resin was a polypropylene random copolymer (EX6 manufactured by Japan Polychem Corp., MFR; 1.8, density; 0.9 g/cm$^3$), and the supply amount thereof was set to 10 kg/h. The modifying monomer was divinylbenzene, and the supply amount thereof was set to 0.5 part by weight per 100 parts by weight of the polyolefin resin. The organic peroxide was 2,5-dimethyl-2,5-di (t-butylperoxide)hexyne-3, and the supply amount thereof was set to 0.1 part by weight per 100 parts by weight of the polyolefin resin.

The modified resin yielded by melting and mixing the polyolefin resin, the modifying monomer and the organic peroxide was jetted out from the strand die, cooled with water, and cut with a pelletizer to obtain pellets made of the modified resin.

(2) Preparation of Foaming Resin Composition

A screw extruder for kneading a foaming agent was a two-axis screw extruder, TEX-44model (manufactured by Nippon Steel Corp.), the axes being rotated in the same direction. This has 2 self-wiping screws. The L/D thereof is 45.5, and the D thereof is 47 mm. Its cylinder barrel is composed of $1^{st}$ to $12^{th}$ barrels from the upper stream of the extruder to the lower stream thereof. Its forming die is a strand die having 7 holes. Temperature-setting divisions are as follows.

The $1^{st}$ barrel was constantly cooled.
$1^{st}$ zone; the $2^{nd}$ to the $4^{th}$ barrels
$2^{nd}$ zone; the $5^{th}$ to the $8^{th}$ barrels
$3^{rd}$ zone; the $9^{th}$ to the $12^{th}$ barrels
$4^{th}$ zone; the die and an adaptor section A side feeder is installed to the sixth barrel to supply a foaming agent, and a vacuum vent is installed in the eleventh barrel in order to recollect volatile components. Operation conditions were as follows.

| Cylinder barrel set temperature: | $1^{st}$ zone; 150° C. |
| --- | --- |
| | $2^{nd}$ zone; 170° C. |
| | $3^{rd}$ zone; 180° C. |
| | $4^{th}$ zone; 160° C. |
| Screw rotation number: | 40 rpm |

The modified resin obtained as described above and a homo type polypropylene (FY4 manufactured by Japan Polychem Corp., MFR; 5.0, density; 0.9 g/cm$^3$) were supplied, in respective supply amounts of 10 kg/h, to the screw extruder for kneading the foaming agent. The foaming agent was supplied from the side feeder to the extruder. The foaming agent was azodicarbonamide (ADCA), and the supply amount thereof was set to 1.0 kg/h. A foaming resin composition was obtained by kneading the modified resin and the foaming agent in this way.

(3) Preparation of Foaming Sheet

This foaming resin composition was extruded from a T die, to obtain a polyolefin resin foaming sheet having a width of 350 mm and a thickness of 0.5 mm.

(4) Preparation of Foaming Sheet with Face Material

In Examples 1 to 6 and Comparative Examples 2 to 3, polyethylene terephthalate nonwoven fabrics (Spunbond Ecoole 630 1A, manufactured by Toyobo Co., Ltd., grammage; 30 g/m$^2$) as face materials were laminated on both faces of the above-mentioned polyolefin resin foaming sheet. A press-forming machine was used to perform press-forming at a temperature of 180° C., to obtain a foaming sheet with the face material.

In Comparative Example 1, Teflon sheets were laminated on both faces of the above-mentioned foaming sheet, and a hand press machine was used to perform diluting at 180° C. to obtain a foaming sheet with the face material.

(5) Foaming

From the resultant foaming sheet with the face material, the peripheral portion thereof was removed to obtain a sample of 300 mm square. This sample was heated in an oven at 230° C. for approximately 5 minutes, to cause the foaming sheet to foam. In this way, a polyolefin resin foamed body sheet having a thickness of 8 mm was obtained.

In Comparative Example 1, the resin was cooled and solidified after the foaming. Thereafter, the laminated Teflon sheets were stripped to obtain a foamed body sheet having a surface made of the polyolefin resin.

(6) Impregnation with Synthetic Resin

In Examples 2, 3 and 5, a synthetic resin film of 60 μm thickness, which will be described later, was stacked on the face materials of the foamed body sheet with the face material, obtained in the previous step (5), and then the hand press machine heated to 120° C. was used to apply a load to the stack product in such a manner that a compressive strain of 0.4 mm (5%) would be applied to the foamed body sheet, and the stack product was heated for 1 minute to obtain a synthetic resin impregnated foamed body sheet.

(7) Evaluation of Synthetic Resin Impregnated Foamed Body Sheet

The resultant polyolefin resin foamed body sheet was evaluated about items described below.

Foaming Magnification:

The face materials were scratched off from the laminated composite with a cutter, and subsequently the apparent density thereof was measured according to JIS K-6767 Polyethylene Foam Test. The reciprocal number thereof was defined as the foaming magnification.

Cell Shape (Average Aspect Ratio):

The laminated composite sheet was cut along the thickness direction (the z direction). While the center of the section thereof was observed with an optical microscope, an enlarged photograph thereof was taken with 15 magnifications. Dz and Dxy of all of the photographed cells were measured with a vernier micrometer. Dz/Dxy of each of the cells was then calculated. The number average of the values Dz/Dxy of the cells in the number of 100 was calculated and defined as the average aspect ratio. In the measurement, however, the cells having a Dz (actual diameter) of 0.05 mm or less and the cells having a Dz of 10 mm or more were excluded.

Melting Point

In the step (2), a polyolefin resin composition containing no foaming agent (ADCA) was prepared. A differential scanning calorimeter (DSC) was used to read out the peak temperature of this. The melting point thereof was 148° C.

ii) Preparation of Synthetic Resin Film Laminated Drawn Sheet (1) Preparation of Extruded Sheet One part by weight of benzophenone (a photopolymerization initiator) was blended per 100 parts by weight of high density polyethylene (trade name: HY540, manufactured by Mitsubishi Chemical Corp., MFR=1.0, melting point; 133° C., weight average molecular weight; 300000). The blend product was melted and kneaded in a 30-mm biaxial extruder at a resin temperature of 200° C., and then extruded into a sheet-form through a T die. The resultant product was cooled with a cooling roll to obtain a non-drawn sheet having a thickness of 1.0 mm and a width of 200 mm.

(2) Rolling and Crosslinking

A 6-inch roll (manufactured by Kodaira Seisakusyo Co., Ltd.) having surface temperature set to 100° C. was used to roll this non-drawn sheet up to a draw magnification of 9 times. Thereafter, the resultant rolled sheet was sent out by rolls having a sending-out rate of 2 m/minute, passed through a heating furnace having atmosphere temperature set to 85° C., pulled and taken by rolls having a pulling rate of 6 m/minute so as to be rolled up to a draw magnification of 3 times and wound out. Next, a high-pressure mercury lamp was illuminated onto both faces of the resultant sheet for 5 seconds so that the sheet was crosslinked. At last, the resultant sheet was subjected to relieving treatment at 130° C. under non-tension for 1 minute.

The drawn sheet obtained by way of the above-mentioned operations had a width of 100 mm and a thickness of 0.20 mm and was transparent. The total draw magnification of this sheet was 27 times, and the linear expansion coefficient thereof was $-1.5\times10^{-5}$. The melting point [the peak temperature in a DSC (differential scanning calorimeter)] of this drawn sheet was 135° C.

(3) Local Melting

In Examples 3, 4 and 5, the polyolefin resin drawn sheet obtained as described above was passed between a first roll which was rotated at a rotation speed of 3 m/minute and had a surface temperature of 180° C. and a second roll which was rotated at the same speed and had a surface temperature of 50° C. in such a manner that the pressure was 100 kg/cm², so as to be continuously compressed. As a result, the face of the drawn sheet which was in contact with the first roll was melted. Next, by treating the opposite face of the drawn sheet in the same manner as described above, a drawn sheet having both faces melted was obtained.

(4) Synthetic Resin Film Laminated Drawn Sheet

In Examples 3, 4 and 5, the first roll having surface temperature set to 160° C. and the second roll having surface temperature set to 50° C. were rotated at respective rotation speeds of 3 m/minute. A synthetic resin film having a thickness of 60 μm, which will be described later, was stacked on the drawn sheet obtained in the previous step (3), and this stack product was passed between in such a manner that the synthetic resin film made in contact with the first roll and the pressure was 100 kg/cm², so as to perform laminating continuously. In this way, a synthetic resin film laminated drawn sheet was obtained.

(5) Evaluation of Drawn Sheet

The linear expansion coefficient and the tensile elasticity of the drawn sheet were measured by the following methods.

Linear Expansion Coefficient:

Index lines having an interval of approximately 150 mm were written on the sample, and subsequently the sample was allowed to stand still in a thermostat set to 5° C. for 1 hour. The distances between the index lines was measured at 5° C. Next, the sample was allowed to stand still in the thermostat set to 80° C. for 1 hour. Thereafter, the distance between the index lines was measured in the same way. This operation was repeated 3 times. The distance between the index lines at 5° C. and 80° C. was measured in the second and third operations, and the average thereof was obtained. From the following equation, the linear expansion coefficient was calculated:

Linear expansion coefficient (1/° C.)=(distance between the index lines at 80° C.−distance between the index lines at 5° C.)/{(distance between the index lines at 5° C.)×(80−5)}.

Tensile Elasticity:

The tensile elasticity was measured according to the tension test of JIS K 7113.

Preparation of Synthetic Resin Film

A low density polyethylene (LC 600A manufactured by Mitsubishi Chemical Corp., MFR; 7, melting point; 107° C.) was melted and kneaded at a resin temperature of 180° C. in a biaxial extruder, extruded into a sheet-from through a T die, and cooled by a cooling roll, to obtain a synthetic resin film having a thickness of 60 μm and a width of 100 mm.

iii) Production of Laminated Composite

(1) Stacking of Sheets or Films

Figure 3:
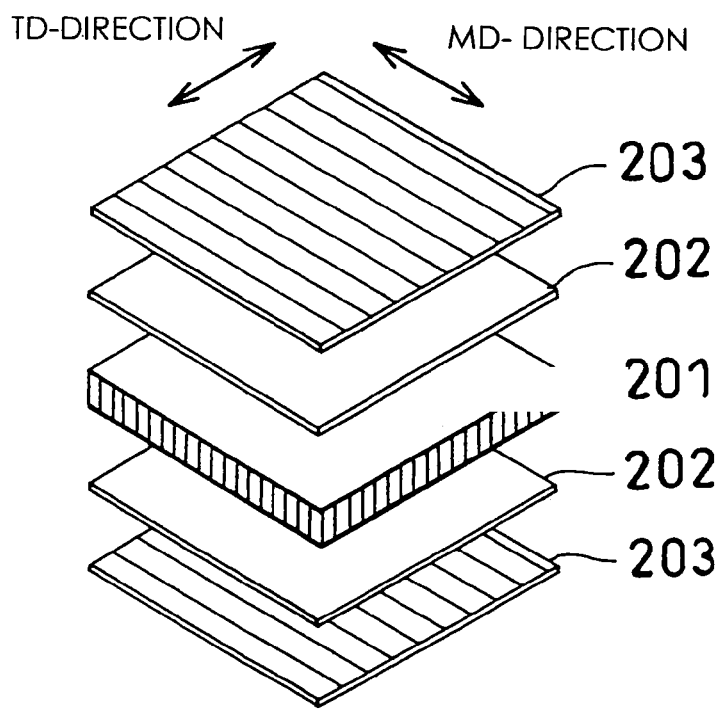
FIG. 3 is a perspective view illustrating a stack product in Example 2.

As illustrated in FIG. 3, in Example 2, the respective material sheets or films were stacked on each other to obtain a stack product of the drawn sheet (203)/the synthetic resin film (202)/the synthetic resin impregnated foamed body sheet (201)/the synthetic resin film (202)/the drawn sheet (203).

In Examples 1, 3 to 5, and Comparative Examples 1 and 2, the material sheets or films were stacked on each other as described below. The plurality of drawn sheets corresponding to the upper and the lower faces of a laminated composite were arranged in such a manner that the drawn direction thereof would be plane-symmetrical with respect to the foamed body sheet.

EXAMPLE 1 drawn sheet/two synthetic resin films/foamed body sheet/two synthetic resin films/drawn sheet

EXAMPLE 2 drawn sheet/synthetic resin film/synthetic resin impregnated foamed body sheet/synthetic resin film/drawn sheet

EXAMPLE 3 synthetic resin film laminated drawn sheet/synthetic resin film/foamed body sheet/synthetic resin film/synthetic resin film laminated drawn sheet

EXAMPLE 4 synthetic resin film laminated drawn sheet/synthetic resin impregnated foamed body sheet/synthetic resin film laminated drawn sheet

EXAMPLE 5 synthetic resin film laminated drawn sheet (0°)/synthetic resin film laminated drawn sheet (90°)/synthetic resin impregnated foamed body sheet/synthetic resin film laminated drawn sheet (90°)/synthetic resin film laminated drawn sheet (0°)

COMPARATIVE EXAMPLE 1 drawn sheet after heated to 160° C., which will be described later/foamed body sheet with no face material/drawn sheet after heated to 160° C.

COMPARATIVE EXAMPLE 2 drawn sheet/two synthetic resin films/foamed body sheet/two synthetic resin films/drawn sheet

(2) Heating, Pressing and Cooling

In Examples 1 to 5, each of the above-mentioned stack products was heated to 120° C. (and 110° C. in Example 1) from its upper and lower sides, using a hand press machine.

The product was pressed in such a manner that a compressive strain of 0.4 mm (5%) was applied to the foamed body sheet, so as to perform press-forming for 2 minutes. Thereafter, the stack product was pressed by water-cooling press in such a manner that a compressive strain of 5% would be generated in the same way.

In Example 6, among the drawn sheets used in Example 1, the sheet rolled 9 times in the drawing step was used. At the time of laminating by press, both ends of the drawn sheet were clipped and a tension of 0.5 kgf/cm was applied thereto in the sheet oriented direction. In this state, heating and laminating were carried out. Except this, the same manner as in Example 1 was carried out. As a result, a good laminated composite was obtained.

In Example 7, instead of the polyolefin resin foamed body sheet described in Example 1, an acrylic foamed body (Rohacell manufactured by Rohm Co., Ltd. foaming magnification; 20 times, thermal deformation temperature; 130° C.) was used, and as a synthetic resin film used for adhesion, an SEBS film CS-S manufactured by Sekisui Film Co., Ltd. was used. The structure of the stack product and the heating temperature were set to the same in Example 1.

In Example 8, instead of the polyolefin resin foamed body sheet described in Example 1, a thermoplastic resin plastic hollow body (Sunply manufactured by Sumika Plastech Co., Ltd. thickness; 7 mm) was used, and as a synthetic resin film used for adhesion, a VLDPE film SE605M manufactured by Tamapoly Co., Ltd. was used. The structure of the stack product and the heating temperature were set to the same in Example 1.

In Comparative Example 1, the drawn sheets were fixed with clips, and allowed to stand still in an oven heated to 160° C. for 2 minutes. The drawn sheets were wholly shrunk and a part thereof was melted. This drawn sheet was taken out from the oven, and the above-mentioned foamed body sheet with no face material was immediately sandwiched between the drawn sheets. A hand press machine was used to heat the stack product from its upper and lower sides at 50° C., and a pressure was applied thereto in such a manner that a compressive strain of 5% would be generated in the foamed body sheet with no face material. The stack product was allowed to stand still for 2 minutes to obtain a laminated composite. The surfaces of this laminated product, in which numerous irregularities were generated, were not smooth.

In Comparative Example 2, the thickness control as described above was changed to a pressure controlling manner. At a pressure of 0.8 MPa and temperatures of 110° C. and 120° C., heating/pressing and cooling/pressing were performed in the same way as described above, to obtain a laminated product.

In Comparative Example 3, at the time of heating and laminating, the laminating was performed without applying any tension in Example 8. As a result, the sheet was shrunk, and the surfaces of this laminated composite, in which numerous irregularities were generated, were not smooth.

(3) Evaluation of Laminated Composites

The resultant laminated composites were evaluated about the following items.

Thickness

A vernier micrometer was used to measure the thickness of the laminated composites.

Bending Strength and Bend Plastic Constant:

The bend plastic constant and the bending strength were measured at a test speed of 10 mm/minute on the basis of JIS K7203. The samples having directivity were measured along their drawn direction.

Linear Expansion Coefficient

The linear expansion coefficient was obtained in the same way as described above. The samples having directivity were measured along their drawn direction.

The structures and the evaluation results of Examples and Comparative Examples are collectively shown in Table 1.

| | | | Example 1 | Example 2 | Example 3 | Example 4 |
|---|---|---|---|---|---|---|
| Foamed body sheet | Foaming magnification | Times | 10 | 10 | 10 | 10 |
| | Aspect ratio | | 2 | 2 | 2 | 2 |
| | Melting point | ° C. | 148 | 148 | 148 | 149 |
| | Thickness | mm | 8 | 8 | 8 | 8 |
| Drawn sheet | Melting point | ° C. | 135 | 135 | 135 | 135 |
| | Direction | | Monoaxial | Monoaxial | Monoaxial | Monoaxial |
| | Thickness | μm | 300 | 300 | 300 | 300 |
| | Number of the laminated sheet(s) on the single side | Number | 1 | 1 | 1 | 1 |
| | Shrinkage starting temperature | ° C. | 125 | 125 | 125 | 125 |
| | Local melting | | Not observed | Not observed | Observed | Observed |
| | Linear expansion coefficient | *10-5 | −1.5 | −1.5 | −1.5 | −1.5 |
| | Tensile elasticity | Gpa | 24 | 24 | 24 | 24 |
| Synthetic resin | Melting point | ° C. | 105 | 105 | 105 | 105 |
| | Thickness | μm | 120 | 60 | 60 | |
| | Penetration into the foamed body | μm | | | 60 | 60 |
| | Lamination to drawn sheet | μm | | | 60 | 60 |
| Pressing process | Heating temperature | ° C. | 110 | 120 | 120 | 120 |
| | Manner | | Thickness control | Thickness control | Thickness control | Thickness control |
| | Compressive ratio of the foamed body | % | 5 | 5 | 5 | 5 |
| | Pressure | Mpa | | | | |
| | Tension to the sheet | kgf/lcm | 0 | 0 | 0 | 0 |

-continued

|  |  |  | Example 1 | Example 2 | Example 3 | Example 4 |
| --- | --- | --- | --- | --- | --- | --- |
| Laminated composite | Thickness | mm | 8.6 | 8.6 | 8.6 | 8.6 | 8.6 |
|  | Bending strength | Mpa | 8.0 | 9.0 | 11.0 | 11.0 | 13.0 |
|  | Bend elastic constant | Gpa | 1.2 | 1.3 | 1.4 | 1.4 | 1.5 |
|  | Linear expansion coefficient | ×10-5/° C. | −1 | −1.1 | −1.2 | −1.2 | −1.3 |

|  |  |  | Example 5 | Example 6 | Example 7 | Example 8 |
| --- | --- | --- | --- | --- | --- | --- |
| Foamed body sheet | Foaming magnification | Times | 10 | 10 | 20 | 20 |
|  | Aspect ratio |  | 2 | 2 | 0.9 | 0.9 |
|  | Melting point | ° C. | 148 | 148 | (130) | (75) |
|  | Thickness | mm | 8 | 8 | 8 | 8 |
| Drawn sheet | Melting point | ° C. | 135 | 135 | 135 | 135 |
|  | Direction |  | Orthogonal | Monoaxial | Monoaxial | Monoaxial |
|  | Thickness | μm | 300 | 300 | 300 | 300 |
|  | Number of the laminated sheet(s) on the single side | Number | 2 | 1 | 1 | 1 |
|  | Shrinkage starting temperature | ° C. | 125 | 105 | 125 | 125 |
|  | Local melting |  | Observed | Not observed | Not observed | Not observed |
|  | Linear expansion coefficient | *10-5 | −1.5 | 0.5 | −1.5 | −1.5 |
|  | Tensile elasticity | Gpa | 24 | 8 | 24 | 24 |
| Synthetic resin | Melting point | ° C. | 105 | 105 | (−) | (−) |
|  | Thickness | μm |  | 120 | 120 | 120 |
|  | Penetration into the foamed body | μm | 60 |  |  |  |
|  | Lamination to drawn sheet | μm | 60 |  |  |  |
| Pressing process | Heating temperature | ° C. | 120 | 120 | 120 | 70 |
|  | Manner |  | Thickness control | Thickness control | Thickness control | Thickness control |
|  | Compressive ratio of the foamed body | % | 5 |  | 5 | 5 |
|  | Pressure | Mpa |  |  |  |  |
|  | Tension to the sheet | kgf/lcm | 0 | 0.5 | 0 | 0 |
| Laminated composite | Thickness | mm | 8.6 | 8.6 | 8.6 | 7.6 |
|  | Bending strength | Mpa | 13.0 | 9.5 | 9.5 | 11.0 |
|  | Bend elastic constant | Gpa | 1.5 | 0.8 | 1.4 | 2.0 |
|  | Linear expansion coefficient | ×10-5/° C. | −1.3 | −1.1 | −1.1 | −1.2 |

|  |  |  | Comparative Example 1 | Comparative Example 2 | Comparative Example 3 |
| --- | --- | --- | --- | --- | --- |
| Foamed body sheet | Foaming magnification | Times | 10 | 10 | 10 |
|  | Aspect ratio |  | 2 | 2 | 2 |
|  | Melting point | ° C. | 148 | 148 | 148 |
|  | Thickness | mm | 8 | 8 | 8 |
| Drawn sheet | Melting point | ° C. | 135 | 135 | 135 |
|  | Direction |  | Monoaxial | Monoaxial | Monoaxial |
|  | Thickness | μm | 300 | 300 | 300 |
|  | Number of the laminated sheet(s) on the single side | Number | 1 | 1 | 1 |
|  | Shrinkage starting temperature | ° C. | 125 | 125 | 105 |
|  | Local melting |  | Not observed | Not observed | Not observed |
|  | Linear expansion coefficient | *10-5 | ~1.5 | ~1.5 | 0.5 |
|  | Tensile elasticity | Gpa | 24 | 24 | 8 |
| Synthetic resin | Melting point | ° C. | Not observed | 105 | 105 |
|  | Thickness | μm |  | 120 | 120 |
|  | Penetration into the foamed body | μm |  |  |  |
|  | Lamination to drawn sheet | μm |  |  |  |

-continued

|  |  |  | Comparative Example 1 | Comparative Example 2 | Comparative Example 3 |  |
|---|---|---|---|---|---|---|
| Pressing process | Heating temperature | ° C. | 160 | 110 | 120 | 120 |
|  | Manner |  | Thickness control | Pressure control | Pressure control | Thickness control |
|  | Compressive ratio of the foamed body | % | 5 | 8 | 15 |  |
|  | Pressure | Mpa |  | 0.8 | 0.8 |  |
|  | Tension to the sheet | kgf/lcm | 0 | 0 | 0 | 0 |
| Laminated composite | Thickness | mm | 8.7 | 8.5 | 8 | 8.7 |
|  | Bending strength | Mpa | 3.0 | 8.3 | 6.5 | 3.1 |
|  | Bend elastic constant | Gpa | 0.7 | 1.3 | 1.2 | 0.6 |
|  | Linear expansion coefficient | ×10-5/° C. | 4 | −1 | −1 | 4.5 |

As is evident from Table 1, in the laminated composites of Examples 1 to 8, the drawn sheets are not shrunk and the foamed bodies do not buckle. They have larger bending strengths and bend elastic constants as compared with that of Comparative Example 1, and are high-strength laminated composites. Moreover, they have small linear expansion coefficients so as to be good in dimensional stability.

In Examples 1 to 8, the pressing quantity is controlled by the compressive strain quantity of the foamed body sheets; therefore, even if the heating temperature changes, laminated composites having a uniform thickness can be produced as compared with Comparative Example 2, wherein pressure control is performed.

Next, Examples will be given hereinafter in order to describe the present invention in more detail. The present invention are not limited to only these Examples.

EXAMPLE 9

As a core material, a polypropylene foamed body having a foaming magnification of 10 times, a thickness of 10 mm and a width of 1200 mm was used. As a sheet for a face material, a polyethylene drawn sheet having a thickness of 0.2 mm and a width of 1000 mm was used. As an adhesive layer, a very low density polyethylene film (manufactured by Tamapoly Co., Ltd.) having a thickness 60 μm was previously laminated on one face of the sheet for the face material.

Figure 5:
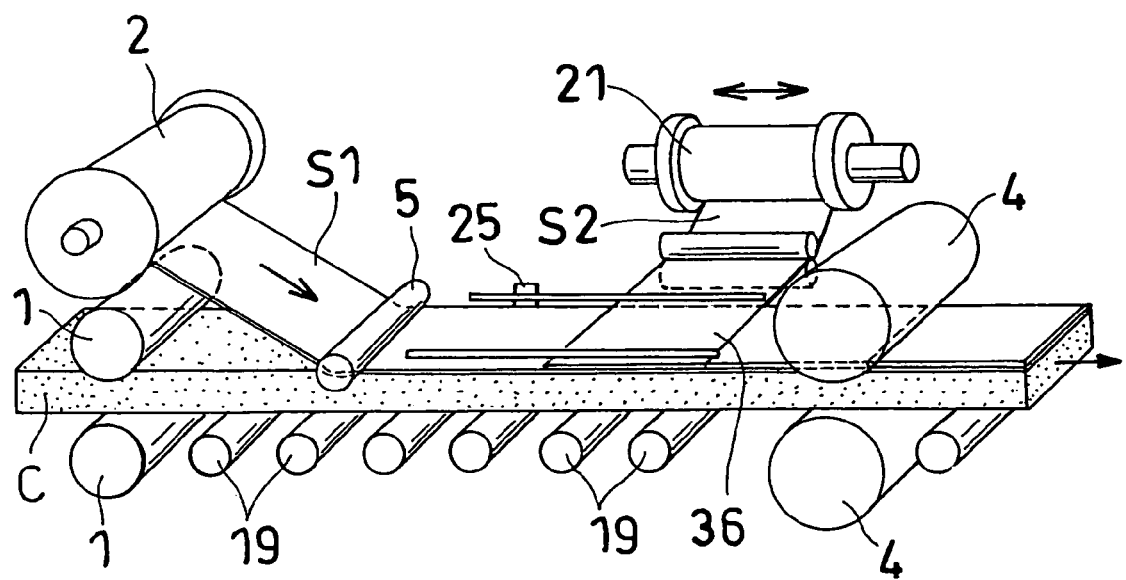
FIG. 5 is a perspective view illustrating a device for producing a laminated composite of Example 9.

As illustrated in FIG. 5, a device for producing a laminated composite of this Example includes a core material supplying means for supplying a core material (C) in the longitudinal direction, a longitudinal sheet supplying means for supplying a longitudinal sheet (S1) for a face material, in the longitudinal direction, on at least one face of the core material (C), a lateral sheet supplying means for supplying a lateral sheet (S2) for the face material, in the lateral direction, on the upper or lower face of the longitudinal sheet (S1), and a sheet thermocompression-bonding means for pressing the longitudinal sheet (S1) and the lateral sheet (S2), which are stacked in an orthogonal form, onto the core material (C) under heating.

The method for producing a laminated composite of this Example includes a core material supplying step of supplying a core material (C) in the longitudinal direction, a longitudinal sheet supplying step of supplying a longitudinal sheet (S1) for a face material, in the longitudinal direction, on at least one face of the core material (C), a lateral sheet supplying step of supplying a lateral sheet (S2) for the face material, in the lateral direction, on the upper or lower face of the longitudinal sheet (S1), and a sheet thermocompression-bonding step of pressing the longitudinal sheet (S1) and the lateral sheet (S2), which are stacked in an orthogonal form, onto the core material (C) under heating.

The core supplying means for supplying the core material (C) in the longitudinal direction has a pair of upper and lower supplying rolls (1) having a diameter of 200 mm, and a plurality of feed rollers (19) arranged at the lower stream of the lower supplying roll (1). As illustrated in FIG. 6($a$), the pair of the upper and lower supplying rolls (1) are driven through a belt (14) by a driving device (6). The core material (C) sandwiched between these supplying rolls (1) is fed onto the feed roll (19) at a line speed of 1 m/minute.

The supplying rolls (1) may be rubber rolls, metal rolls or resin rolls. As illustrated in FIG. 6($b$), the lower roll (15) is lifted or lowered by a lifting device (7) such as an oil pressure cylinder or an air cylinder, and the core material (C) may be closely interposed between the supplying rollers (1).

Examples of the core material supplying means other than the supplying rolls include a device for feeding the core material (C) by belts or caterpillars (8), between which the core material (C) is interposed, as illustrated in FIG. 6($c$); and a device for feeding the core material (C) by a roll (9) wherein only its upper face makes in contact with the core material (C) as illustrated in FIG. 6($d$); The core material supplying means may be a means having capability of feeding the core material at a constant speed. In these figures, the reference numeral (14) denotes a belt.

The longitudinal sheet supplying means for pulling out the longitudinal sheet, in the longitudinal direction, onto the upper face of the core material has a reel (2) on which the longitudinal sheet (S1) is wound, and a press roll (5) for pressing the longitudinal sheet (S1) pulled out from the reel (2) to the surface of the core material (C) along this against the core material (C).

Figure 7:
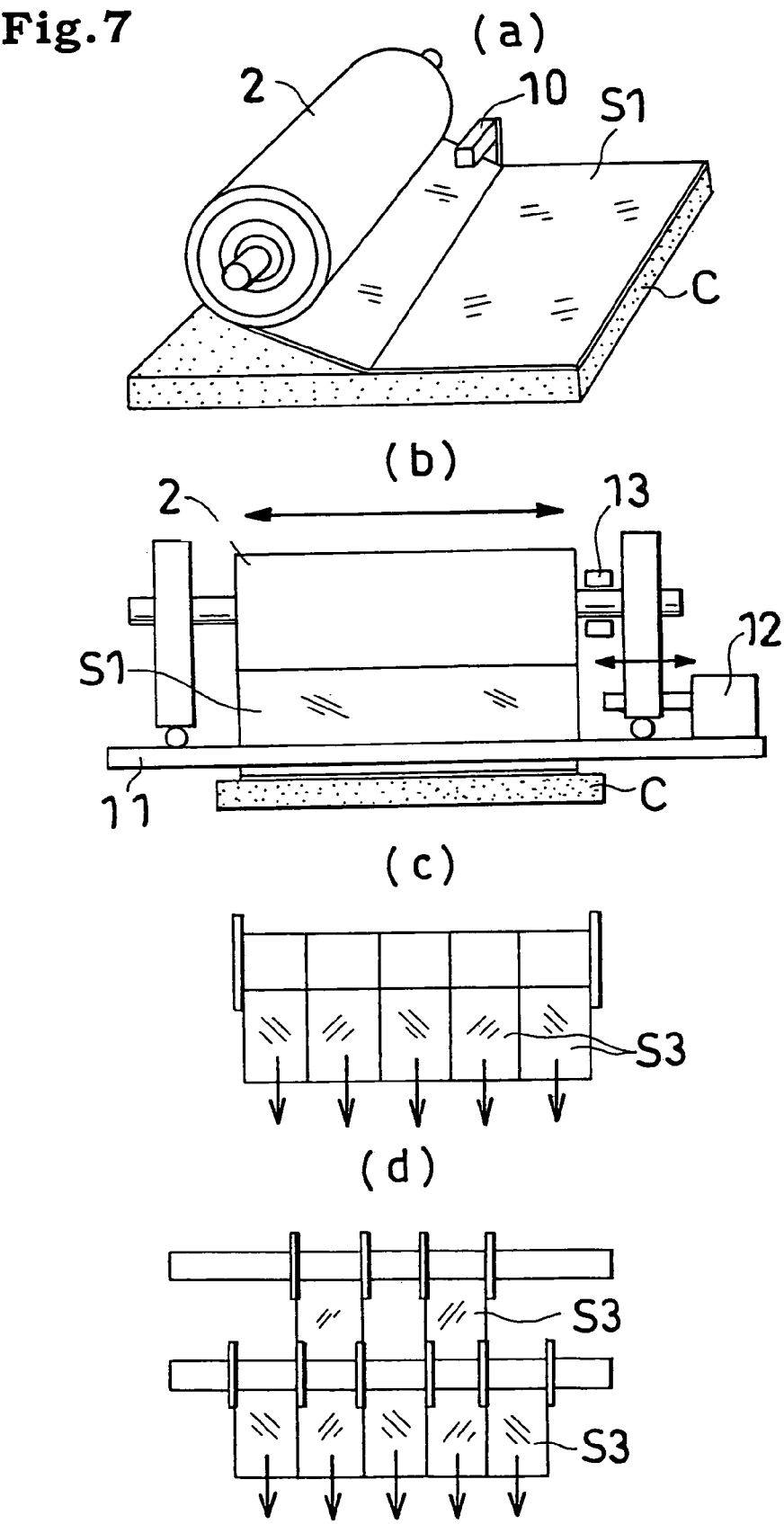
FIG. 7(a) is a perspective view illustrating a sheet meandering correcting device.
FIG. 7(b) is a front view of a tension adjusting function.
FIGS. 7(c) and 7(d) are plan views illustrating an arrangement of a plurality of narrow sheets constituting a longitudinal sheet.

As illustrated in FIG. 7($a$), at the lower stream of the reel (2), a sheet meandering correcting device is provided for sensing a deviation in the width direction between the core material (C) and the longitudinal sheet (S1) with a position sensor (10) to correct the center of the longitudinal sheet (S1) to the center of the core material. The sheet meandering correcting device includes a width direction moving device, as illustrated in FIG. 7($b$), in order to correct the width direction deviation when it is sensed. This moving device has, for example, a rail (11) arranged in the width direction, the reel (2) which can move thereon, and a cylinder (12) for moving this in the width direction.

In order that the longitudinal sheet (S1) may not loosen, there is provided a tension adjusting function of braking the rotation of the reel (2) by pad brakes (13) between which the axis of the reel (2) is interposed and giving a constant tension to the longitudinal sheet (S1).

In order that the longitudinal sheet made of a plurality of narrow sheets (S3) can be laminated on the core material (C), the narrow sheets (S3) may be arranged in parallel (FIG. 7(c)) or in a staggered form (FIG. 7(d)).

When the state of supplying the longitudinal sheet becomes stable, the lateral sheet (S2) for a face material is supplied in a direction perpendicular to the core material feed direction, that is, the lateral direction by the lateral sheet supplying means.

As illustrated in FIG. 8(a), the lateral sheet supplying means has a reel (21) on which the lateral sheet (S2) is wound, and a driving device (22) for driving the reel (21) to send the lateral sheet (S2) in the lateral direction.

The lateral sheet-supplying means also includes a reel (24) arranged in the feed direction of the core material (C), the reel (21) which can move thereon, and a cylinder (23) for moving this in the feed direction of the core material (C) at a speed equal to this. When the lateral sheet (S2) is sent out by the width of the core material (C), the lateral sheet (S2) is cut by a cutter (25) and the resultant cut piece (36) is adhered to the surface of the core material (C). Thereafter, the reel (21) is returned to the original position so as to send out another lateral sheet again. This operation is repeated.

The lateral sheet supplying means also has a tension adjusting function based on pad brakes (28) in the same manner as the longitudinal sheet supplying means.

As illustrated in FIG. 8(b), in another example of the lateral sheet supplying means, the lateral sheet (S2) is sent out by the width of the core material (C), so that the lateral sheet (S2) is cut by a cutter (33). The cut piece (36) is attracted on an attracting pad (34), carried onto the surface of the core material by a cylinder (35), and laminated on the core material.

As illustrated in FIG. 8(c), in still another example, the lateral sheet (s2) is previously cut into a length equal to the width of the core material (C). A great number of the cut pieces (36) are stacked inside a cassette (41), and one of the cut pieces (36) is attracted on an attracting pad (43) at the tip of a carriage device (42), rotated by 180° carried and laminated onto the surface of the core material (C). This operation is repeated. For the 180°-rotation, a servo motor (44) illustrated in FIG. 8(d) is used.

As illustrated in FIG. 5, the sheet thermocompression-bonding means presses the longitudinal sheet (S1) and the lateral sheet (S2) stacked in an orthogonal form on the core material (C) under heating.

In the state that the longitudinal sheet (S1) and the lateral sheet (S2), are laminated on the surface of the core material (C), these are fed to a pair of upper and lower heating rolls (4) having a diameter of 300 mm and a clearance of 10 mm. At a temperature of 120° C. and a line speed of 1 m/minute, the longitudinal sheet (S1) and the lateral sheet (S2) are pressed on the core material (C) under heating by the heating rolls (4) at a line speed of 1 m/minute, and further they are fed by the driving of the rolls.

As illustrated in FIG. 9(a); the pair of the upper and lower heating rolls (4) is rotated and driven by a driving device (51), and oil or water as a hot medium is circulated inside a temperature adjustor (52) provided with an electric heater. The heating rolls (4) are rubber rolls, resin rolls or metal rolls, and only the surface thereof may be coated with rubber or resin.

The core material (C) and the sheets for the face material may be interposed between the two heating rolls (4) under pressure, or may be interposed between one heating roll (4) and a flat stand (17) and under pressure, as illustrated in FIG. 9(b).

As illustrated in FIG. 9(c), the driving device (51) for the heating rolls (4) is made to rotate the heating rolls (4) through a belt (14). As illustrated in FIG. 9(d), the lower heating roll (4) is made to be lifted and lowered by a hydraulic cylinder (53). As illustrated in FIG. 9(e), a cotter (54) is attached to the lower heating roll (4) so that the clearance between the rolls can be adjusted.

In FIG. 10(a), a pair of upper and lower lateral sheets (S2) is sent out onto the upper and lower faces of the core material (C), as described above. Next, the longitudinal sheet (S1) is supplied along the periphery of the pair of the upper and lower heating rolls (4). Thereafter, the longitudinal sheet (S1) and the lateral sheets (S2) may be melted and bonded to the core material (C), under heating and pressing, by the heating rolls (4). As illustrated in FIG. 10(b), the longitudinal sheet (S1) is first supplied along the periphery of the pair of the upper and lower heating rolls (4), and next a pair of upper and lower lateral sheets (S2) is sent out onto the upper and lower faces of the core material (C), as described above. Thereafter, the longitudinal sheet (S1) and the lateral sheets (S2) can be melted and bonded to the core material (C), under pressing and heating, by another pair of upper and lower heating rolls (18).

The longitudinal sheet (S1) and the lateral sheets (S2) may be laminated on at least one face of the core material (C). If a cooling roll, an air cooling or the like is necessary after the melting and bonding, it is set up just after the heating rolls.

Figure 4:
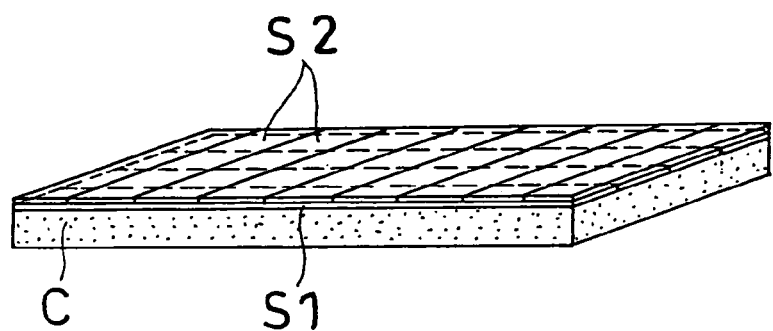
FIG. 4 is a perspective view illustrating a laminated composite wherein a face material in a longitudinally and laterally orthogonal state is laminated on a core material.

This process allows continuous production of laminated composites wherein the face material in a longitudinal and laterally orthogonal state, which has a width of 1000 mm, is laminated on the core material having a thickness of 10 mm and a width of 1200 mm, illustrated in FIG. 4.

EXAMPLE 10

Figure 11:
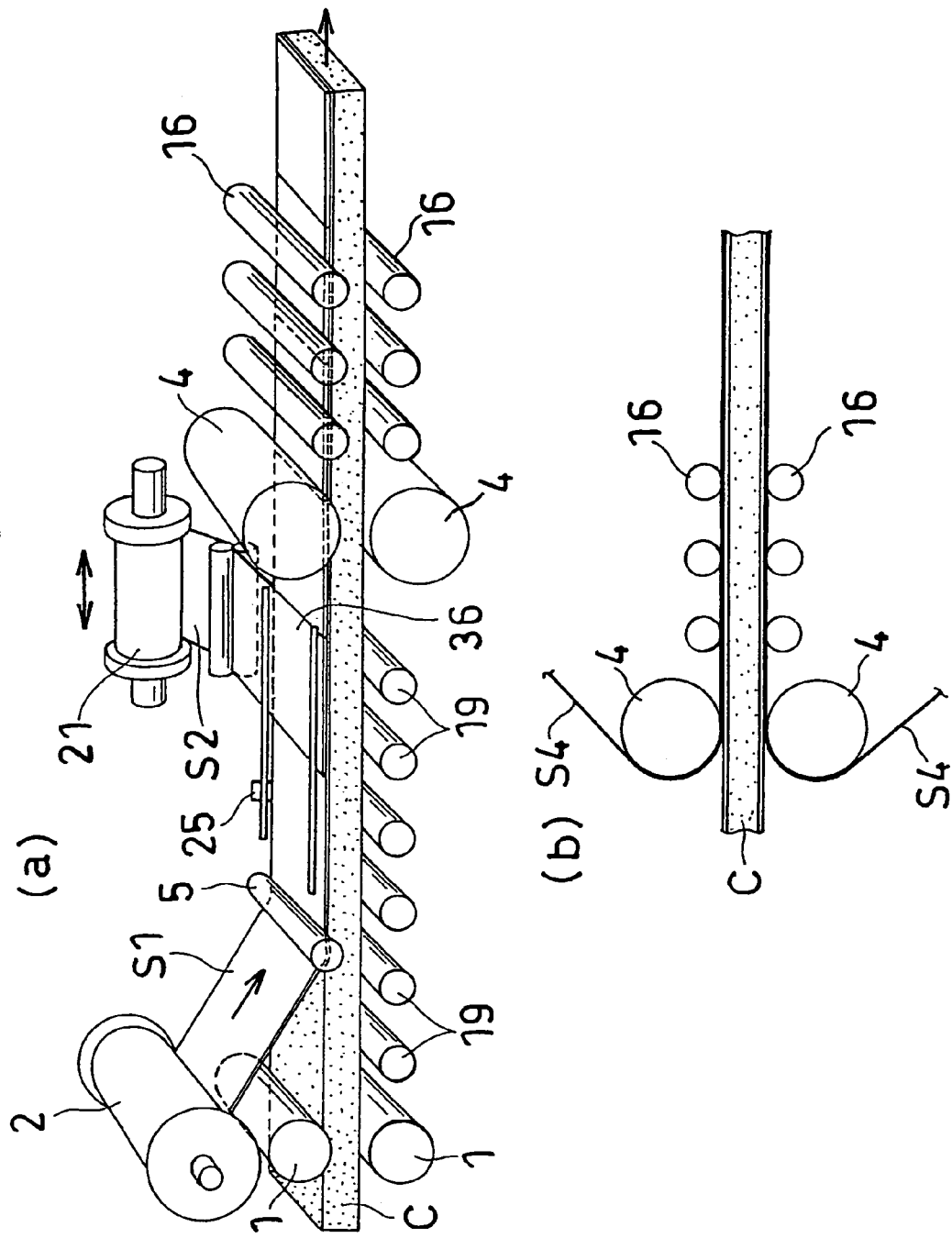
FIG. 11(a) is a side view illustrating an example of a device for producing a laminated composite of Example 10.
FIG. 11(b) illustrates an example wherein a non-melting sheet is supplied onto the surface thereof.
Figure 12:
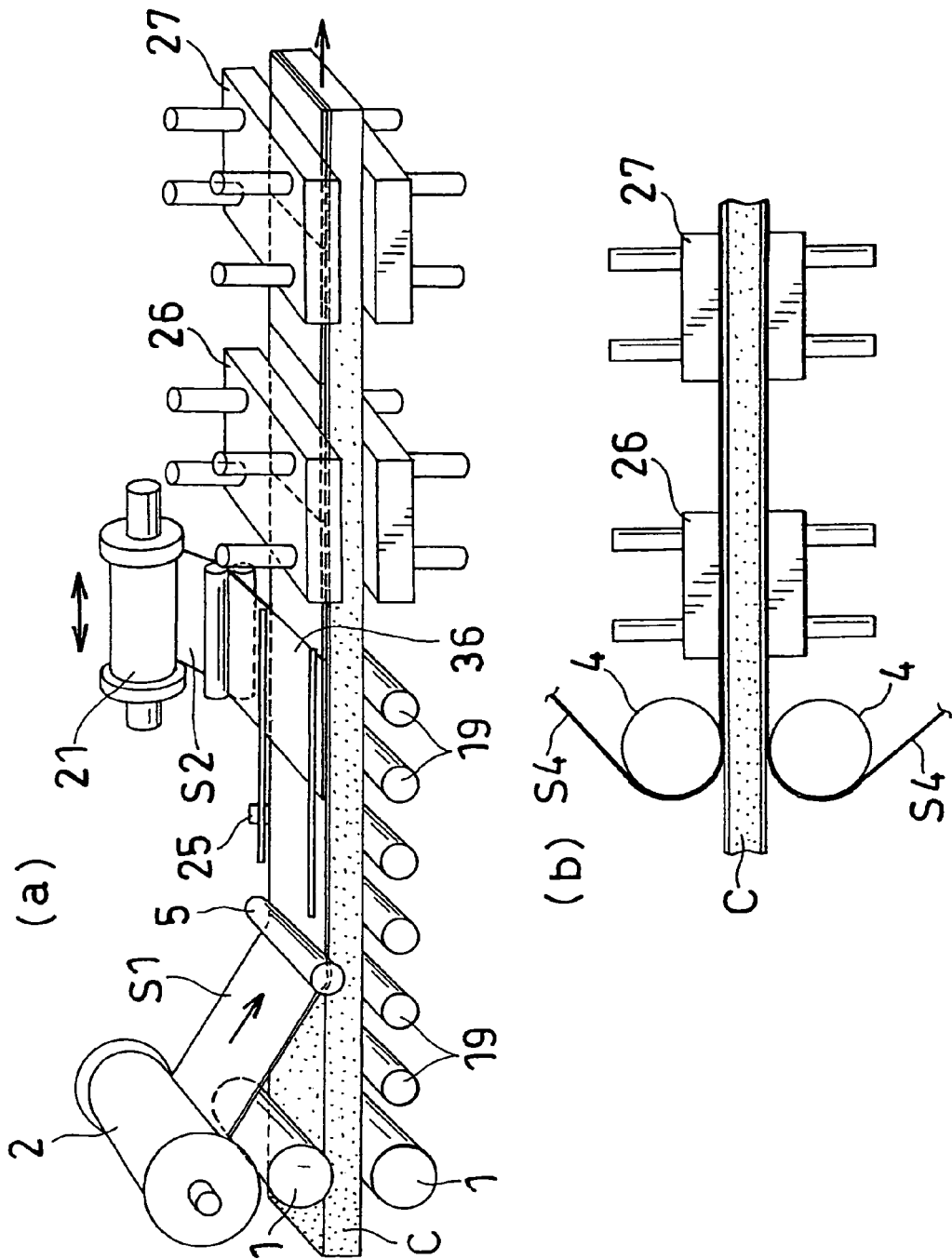
FIG. 12(a) is a side view illustrating an other modification of the device for producing a laminated composite of Example 10.
FIG. 12(b) illustrates an example wherein a non-melting sheet is supplied onto the surface thereof.
Figure 13:
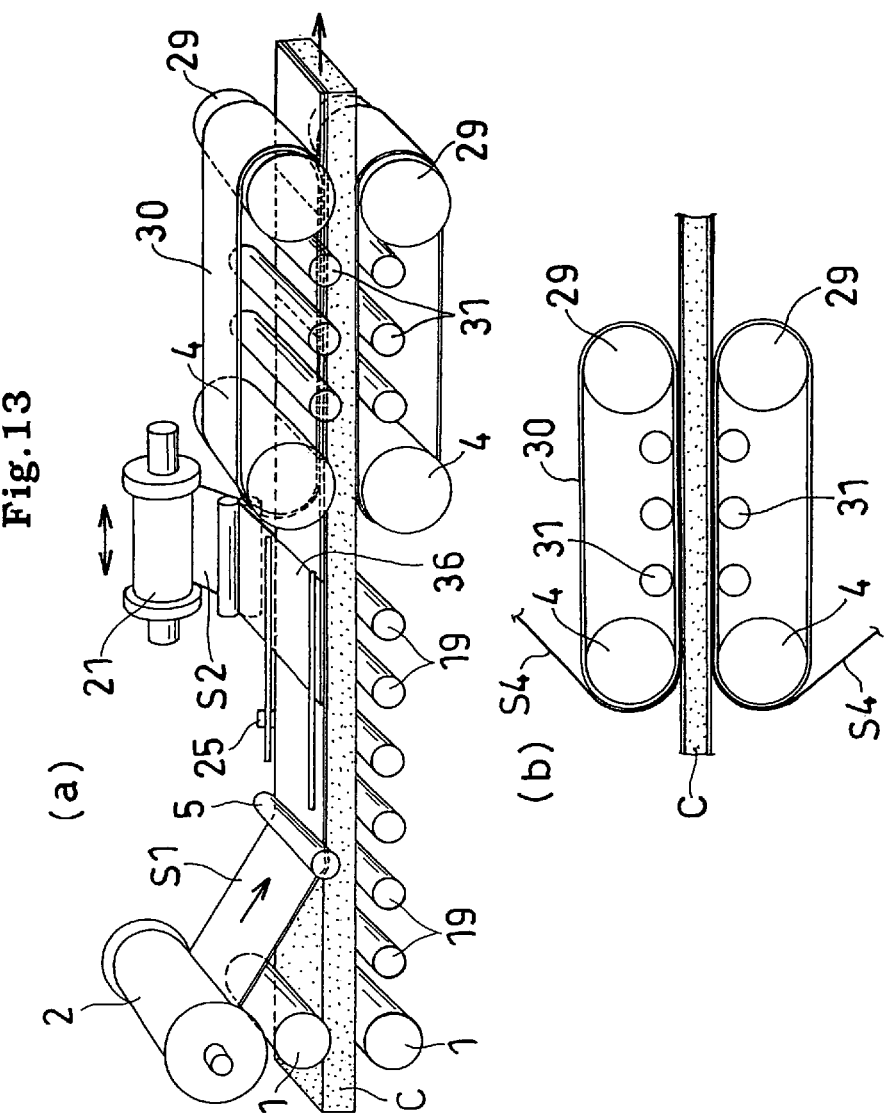
FIG. 13(a) is a side view illustrating a still another modification of the device for producing a laminated composite of Example 10.
FIG. 13(b) illustrates an example wherein anon-melting sheet or a melting sheet is supplied onto the surface thereof.

As illustrated in each of FIGS. 11, 12 and 13, a device for producing a laminated composite of this Example includes a core material supplying means for supplying a core material (C) in the longitudinal direction, a longitudinal sheet supplying means for supplying a longitudinal sheet (S1) for a face material in the longitudinal direction onto at least one face of the core material (C), a lateral sheet supplying means for supplying a lateral sheet (S2) for the face material in the lateral direction onto the upper or lower face of the longitudinal sheet (S1), and a sheet thermocompression-bonding means for pressing the longitudinal sheet (S1) and the lateral sheet (S2), stacked in an orthogonal form, against the core material under heating.

The method for producing a laminated composite of this Example includes a core material supplying step of supplying a core material (C) in the longitudinal direction, a longitudinal sheet supplying step of supplying a longitudinal sheet (S1) for a face material in the longitudinal direction onto at least one face of the core material (C), a lateral sheet supplying step of supplying a lateral sheet (S2) for the face material in the lateral direction onto the upper or lower face of the longitudinal sheet (S1), and a sheet thermocompression-bonding step of pressing the longitudinal sheet (S1) and the lateral sheet (S2), stacked in an orthogonal form, against the core material under heating.

Hereinafter, points different from Example 9 will be described. To the same reference numerals as in Example 9 are attached the same reference numerals, and description thereof will not be repeated.

A device (a method) for producing a laminated composite of Example 10 further includes a sheet cooling means (step) after the sheet thermocompression-bonding means (step).

In a device for producing a laminated composite illustrated in FIGS. 11(a) and 11(b), its sheet cooling means has a plurality of pairs (three pairs in FIGS. 11(a) and 11(b)) of upper and lower cooling rolls (16). Cooling water is supplied into the cooling rolls (16). The core material (C) and the sheets (S1) and (S2) for the face material are interposed between the pairs of the upper and lower cooling rolls (16) under pressure. The respective cooling rolls (16) are rotated by the movement of the core material (C) and the sheets (S1) and (S2) for the face material. The cooling rolls (16) are rubber rolls, resin rolls, metal rolls or the like, and may be metal rolls having surfaces coated with rubber or resin.

In a device for producing a laminated composite illustrated in FIGS. 12(a) and 12(b), as the sheet thermocompression-bonding means, a pair of upper and lower heating presses (26) is used instead of the heating rolls (4), and a sheet cooling means has a pair of upper and lower cooling presses (27) having a size equal to that of the heating presses (26). Inside the heating presses (26), heaters are set up. Cooling water is supplied into the cooling presses (27). The core material (C) and the face material sheets (S1) and (S2) are carried in the state that the sheets (S1) and (S2) are laminated in an orthogonal form, and first heated and pressed by the pair of the heating presses (26). Thereafter, they are cooled by the pair of the cooling presses (27). The feed of the core material (C) and the face material sheets (S1) and (S2) is intermittently performed at a pitch of the width of the presses (26) and (27). A gap corresponding to one of the pitches is set between the heating presses (26) and the cooling rolls (27). This makes continuous production of laminated products possible. Of course, the method of heating the heating presses (26) may be one other than the heater and the method of cooling the cooling presses (27) may be some other method.

In a production method for a laminated composite illustrated in FIGS. 13(a) and 13(b), as the sheet thermocompression-bonding means, a pair of upper and lower heating presses (4) is used, and further a pair of upper and lower cooling presses (29) having a size equal to that of the heating rolls (4) is used as a sheet cooling means. The upper rolls (4) and (29) are connected to each other and the lower rolls (4) and (29) are connected to each other by means of endless belts (30), respectively. The core material (C) and the face material sheets (S1) and (S2) are sandwiched between the pair of the upper rolls (4) and between the pair of the lower rolls (29) and pressed by the upper rolls and the lower rolls, respectively, thorough belts. Portions of the upper and lower belts (30) contacting the lateral sheet (S2) are pressed against the sheet (S2) by plural pressing rolls (31) (three rolls in FIGS. 13(a) and 13(b)), respectively. As the material of the belts, glass fiber or aramide fiber into which Teflon is incorporated is usually used. The belts (30) may be metal belts made of stainless steel or the like. The core material (C) and the face material sheets (S1) and (S2) are carried in the state that the face material sheets (S1) and (S2) are laminated on each other in an orthogonal form, and then put between the belts (30) and pressed by the belts (30), so as to be sent out. At this time, the starting ends of the belts (30) are heated and pressed by the heating rolls (4) and the terminal ends of the belts are cooled by the cooling rolls (29). This makes continuous production of laminated products possible.

The three production devices of FIGS. 11, 12 and 13 are appropriately selected dependently on subsequent processing. That is, in the case of laminating a surface layer (specifically, nonwoven fabric, a resin film, a rubber sheet, a flame resistant material, a weather resistant material or the like) which is not melted at the time of the laminating on the topmost layer of the laminated composite in the subsequent processing in order to give functions (decoration, bonding property, releasing ability, sliding stop, flame resistance, weather resistance and so on) to the surface, it is advisable to use the device in the roll manner illustrated in FIGS. 11(a) and 11(b) or the device in the belt manner illustrated in FIGS. 13(a) and 13(b), and further supply a non-melting sheet (S4) for forming the surface layer by means of the heating rolls (4) or the belt (30) as illustrated in FIGS. 11(b) and 13(b). As illustrated in FIG. 12(b), by setting up heating rolls (4) for supplying the non-melting sheet separately before the heating press (26), the non-melting surface layer can be formed even if the device in the press manner illustrated in FIG. 12(a) is used.

Among the above-mentioned face material sheets, the sheet having a higher melting point than that of the face material sheet used as the surface material can be appropriately used as the non-melting sheet. Examples thereof include a resin sheet, a paper sheet, a metal sheet, a ceramic sheet, nonwoven fabric, and woven fabric.

Examples of the Required Function and the Material for the Function are as Follows:

Decoration . . . a sheet into which pigment is filled, a printed sheet, dyeing, or printed nonwoven fabric or woven fabric Bonding . . . a sheet subjected to corona treatment, or a sheet containing a material having a polar group Releasing ability . . . a sheet having a low frictional coefficient, a sheet painted or coated in order to lower its frictional coefficient or a plated sheet.

Sliding stop . . . a sheet having a high frictional coefficient, a sheet in which irregularities are made, or nonwoven fabric or woven fabric in which resin or rubber is scattered Flame resistance . . . a sheet containing a flame retardant, a sheet made of nonflammable material (metal, ceramic or the like), or a sheet painted or plated with nonflammable or flame resistant material Weather resistance . . . a sheet containing an UV absorber, or a sheet for reflecting light In the case of laminating a surface layer newly on the topmost layer, the surface layer may be deposited across an adhesive layer thereon. The adhesive layer is not limited and may be as follows: simultaneous lamination of an HM film, coating with an adhesive agent by means of a roll coater, spot-coating with an adhesive agent, use of a face material sheet on which an adhesive layer is beforehand laminated, or the like.

In the case of exhibiting decoration, bonding property, releasing ability, flame resistance or weather resistance by a melting sheet, the belt system illustrated in FIGS. 13(a) and 13(b) is selected. In FIG. 13(b), the non-melting sheet (S4) is replaced by the melting sheet. In this way, the belt (30) keeps releasing ability in heating and melting, and cooling. Thus, the melting sheet can be used. Among the above-mentioned materials of the face material sheet, the material which can be melted and has a lower melting point than the surface material can be used as the melting sheet.

Examples of the Required Function and the Material for the Function are as Follows:

Decoration . . . a sheet into which pigment is filled

Figure 14:
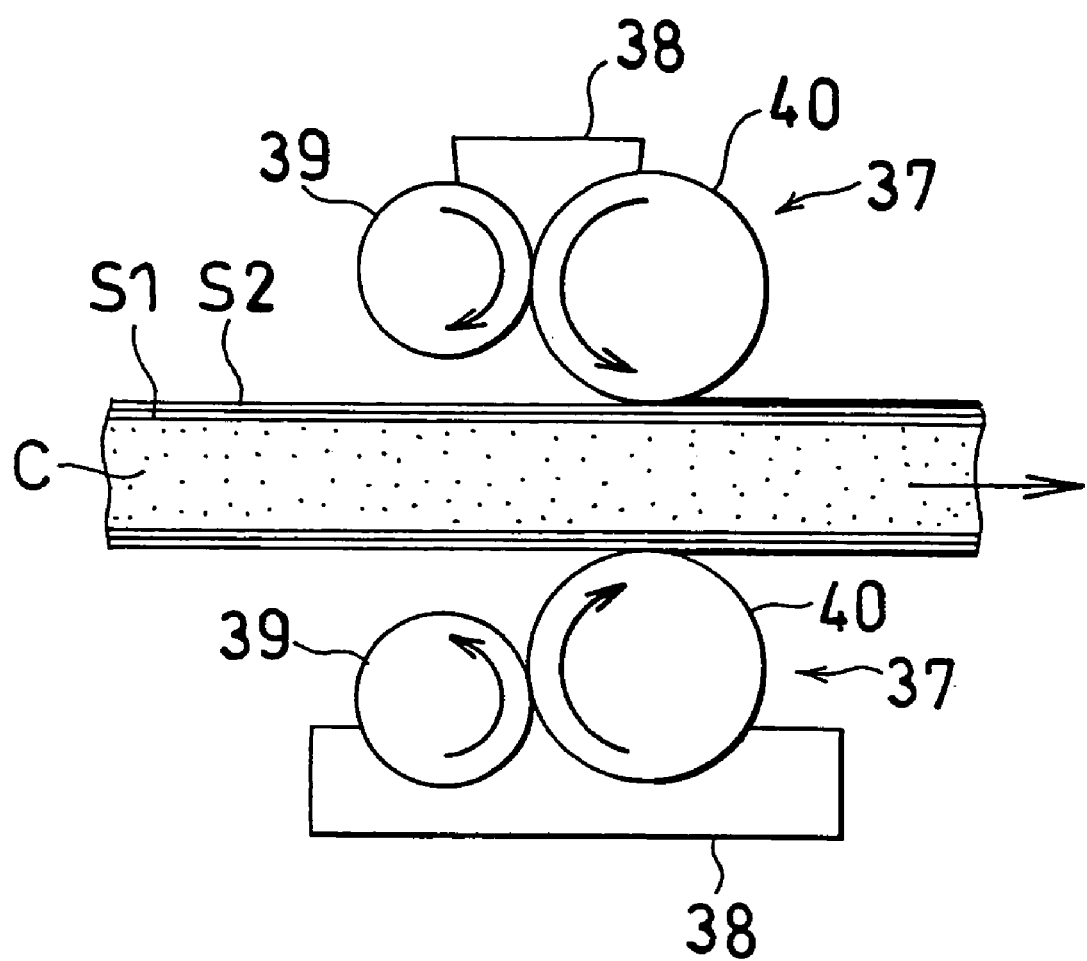
FIG. 14 is a side view illustrating one embodiment for making a surface functional.

Bonding . . . an HM film, a sheet subjected to corona treatment, or a sheet containing a material having a polar group Releasing ability . . . a sheet having a low frictional coefficient Sliding stop . . . a sheet having a high frictional coefficient Flame resistance . . . a sheet containing a flame retardant Weather resistance . . . a sheet containing an UV absorber In order to exhibit decoration, bonding property, releasing ability, flame resistance, weather resistance or the like by a melting resin having a low viscosity, a liquid paint or the like, a pair of upper and lower roll coaters (37) may be separately disposed as illustrated in FIG. 14. Each of the roll coaters (37) is composed of a paint tank (38), a trans flow roller (39) and a composition roller (40). While the core material (C) and the face material sheet (S1) and (S2) are put between the composition rollers (40) and pressed by the rollers (40), a given paint can be applied to the lateral sheet (S2).

Examples of the Required Function and the Material for the Function are as Follows:

Decoration . . . a melting resin into which pigment is filled, or a liquid paint Bonding . . . an HM melting resin, or a melting resin containing a material having a polar group Releasing ability . . . a melting resin having a low frictional coefficient Sliding stop . . . a melting resin having a high frictional coefficient Flame resistance . . . a melting resin containing a flame retardant Weather resistance . . . a melting resin containing an UV absorber

EXAMPLE 11

As a core material, a polypropylene foamed body having a foaming magnification of 10 times, a thickness of 10 mm and a width of 1200 mm was used. As a sheet for a face material, a polyethylene drawn sheet having a thickness of 0.2 mm and a width of 1000 mm and a polyethylene drawn sheet having a thickness of 0.2 mm and a width of 500 mm were used. As an adhesive layer, a very low density polyethylene film (manufactured by Tamapoly Co., Ltd.) having a thickness 60 μm was beforehand laminated on a single face of the face material sheet.

As illustrated in FIGS. 15(a) to 15(c), the device for producing a laminated composite of this Example has a core material supplying means for supplying a core material (C) in the longitudinal direction, a longitudinal sheet supplying means for supplying a longitudinal sheet (S1) for a face material, in the longitudinal direction, on at least one face of the core material (C), a lateral sheet supplying means for supplying a lateral sheet (S2) for the face material, in the lateral direction, on the upper face of the longitudinal sheet (S1), and a sheet thermocompression-bonding means for pressing the longitudinal sheet (S1) and the lateral sheet (S2), which are stacked in an orthogonal form, onto the core material (C) under heating, wherein at a position (73) where the longitudinal sheet (S1) starts to contact a heating roll (4) of the sheet thermocompression-bonding means the lateral sheet supplying means supplies a cut piece (108) of the lateral sheet (S2) between the heating roll (4) and the longitudinal sheet (S1).

The method for producing a laminated composite of this Example includes a core material supplying step of supplying a core material (C) in the longitudinal direction, a longitudinal sheet supplying step of supplying a longitudinal sheet (S1) for a face material, in the longitudinal direction, on at least one face of the core material (C), a lateral sheet supplying step of supplying a lateral sheet (S2) for the face material, in the lateral direction, on the upper face of the longitudinal sheet (S1), a sheet thermocompression-bonding step of pressing the longitudinal sheet (S1) and the lateral sheet (S2), which are stacked in an orthogonal form, onto the core material (C) under heating, and a lateral sheet supplying step of supplying a cut piece (108) of the lateral sheet between a heating roll (4) and the longitudinal sheet (S1) at a position where the longitudinal sheet (S1) starts to contact the heating roll (4) during the sheet thermocompression-bonding step.

As illustrated in FIG. 15(a), the core material (C) is first sent out at a line speed of 1 m/minute by a pair of upper and lower supplying rolls (1) of the same core material supplying as in Example 9, and then put between heating rolls (4) having a diameter of 300 mm and a clearance of 10 mm and pressed by the rolls (4).

A pair of upper and lower longitudinal sheet supplying means is each made of a reel (2) on which the longitudinal sheet (S1) having a width of 500 mm is wound, and is arranged at the lower stream of the heating rolls (4) in the core material feed direction. The longitudinal sheet (S1) is carried along the periphery of the heating rolls (4) and heated by the same rolls. Moreover, the longitudinal sheet (S1) together with the core material (C) is put between the core material (C) and a contact portion (72) of the rolls (4), and pressed by them. By the feeding capability of the heating rolls (4), the longitudinal sheet (S1) is sent out in the core material feed direction and laminated on the core material (C).

In the same manner as in Example 9, the longitudinal sheet supplying means has a tension adjustor based on pad brakes, and a sheet meandering correcting device based on a position sensor.

When the above-mentioned supply state becomes stable, the lateral sheet (S2) made of a polyethylene drawn sheet cut into a piece having a width of 500 mm and a length of 1000 mm is supplied, from a lateral sheet supplying device (3), in a direction perpendicular to the core material feed direction and between the heating rolls (4) and the longitudinal sheet (S1) at a position (73) where the longitudinal sheet (S1) starts to contact the heating rolls (4).

As illustrated in FIGS. 15(b) and (c), the lateral sheet supplying means is composed of a lateral rail (81), a longitudinal rail (82) arranged perpendicularly to this, laterally moving chucks (83) and (84) and longitudinal moving chucks (85) and (86) for grasping the lateral sheet (S2), a cylinder (87) for moving the laterally moving chucks (83) and (84) in the lateral direction along the lateral rail (81), cylinders (88) and (89) for moving the longitudinal moving chucks (85) and (86) in the longitudinal direction along the rail (82), and a cutter for cutting the sheets for a face material into a given length. Each of the chucks (83), (84), (85) and (86) has a cylinder and a spring, is closed by pressing action of the cylinder, and is opened by spring pressure when the cylinder is released.

In the lateral sheet supplying means having the above-mentioned structure, the lateral sheet (S2) is grasped by the laterally moving chucks (83) and (84) to be fully pulled out in the width direction along the lateral rail (81). Thereafter, the lateral sheet (S2) is cut into a given length by the cutter (90) and a cut piece (108) is passed to the longitudinal moving chucks (85) and (86). After the laterally moving chucks (83) and (84) are returned to their original position, the longitudinal moving chucks (85) and (86) move toward the heating rolls (4) along the longitudinal rail (82) and the cut piece (108) is supplied to a position (73) where the longitudinal sheet (S1) starts to contact the heating rolls (4).

Thereafter, the longitudinal moving chucks (85) and (86) also return to their original position. This process is repeatedly performed. The next cut piece of the lateral sheet (S2) is supplied in such a manner that the tip of the cut piece in the longitudinal direction is jointed to the terminal end of the previous cut piece in the longitudinal direction. This makes it possible to connect a great number of the cut pieces for the lateral sheet to each other continuously.

The lateral sheet (S2) wherein a great number of the cut pieces are continuously connected is inserted between the heating rolls (4) and the longitudinal sheet (S1) and pressed by them. The lateral sheet (S2), together with the longitudinal sheet (S1), is carried along the peripheral face of the heating rolls (4), and the longitudinal sheet (S1) and the lateral sheet (S2) are heated. Further the longitudinal sheet (S1) and the lateral sheet (S2) are compressed on the core material (C) at a contact portion (72) between the core material (C) and the heating rolls (4), to produce a face material sheet in an orthogonal form.

After the thermocompression, a cooling roll, an air cooler or the like may be arranged right at the lower stream of the heating rolls (4) if necessary.

Figure 16:
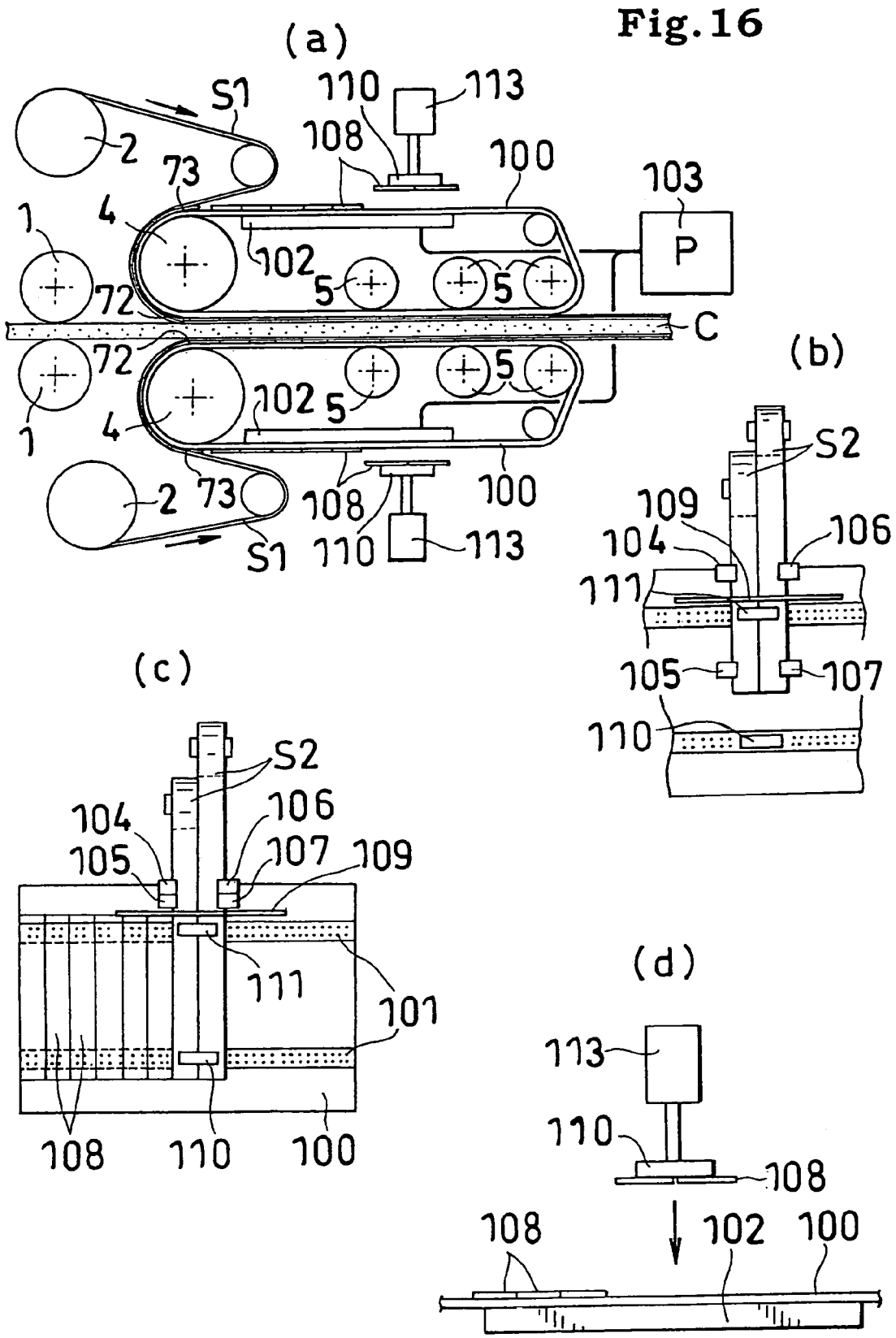
FIGS. 16(a) and 16(d) are side views illustrating a mechanism for delivering cutpieces of a lateral sheet.
FIGS. 16(b) and 16(c) are plan views illustrating the mechanism for delivering cut pieces of a lateral sheet.

Another lateral sheet supplying means is illustrated in FIGS. 16(a) to 16(d). In this example, an upper belt (100) is stretched on an upper heating roll (4) and three upper cooling rolls (5). A lower belt (100) is stretched on a lower heating roll (4) and three lower cooling rolls (5). The respective belts (100) are driven at the same speed by the driving of the heating rolls (4). As illustrated in FIGS. 16(a), 16(b), and 16(c), a large number of holes (101) for attracting are made at portions outer than the width of the longitudinal sheet (S1) in the belts (100), and the lower face of the belts (100) is provided with a vacuum device (102). The vacuum device (102) is made of a hollow air chamber or a sintered metal, and is connected to a vacuum pump (103) outside the belts.

A mechanism for pulling out the lateral sheet (S2) is the same described on the basis of FIGS. 15(a) to 15(c).

As illustrated in FIGS. 16(c) and 16(d), a pair of the lateral sheets (S2) is fully pulled out in the width direction by chucks (105) and (107), and then is hold by the chucks (105) and (107) and chucks (104) and (106). The pair is then cut by a cutting device (109). The resultant pair of cut pieces (108) is attracted by attracting devices (110) and (111). Thereafter, the chucks (105) and (107) returns to their original position. The attracting devices (110) and (111) make an approach to the surface of the belt (100) by a cylinder (113) for elevation and descent, and the pair of the cut pieces (108) is fixed on the surface of the belt (100) by attracting from the rear face of the belt (100). By stopping the attraction of the attracting devices (110) and (111), the lateral sheet (S2) is delivered to the belt (100). This process is repeatedly performed. The next cut piece of the lateral sheet is supplied in such a manner that the tip of the cut piece in the longitudinal direction is jointed to the terminal end of the previous cut piece in the longitudinal direction. This makes it possible to connect a great number of the cut pieces for the lateral sheet to each other continuously.

The lateral sheet (S2) wherein a great number of the cut pieces are continuously connected is supplied at a position (73) where the longitudinal sheet (S1) starts to contact the heating rolls (4) by the belts (100), and inserted between the heating rolls (4) and the longitudinal sheet (S1) and pressed by them. The lateral sheet (S2), together with the longitudinal sheet (S1), is carried along the peripheral face of the heating rolls (4), and the longitudinal sheet (S1) and the lateral sheet (S2) are heated and further the longitudinal sheet (S1) and the lateral sheet (S2) are compressed on the core material (C) at a contact portion (72) between the core material (C) and the heating rolls (4) to produce a face material sheet in an orthogonal form.

In this way, produced are continuously laminated composites wherein the face material in a longitudinal and laterally orthogonal form, having a width of 1000 mm, is laminated on the core material having a thickness of 10 mm and a width of 1200 mm.

EXAMPLE 12

Figure 17:
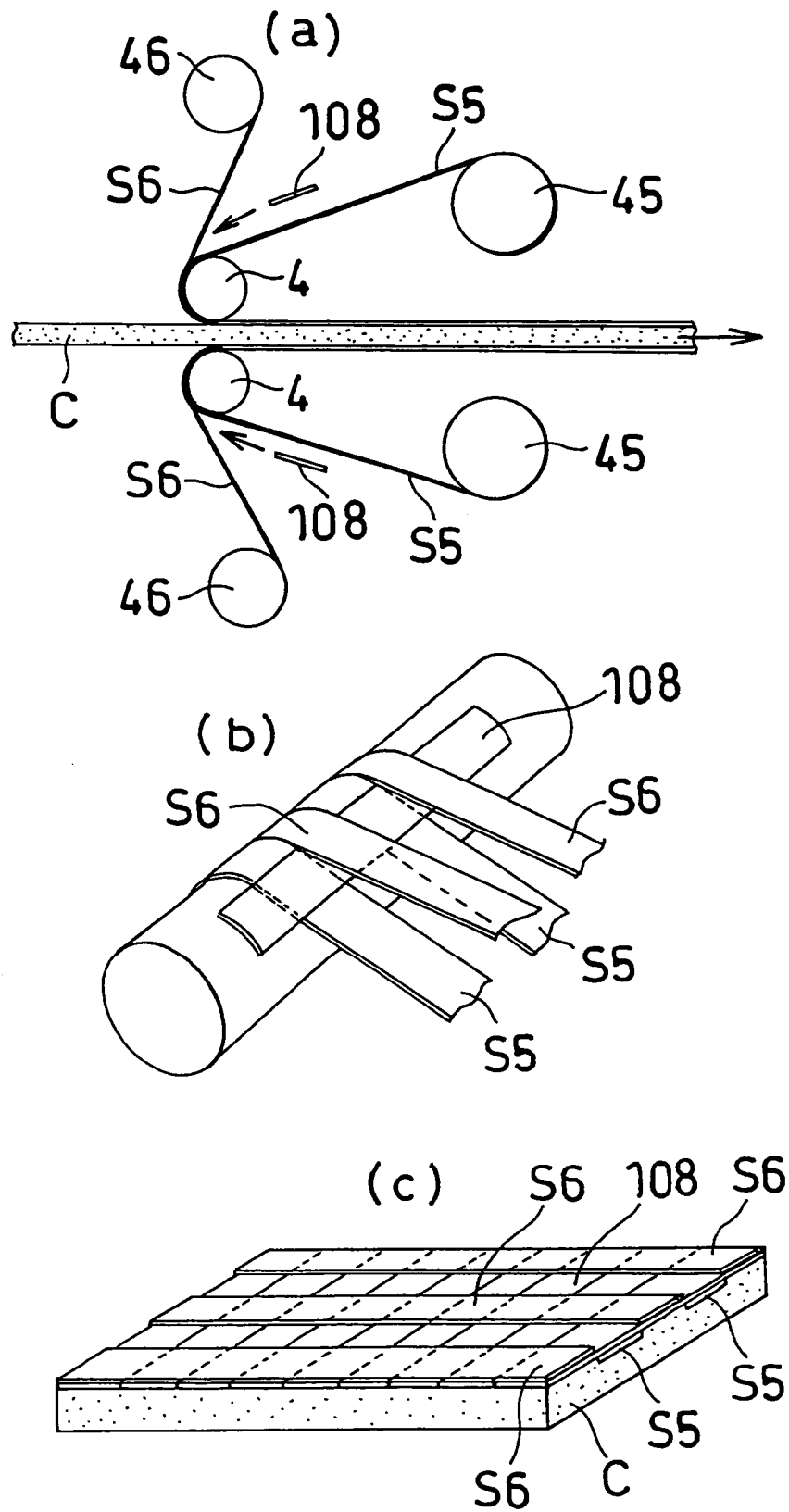
FIG. 17(a) is a side view illustrating a device for producing a laminated composite of Example 12.
FIG. 17(b) is a perspective view of a main part of the device.
FIG. 17(c) is a perspective view illustrating a laminated composite produced in this device.

The production device for a laminated composite of this Example is an embodiment different from the longitudinal sheet supplying means and the lateral sheet supplying sheet of Example 11. As illustrated in FIG. 17(a), a pair of upper and lower longitudinal sheet supplying means each has a first reel (45) for supplying an upper longitudinal sheet wherein narrow longitudinal sheets (S5) are arranged in parallel at intervals of a lateral direction distance corresponding to the width of the single narrow longitudinal sheet (S5) and a second reel (46) for supplying a lower longitudinal sheet wherein narrow longitudinal sheets (S6) are arranged to be shifted from the narrow longitudinal sheets (S5) of the upper longitudinal sheet in the lateral direction by the interval corresponding to the width of the single narrow longitudinal sheet. The upper longitudinal sheet and the lower longitudinal sheet are supplied to be arranged alternately in the lateral direction. A lateral sheet supplying means is a means for supplying lateral sheets (S2) successively between the upper longitudinal sheet supplied from the first reel (45) and the lower longitudinal sheet supplied from the second reel (46), so as to be arranged in parallel.

In the production method for a laminated composite of this Example, a longitudinal sheet supplying step is a step of arranging the upper longitudinal sheet and the lower longitudinal sheet alternately in the lateral direction so as to be supplied, and a lateral sheet supplying step is a step of supplying the lateral sheets successively between the upper longitudinal sheet and the lower longitudinal sheet so as to be arranged in parallel.

The lateral sheet supplying means is the same as the lateral sheet supplying device (3) illustrated in FIGS. 15(a) to 15(c). At a position where the narrow longitudinal sheets (S5) and (S6) start to contact heating rolls (4) of a sheet thermocompression-bonding means, a cut piece (108) of the lateral sheet (S2) can be supplied between the narrow longitudinal sheets (S5) and (S6).

According to the production device of this Example, as illustrated in FIG. 17(b), the narrow longitudinal sheets (S5) of the lower longitudinal sheet are first supplied onto the core material (C), and the cut piece (108) of the lateral sheet is supplied onto this. Furthermore, the narrow longitudinal sheets (S6) of the upper longitudinal sheet are supplied onto the lateral sheets (S2). This is continuously repeated, thereby obtaining a laminated composite having uniformity in reinforcing-strength in the longitudinal direction and the lateral direction, wherein the narrow longitudinal sheets (S5) and (S6) and the lateral sheets (S2) are alternately woven.

EXAMPLE 13

As a core material, a polypropylene foamed body having a foaming magnification of 10 times, a thickness of 10 mm and a width of 1200 mm was used. As a sheet for a face material, a polyethylene drawn sheet having a thickness of 0.2 mm and a width of 1000 mm and a polyethylene drawn sheet having a thickness of 0.22 mm and a width of 300 mm were used.

As illustrated in FIGS. 18(a) and 18(b), the production device for a laminated composite of this Example includes a core supplying means for supplying a core material (C) in the longitudinal direction, a longitudinal sheet supplying means for supplying a longitudinal sheet (S1) for a face material in the longitudinal direction onto at least one face of the core material (C), a lateral sheet supplying means for supplying a lateral sheet (S2) for the face material in the lateral direction onto the upper or lower face of the longitudinal sheet (S1), a sheet thermocompression-bonding means for pressing the longitudinal sheet and the lateral sheet, stacked in an orthogonal form, against the core material under heating, a suction roll (an example of an attracting roll) (120) set at a position where the longitudinal sheet (S1) starts to contact a heating roll (4) of the sheet thermocompression-bonding means, and a single sheet supplying means for supplying cut pieces (121) of the lateral sheet (S2) one by one to the suction roll (120).

The method for producing a laminated composite of this Example includes a core supplying step of supplying a core material (C) in the longitudinal direction, a longitudinal sheet supplying step of supplying a longitudinal sheet (S1) for a face material in the longitudinal direction onto at least one face of the core material (C), a lateral sheet supplying step of supplying a lateral sheet (S2) for the face material in the lateral direction onto the upper face of the longitudinal sheet (S1), a sheet thermocompression-bonding step of pressing the longitudinal sheet and the lateral sheet, stacked in an orthogonal form, against the core material under heating, wherein the lateral sheet supplying step includes a single sheet supplying step of supplying cut pieces of the lateral sheet (S2) one by one to an attracting roll (4) set at a position where the longitudinal sheet (S1) starts to contact the heating roll. (4) during the sheet thermocompression-bonding step.

In FIG. 18(a), the core material (c) is supplied to a device frame (119) in which heating rolls (4) are positioned at a line speed of 1 m/minute by supplying rolls (1) of the core material supplying means, and is then heated and pressed by the heating rolls (4) having a diameter of 300 mm and a clearance of 10 mm.

Next, in the same way as in Example 10, the longitudinal sheet is pulled out from reels (2) of a pair of upper and lower longitudinal sheet supplying means, carried along the periphery of suction rolls (120) arranged outside the heating rolls (4) and further along the periphery of the heating rolls (4) so as to be passed between the core material (C) and the heating rolls (4), and pressed by the rolls (4). As a result, the core material (C) and the longitudinal sheet (S1) are melted and bonded to each other.

The single sheet supplying means has a structure as illustrated in FIGS. 19(a) to 19(f). That is, the lateral sheet is beforehand cut to have a necessary width. The resultant cut pieces (121) in large numbers are put in a cassette (122). One of the cut pieces (121) is pulled out from the cassette (122) and reversed at 180° by an attracting and carrying device (123), to be supplied to suction rolls (120). Thereafter, the attracting and carrying device (123) is returned to its original position. This operation is repeatedly performed. As illustrated in FIG. 18(b), a great number of holes (124) are made at portions outer than the width of the longitudinal sheet (S1) in the suction rolls (120). The cut pieces (121) are attracted from the carrying device through the holes (124). The lateral sheet (S2) made of the cut pieces (121) in large numbers, together with the longitudinal sheet (S1), is fed to the heating rolls (4), supplied between the heating rolls (4) and the longitudinal sheet (S1) at a position (73) where the longitudinal sheet (S1) starts to contact the heating rolls (4), carried along the periphery of the heating rolls (4) in the same manner as in Example 11 to be fed together with the longitudinal sheet (S1), and pressed at a contact portion (127) between the heating rolls (4) and the core material (C) under heating. As a result, the lateral sheet (S2) and the longitudinal sheet (S1) are melted and bonded to the core material (C).

Figure 19:
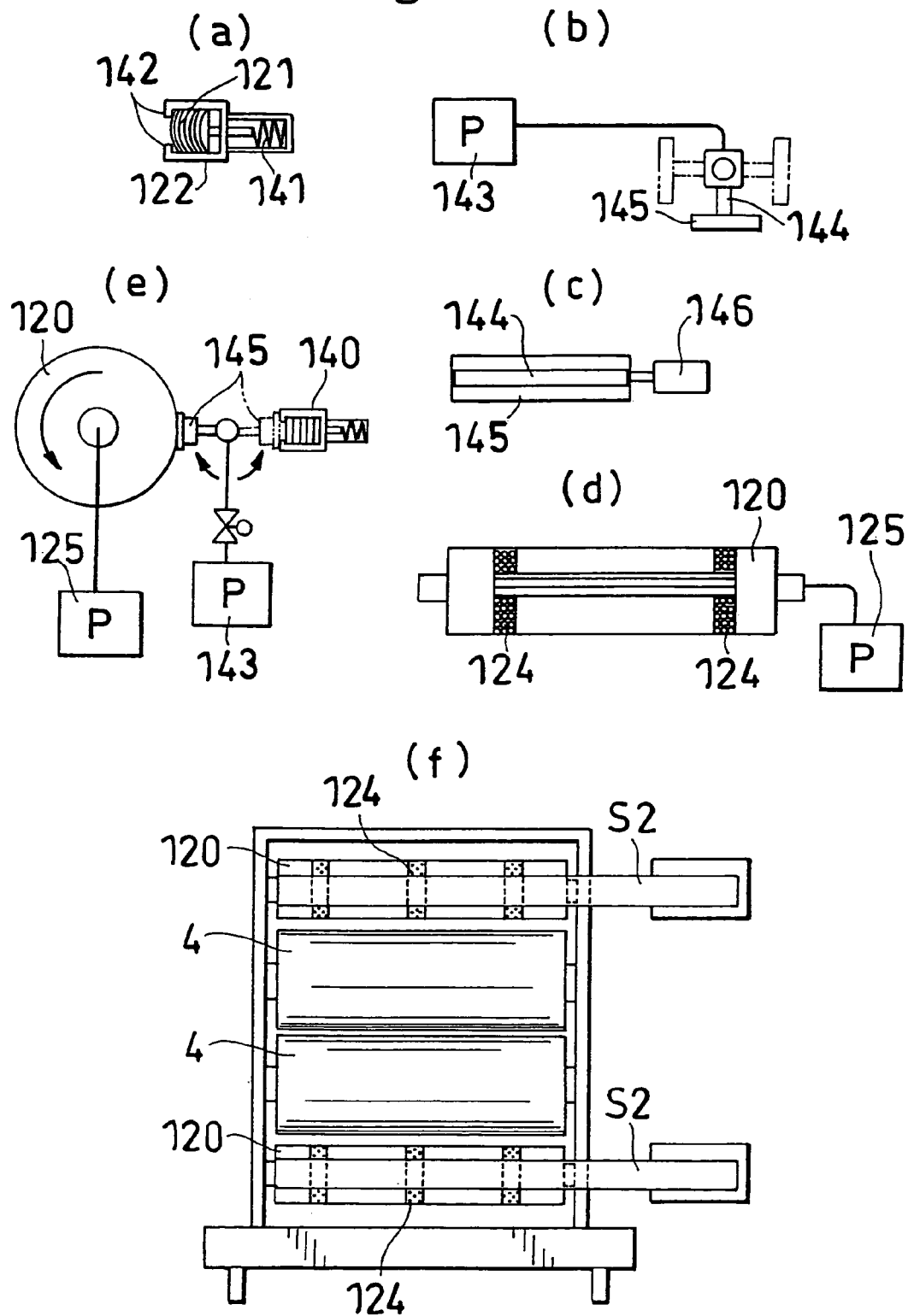
FIG. 19(a) is a side view illustrating a cassette in which cut pieces of a lateral sheet are stored.
FIG. 19(b) is a side view illustrating a means for supplying cut pieces of the lateral sheet.
FIG. 19(c) is a side view illustrating a servo motor.
FIG. 19(d) is a front view illustrating a suction roll.
FIG. 19(e) is a side view illustrating a mechanism for delivering cut pieces of the lateral sheet.
FIG. 19(f) is a front view illustrating a mechanism for continuously supplying lateral sheets.

The step of supplying the lateral sheet (S2) to the suction roll will be described in detail on the basis of FIGS. 19(a) to 19(f). As illustrated in FIG. 19(a), the lateral sheet (S2) is first cut to have a necessary width, and the resultant cut pieces in large numbers are put in the cassette (122). A pushing spring is set on the bottom of the cassette (122). Thus, as the cut pieces decrease, the cut pieces are successively pushed out toward the top from the bottom so that each of cut pieces (121) is easily caught by the attracting type carrying device (144). An inward projection (142) is formed at an outlet portion of the cassette (122) so that the cut pieces (121) are stopped.

Next, an attracting section (145) of the attracting type carrying device (144) connected to a vacuum pump (143) goes to take up one of the cut pieces (121) at the outlet of the cassette (122) and contacts the cut piece (121). At this time, the vacuum pump (143) acts to attract this cut piece (121).

Next, as illustrated in FIG. 19(c), the attracting section (145) is rotated at 180° by a servo motor (146) fitted to the carrying device (144), to carry the cut piece (121) at a position parallel to the surface of the suction roll (120) (FIG. 19(c)).

As illustrated in FIGS. 19(d) and 19(e), a great number of holes (124) are made at portions outer than the width of the longitudinal sheet (S1) in the suction rolls (120). The cut piece (121) is attracted through the holes (124) by attracting force of the vacuum pump (125). The cut piece (121) is moved from the carrying device (144) toward the suction roll (120) by weakening the attracting force of the carrying device (144). Thereafter, the attracting and carrying device (123) is returned to its original position. This operation is repeated.

The supply of the lateral sheets (S2) may be continuously performed as illustrated in FIG. 19(f). A mechanism for the continuous supply is the same as in Example 9.

Figure 20:
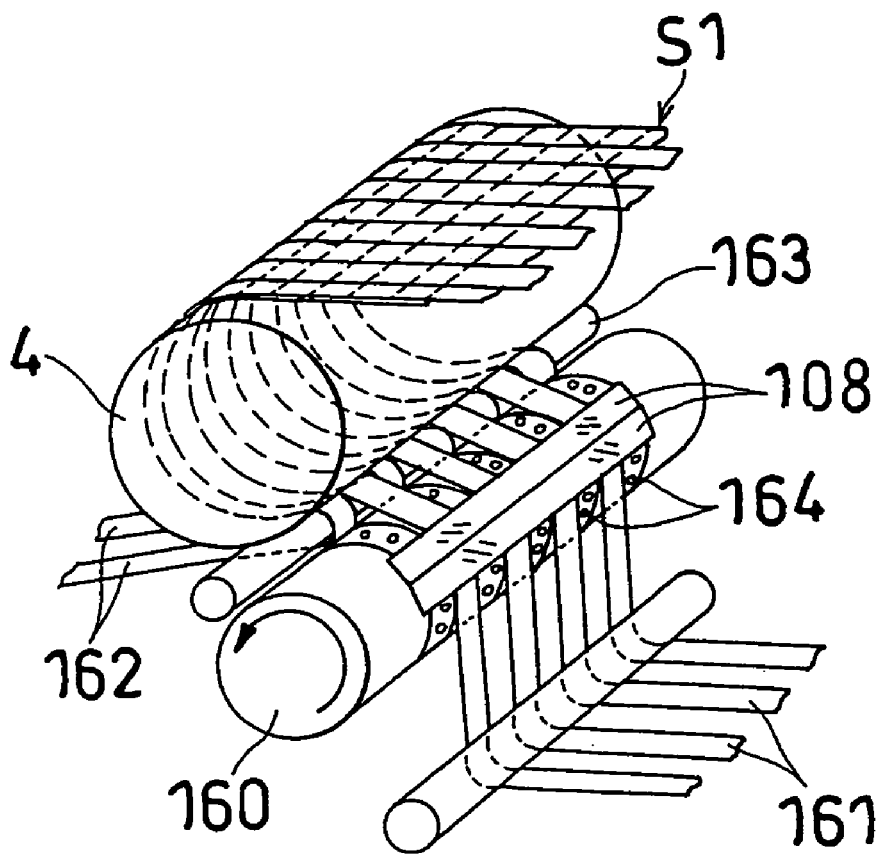
FIG. 20 is a perspective view illustrating an arrangement of a plurality of narrow sheets constituting a longitudinal sheet.

As illustrated in FIG. 20, a great number of narrow longitudinal sheets (S1) may be sent out in a hound's-tooth check form. In other words, it is allowable that the sheets are composed of sheets (161) supplied to the suction roll (160) in the feed direction and sheets (162) supplied in the reverse feed direction, only the former embrace the suction roll (160), and the latter embrace another intermediate roll, thereby supplying the longitudinal sheets to the heating rolls (4). In this method, attracting holes (164) can be made in the entire surface of the suction rolls (160) in the width direction.

In this way, produced are continuously laminated composites illustrated in FIG. 4 wherein the face material in a longitudinal and laterally orthogonal form, having a width of 1000 mm, is laminated on the core material having a thickness of 10 mm and a width of 1200 mm.

EXAMPLE 14

Figure 21:
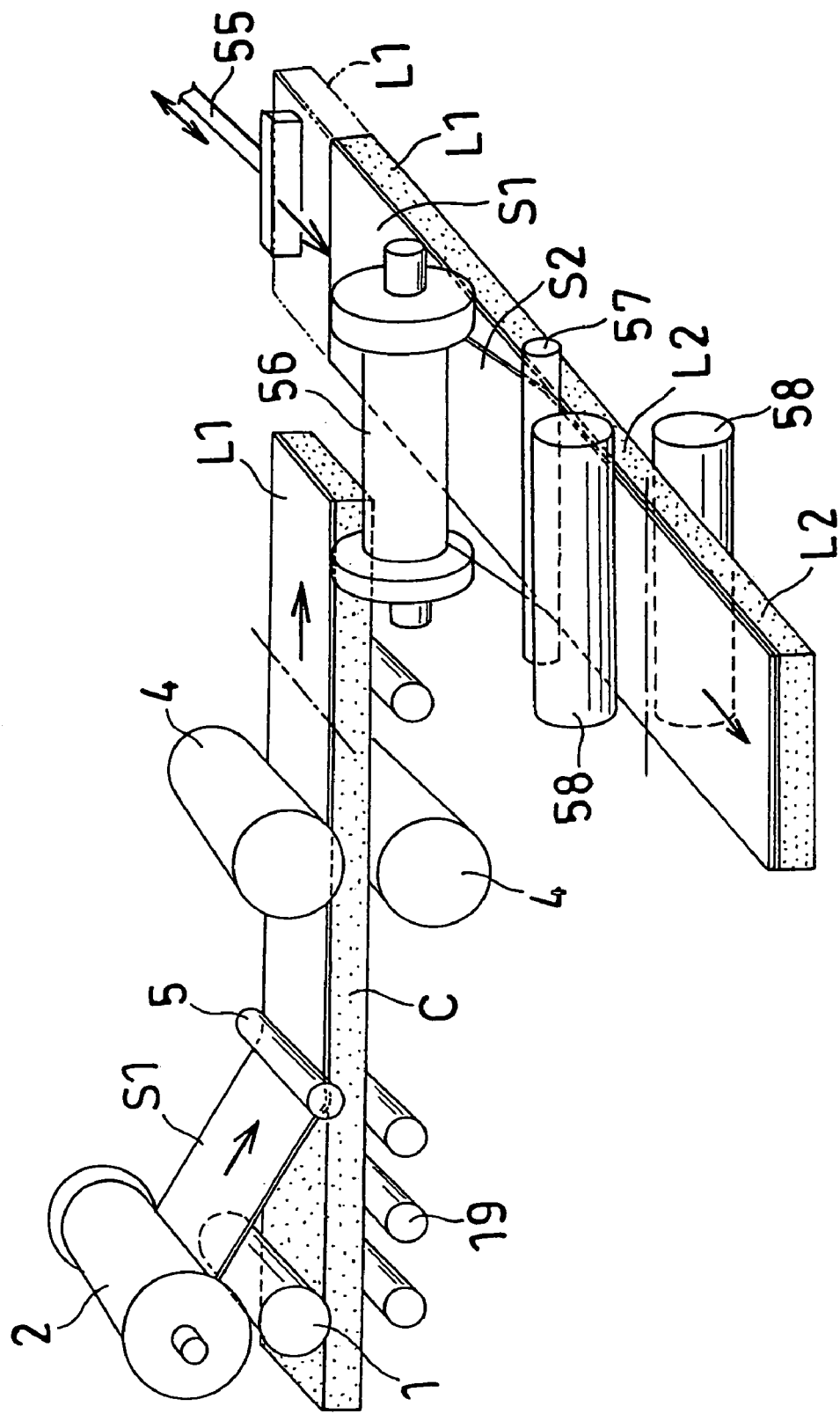
FIG. 21 is a perspective view illustrating a device for producing a laminated composite of Example 14.

As illustrated in FIG. 21, the production device for a laminated composite of this Example includes a core material supplying means for supplying a core material (C) in the longitudinal direction, a longitudinal sheet supplying means for supplying a longitudinal sheet (S1) for a face material, in the longitudinal direction, onto at least one face of the core material (C), a first thermocompression-bonding means for pressing the longitudinal sheet (S1) and the core material (C) under heating to form an intermediate lamination, a first cutting means for cutting the intermediate lamination, a carrying means for carrying cut pieces (L1) of the intermediate lamination in a direction having a given angle (90° in the present Example) to the longitudinal direction, a lateral sheet supplying means for supplying a lateral sheet (S2) for the face material, in the carriage direction, onto the upper face or the lower face of the cut pieces (L1), a second thermocompression-bonding means for pressing the cut pieces (L1) of the intermediate lamination and the lateral sheet (S2), which are stacked, under heating to form a final lamination (L2), and a second cutting means for cutting the final lamination (L2).

The production method for a laminated composite of this Example includes a core material supplying step of supplying a core material (C) in a longitudinal direction, a longitudinal sheet supplying step of supplying a longitudinal sheet (S1) for a face material, in the longitudinal direction, onto at least one face of the core material (C), a first thermocompression-bonding step of pressing the longitudinal sheet (S1) and the core material (C) under heating to form an intermediate lamination (L1), a first cutting step of cutting the intermediate lamination, a carrying step of carrying cut pieces (L1) of the intermediate lamination in a direction having a given angle (90° in the present Example) to the longitudinal direction, a lateral sheet supplying step of supplying a lateral sheet (L2) for the face material, in the carriage direction, onto the upper face or the lower face of the cut pieces (L1) of the intermediate lamination, a second thermocompression-bonding step of stacking and pressing the intermediate lamination (L1) and the lateral sheet (S2) under heating to form a final lamination (L2), and a second cutting step of cutting the final lamination (L2).

In these Examples, the core material supplying means and the longitudinal sheet supplying means are the same as in Example 9, and the first thermocompression-bonding means is the same as the thermocompression-bonding means in Example 9. About the first cutting means, its structure itself is the same as that of the cutting means in Example 9 but the arrangement position thereof is not just after the lateral sheet supplying means but just after the heating rolls (4) as the thermocompression-bonding means. Only by adhering the longitudinal sheet (S1) to the core material (C), an intermediate lamination cut into a constant size is first formed. This intermediate lamination is sent out in the advance direction (in the longitudinal direction), and runs off from the carrying line in the longitudinal direction. Thereafter, the lamination is carried in the lateral direction by a cylinder (55).

The lateral sheet supplying means for pulling out the lateral sheet (S2) to the upper face of the cut pieces (L1) of the intermediate lamination has the same structure as the longitudinal sheet supplying means. Namely, this means is composed of a reel (56) on which the lateral sheet (S2) is wound, and a pushing roll (57) for pushing, against the intermediate lamination, the lateral sheet (S2) pulled out from the reel (56) to the surface of the intermediate lamination along this. This pulling-out direction is different from the longitudinal sheet supplying means by 90°. In this way, the lateral sheet (S2) is supplied and thermocompression-bonded in the same manner as the longitudinal sheet (S1) while the cut pieces (L1) of the intermediate lamination move in the lateral direction.

The second thermocompression-bonding means has the same structure as the first thermocompression-bonding means. Namely, the second means has a pair of heating rolls (58). By heating and pressing the cut pieces (L1) of the intermediate lamination and the lateral sheet (S2), which are stacked, a final lamination (L2) is formed. About the final lamination (L2), the lateral sheet (S2) portion thereof is cut at positions corresponding to size of the respective cut pieces (L1) of the intermediate lamination by the second cutting means.

In this way, produced are continuously laminated composites illustrated in FIG. 4 wherein the face material in a longitudinal and laterally orthogonal form, having a width of 1000 mm, is laminated on the core material having a thickness of 10 mm and a width of 1200 mm.

EXAMPLE 15

Figure 22:
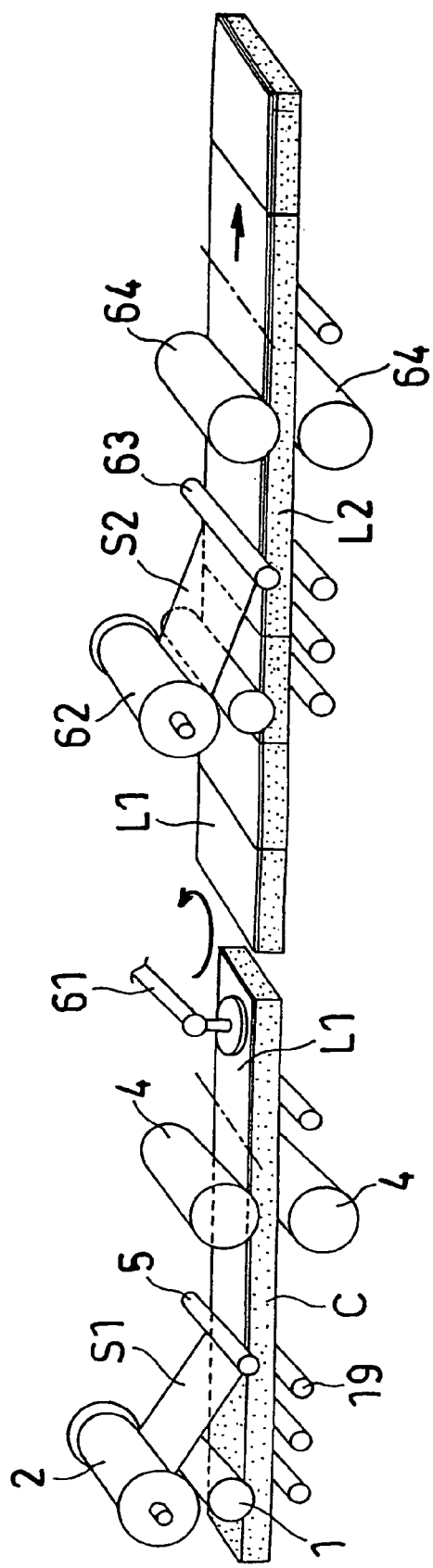
FIG. 22 is a perspective view illustrating a device for producing a laminated composite of Example 15.

As illustrated in FIG. 22, the production device for a laminated composite of this Example includes a core material supplying means for supplying a core material (C) in the longitudinal direction, a longitudinal sheet supplying means for supplying a longitudinal sheet (S1) for a face material, in the longitudinal direction, onto at least one face of the core material, a first thermocompression-bonding means for pressing the longitudinal sheet (S1) and the core material (C) under heating to form an intermediate lamination, a first cutting means for cutting the intermediate lamination, a carrying means for rotating cut pieces (L1) of the intermediate lamination at an angle of 90° to carry the cut pieces in the longitudinal direction, a lateral sheet supplying means for supplying a lateral sheet (S2) for the face material, in the longitudinal direction, onto the upper face or the lower face of the cut pieces (L1), a second thermocompression-bonding means for pressing the cut pieces (L1) of the intermediate lamination and the lateral sheet (S2), which are stacked, under heating to form a final lamination (L2), and a second cutting means for cutting the final lamination (L2).

The production method for a laminated composite of this Example includes a core material supplying step of supplying a core material (C) in the longitudinal direction, a longitudinal sheet supplying step of supplying a longitudinal sheet (S1) for a face material, in the longitudinal direction, onto at least one face of the core material (C), a first thermocompression-bonding step of pressing the longitudinal sheet (S1) and the core material (C) under heating to form an intermediate lamination, a first cutting step of cutting the intermediate lamination, a carrying step of rotating cut pieces (L1) of the intermediate lamination at an angle of 90° to carry the cut pieces in the longitudinal direction, a lateral sheet supplying step of supplying a lateral sheet (L2) for the face material, in the longitudinal direction, onto the upper face or the lower face of the cut pieces (L1), a second thermocompression-bonding step of stacking and pressing the cut pieces (L1) of the intermediate lamination and the lateral sheet (S2) under heating to form a final lamination (L2), and a second cutting step of cutting the final lamination (L2).

In this Example, the core material supplying means and the longitudinal sheet supplying means are the same as in Example 9, and the first thermocompression-bonding means is the same as the thermocompression-bonding means in Example 9. About the first cutting means, its structure itself is the same as that of the cutting means in Example 9 but the arrangement position thereof is not just after the lateral sheet supplying means but just after the heating rolls (4) as the thermocompression-bonding means. Only by adhering the longitudinal sheet (S1) to the core material (C), an intermediate lamination cut into a constant size is first formed. This intermediate lamination is sent out in the advance direction (in the longitudinal direction), and the direction is rotated at 90° by attracting pads (61). Furthermore, the intermediate lamination is continuously carried in a carrying line along the longitudinal direction.

The lateral sheet supplying means for pulling out the lateral sheet (S2), in the longitudinal direction, onto the upper face of the cut pieces (L1) of the intermediate lamination has the same structure and as the longitudinal sheet supplying means. Namely, this means is composed of a reel (62) on which the lateral sheet (S2) is wound, and a pushing roll (63) for pushing, against the intermediate lamination, the lateral sheet (S2) pulled out from the reel (62) to the surface of the intermediate lamination along this. The pulling-out direction is also the same as in the case of the longitudinal sheet supplying means. In this way, the lateral sheet (S2) is supplied and thermocompression-bonded in the same manner as the longitudinal sheet (S1) while the cut pieces (L1) of the intermediate lamination move in the longitudinal direction.

The second thermocompression-bonding means has the same structure as the first thermocompression-bonding means. Namely, the second means has a pair of heating rolls (64). By heating and pressing the cut pieces (L1) of the intermediate lamination and the lateral sheet (S2), which are stacked, the final lamination (L2) is formed. About the final lamination (L2), the lateral sheet (S2) portion thereof is cut at positions corresponding to size of the respective cut pieces (L1) of the intermediate lamination by the second cutting means.

In this way, produced are continuously laminated composites illustrated in FIG. 4 wherein the face material in a longitudinal and laterally orthogonal form, having a width of 1000 mm, is laminated on the core material having a thickness of 10 mm and a width of 1200 mm.

INDUSTRIAL APPLICABILITY

A device and a method for producing a laminated composite according to the present invention are those for laminating at least one sheet on at least one face of a sheet-form core material, and can be used as a production method and a production device for obtaining a civil engineering and construction material, a construction material including a tatami mat core material, a material for vehicles, and the like.

The invention claimed is:

1. A method for producing a laminated composite by laminating a polyolefin resin drawn sheet on at least one face of a sheet-form core material having a density of 30 to 300 kg/m$^3$, comprising:
   interposing, between the core material and the drawn sheet, a sheet or a film made of a bonding synthetic resin or rubber having a flow starting temperature lower than the thermal deformation temperature of the core material and the melting point of the drawn sheet; heating the resultant stack product to not less than the flow starting temperature of the synthetic resin or the rubber and not more than the thermal deformation temperature of the core material and the melting point of the drawn sheet; and pressing the stack product to apply a compression strain of 0.01 to 10% to the core material at the same time of or after the heating.

2. The method for producing a laminated composite according to claim 1, wherein when the shrinkage starting temperature of the drawn sheet at the time of the heating is lower than the heating temperature at the time of the laminating, the laminating is performed while a tension of 0.1 to 3 kgf/1 cm-width is applied to the sheet in the orientation direction of the sheet.

3. The method for producing a laminated composite according to claim 1, wherein the draw magnification of the sheet is from 5 to 40 times.

4. The method for producing a laminated composite according to claim 1, wherein the core material is a resin foamed body in which the average of aspect ratios (Dz/Dxy) of cells is from 1.1 to 4.0.

5. The method for producing a laminated composite according to claim 1, wherein as the polyolefin resin drawn sheet, there is used a drawn sheet having a face to be bonded being at least locally heated and melted at a temperature higher than the melting point of the resin by 10° C. or more or being roughened.

* * * * *